Aug. 29, 1961     E. G. DE CORIOLIS ET AL     2,998,237
HEAT TREATING SYSTEM

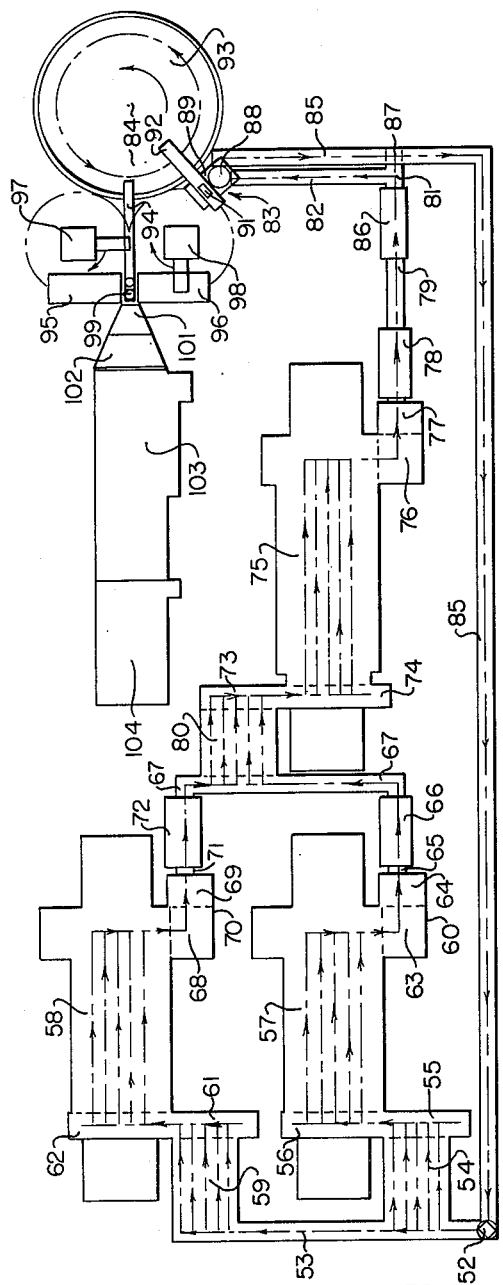

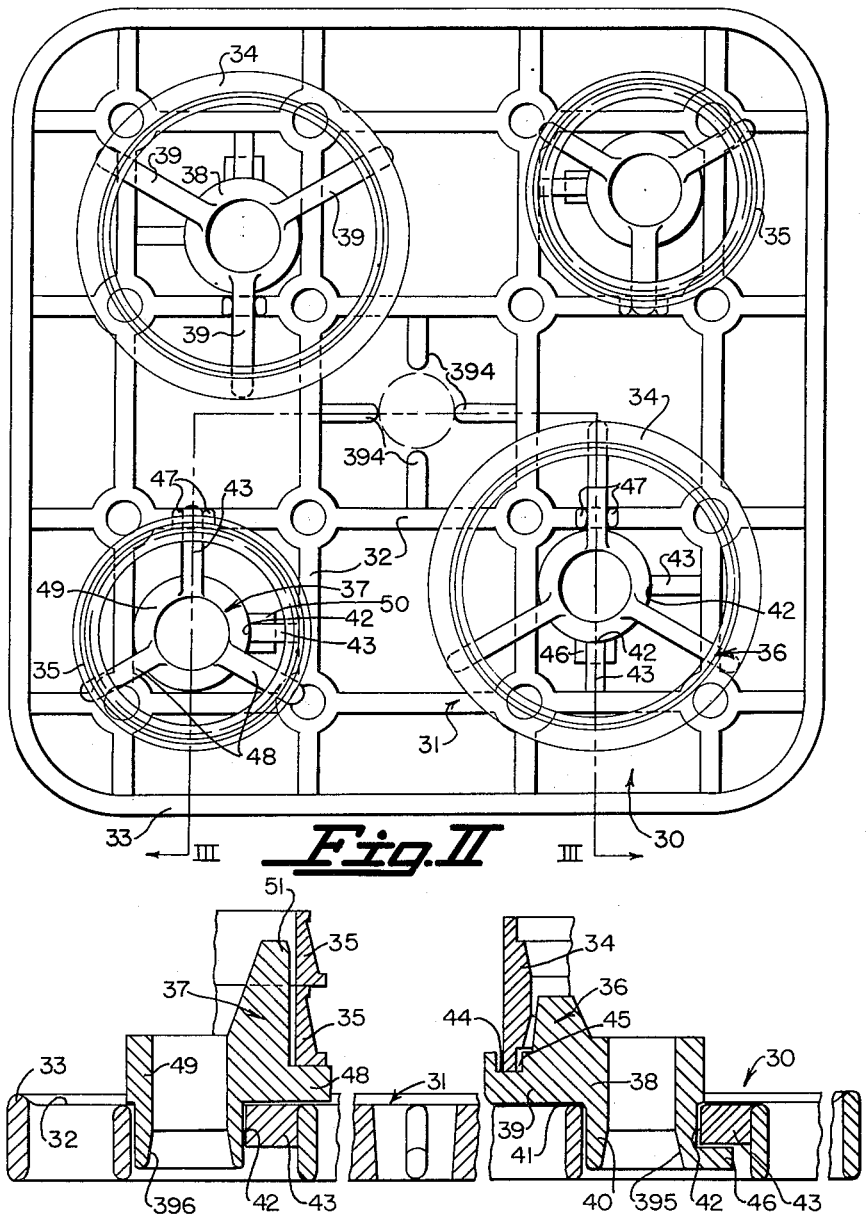

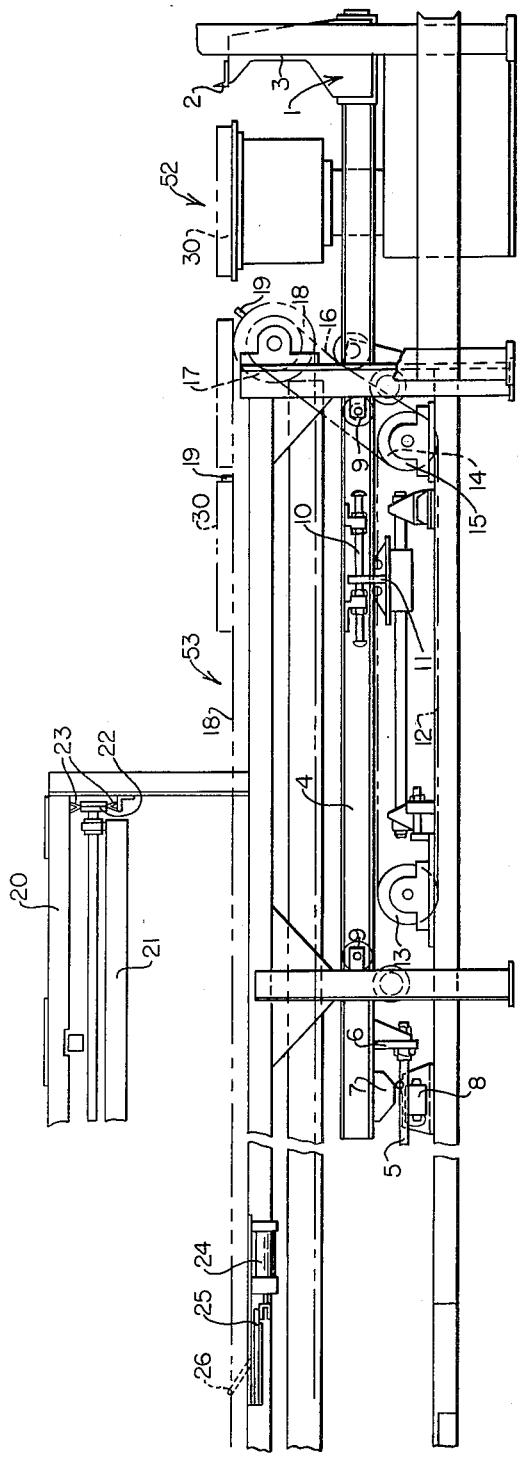

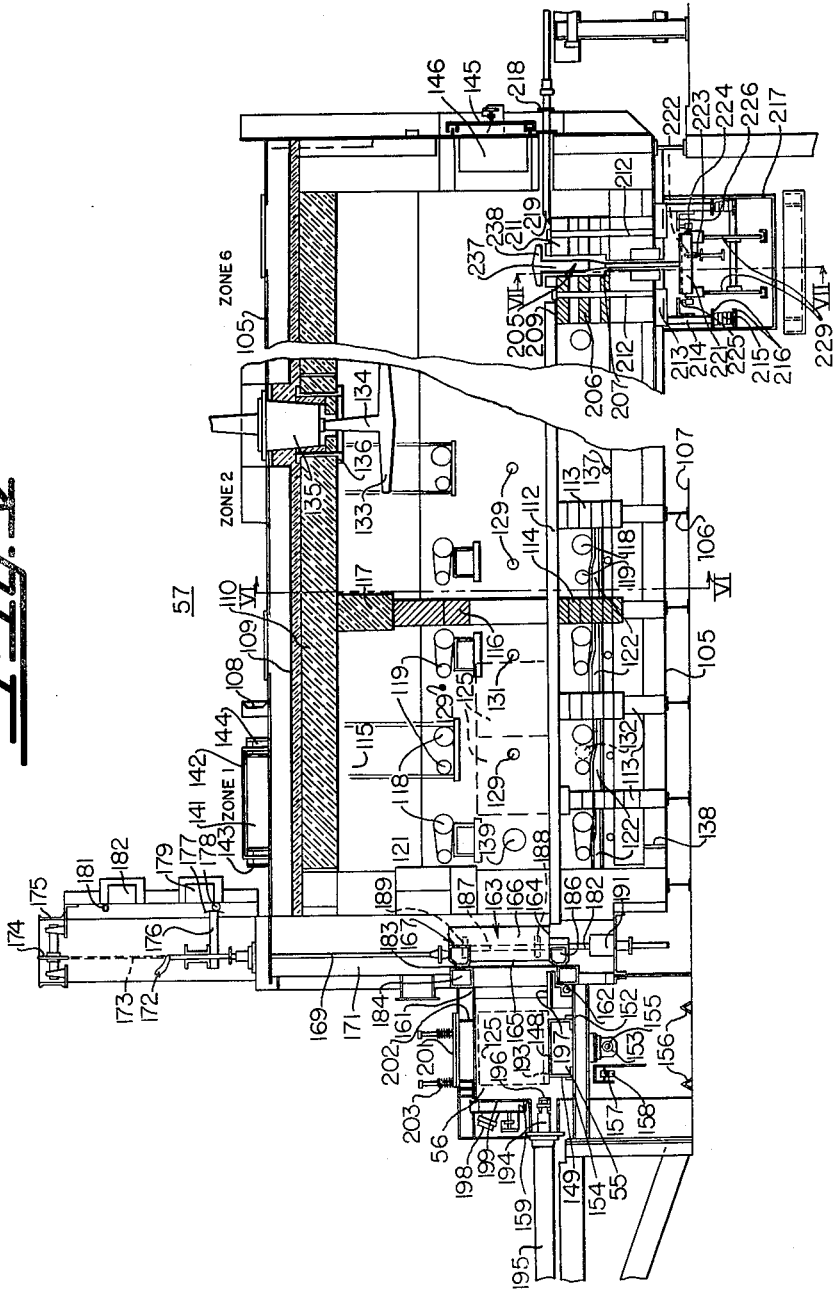

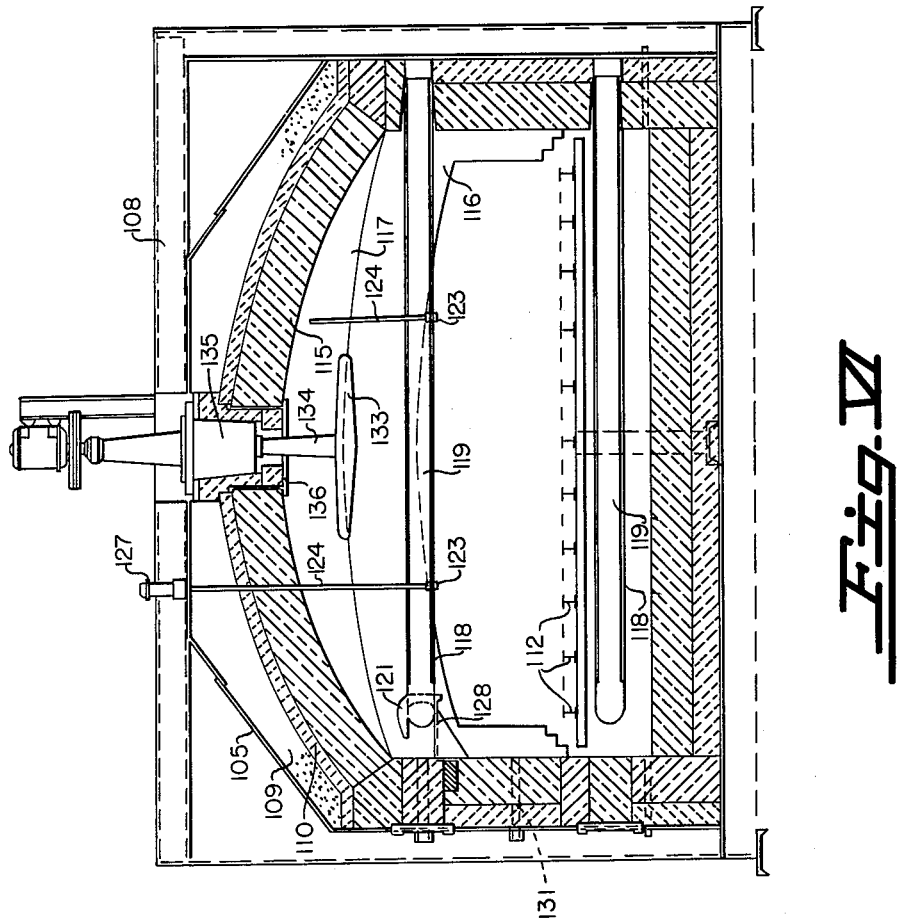

Filed May 5, 1958     30 Sheets-Sheet 6

Fig. VII

INVENTORS.
ERNEST G. DE CORIOLIS
BY PIERRE DE CORIOLIS, GUARDIAN
CLARKE C. SYKES
BY
Charles P. Haughey
ATTORNEY Aug. 29, 1961  E. G. DE CORIOLIS ET AL  2,998,237
HEAT TREATING SYSTEM
Filed May 5, 1958  30 Sheets-Sheet 7
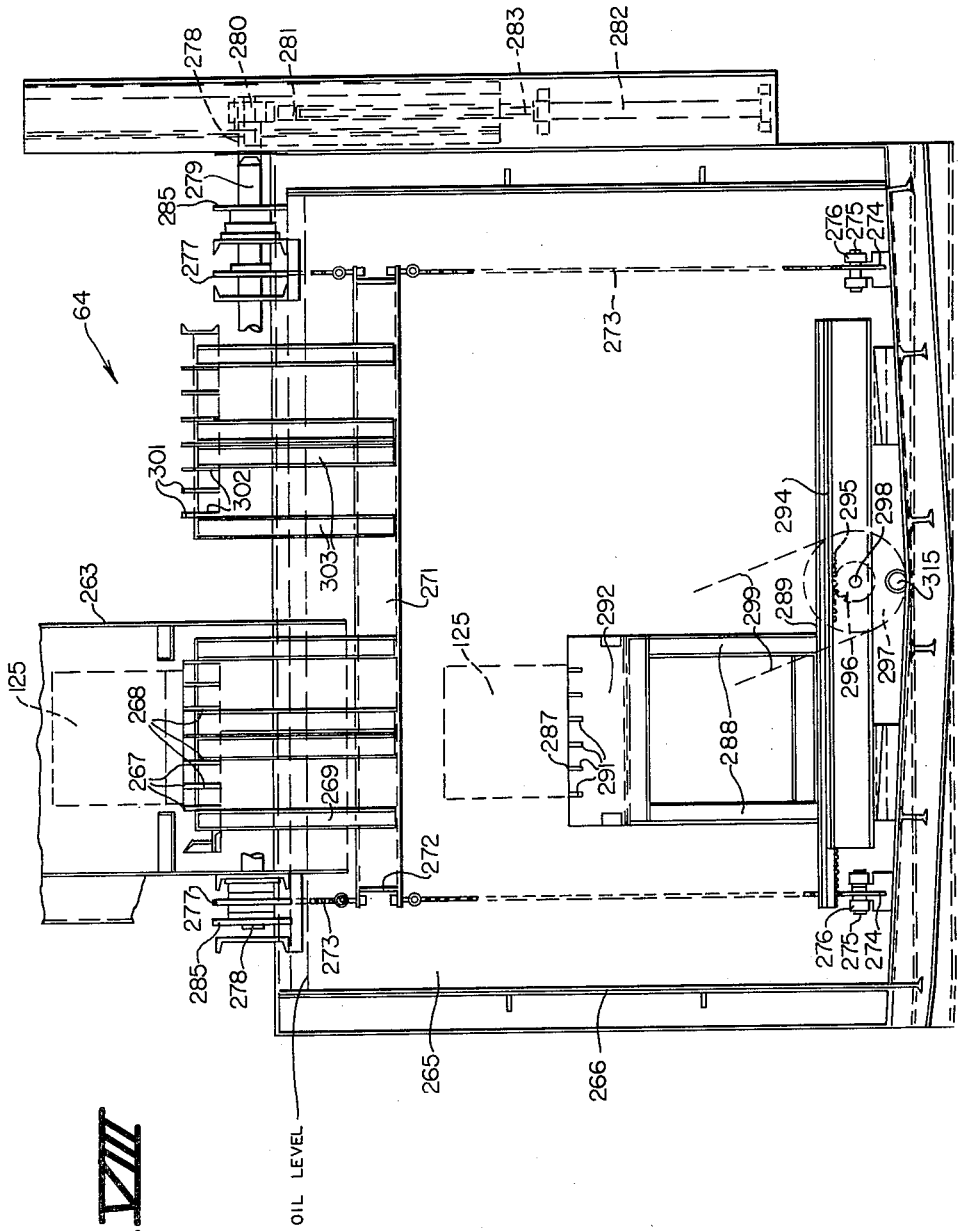
INVENTORS.
ERNEST G. DE CORIOLIS
BY PIERRE DE CORIOLIS, GUARDIAN
CLARKE C. SYKES
BY
Charles P. Haughey
ATTORNEY

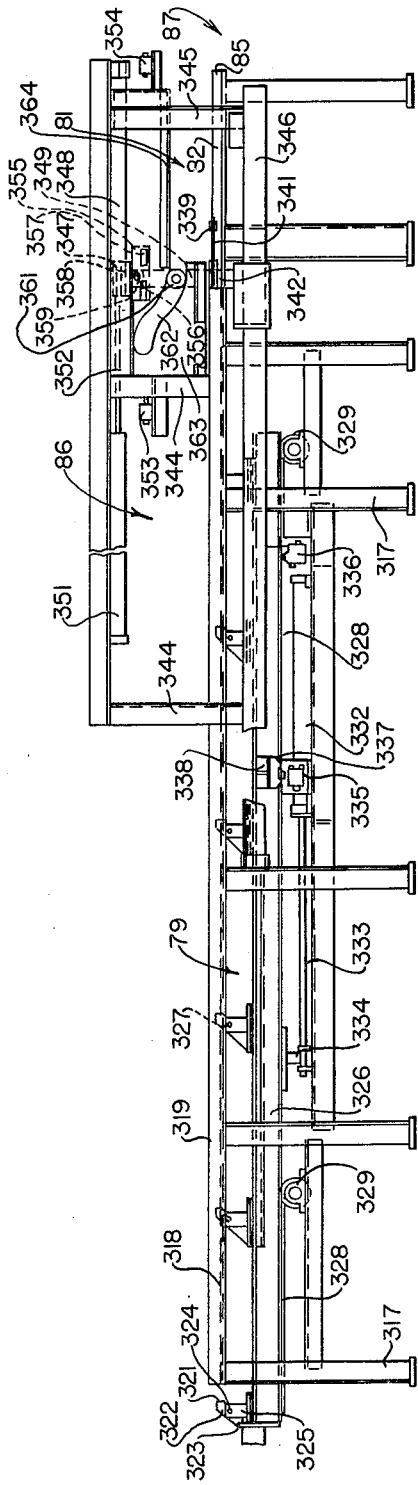

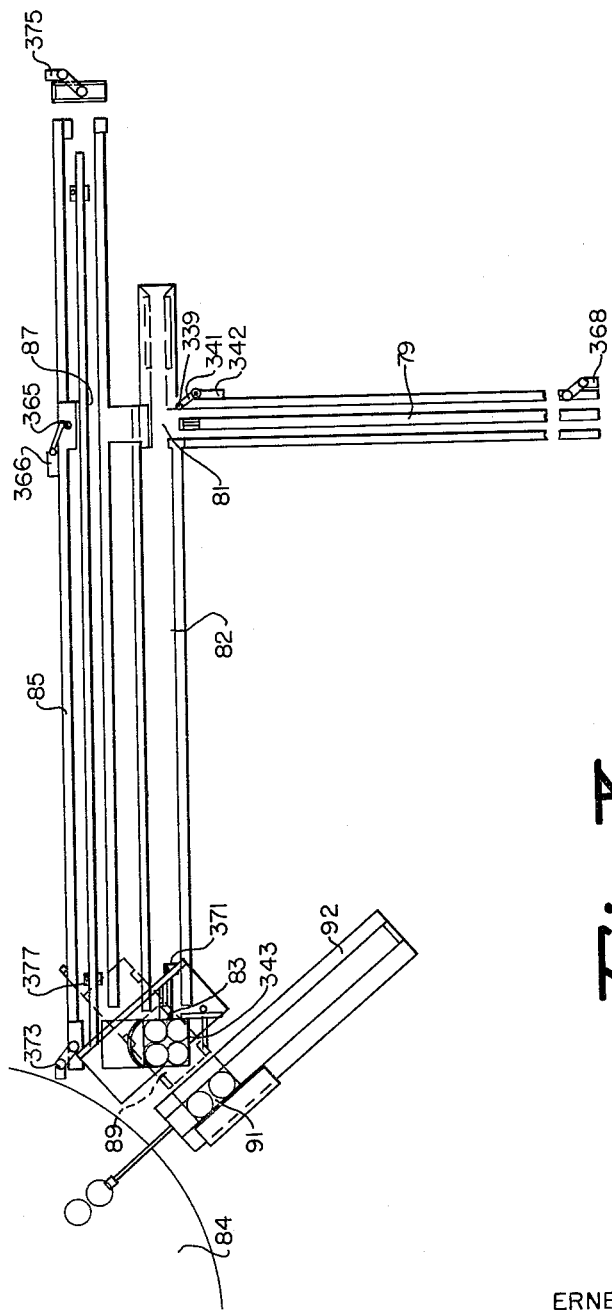

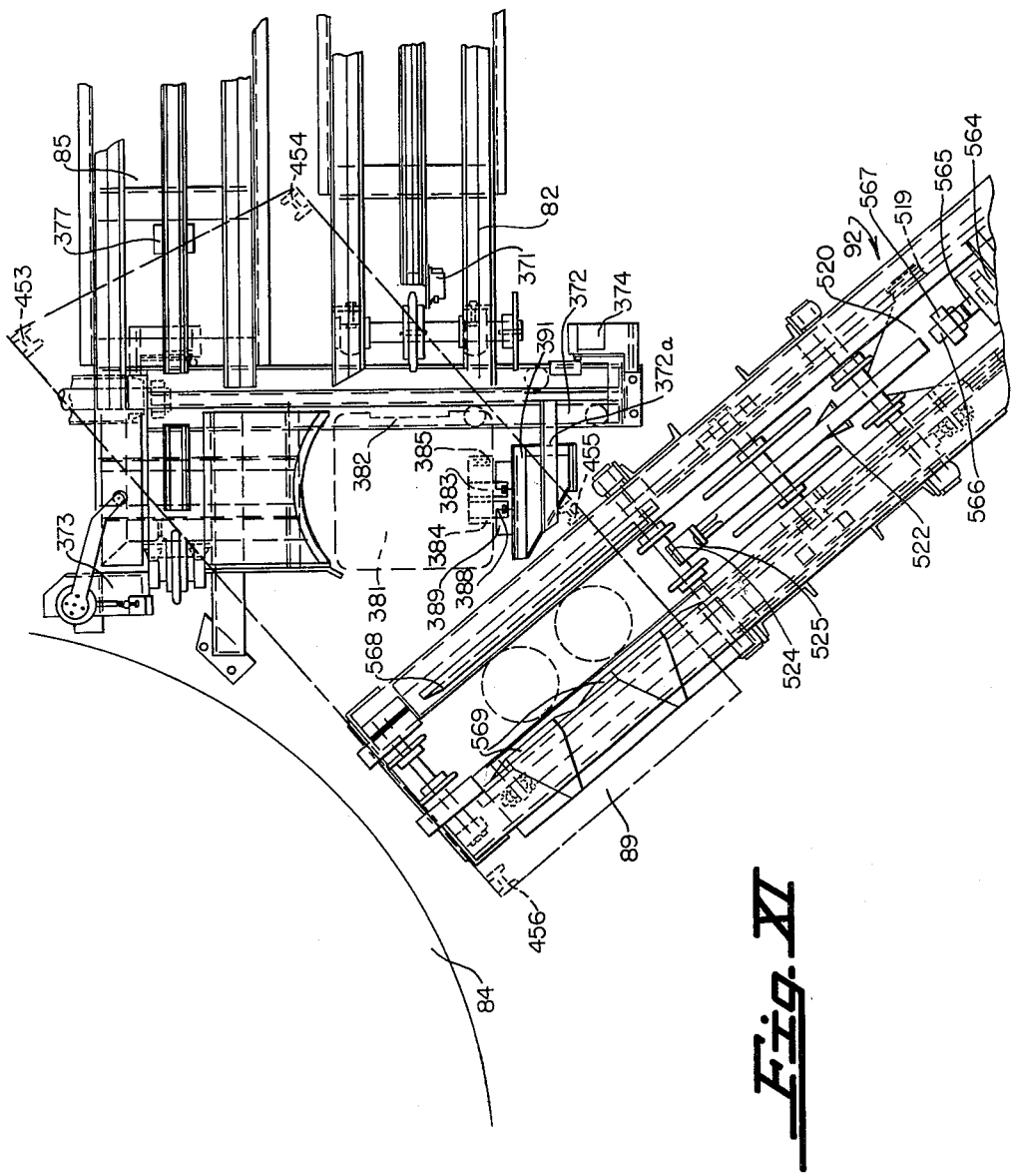

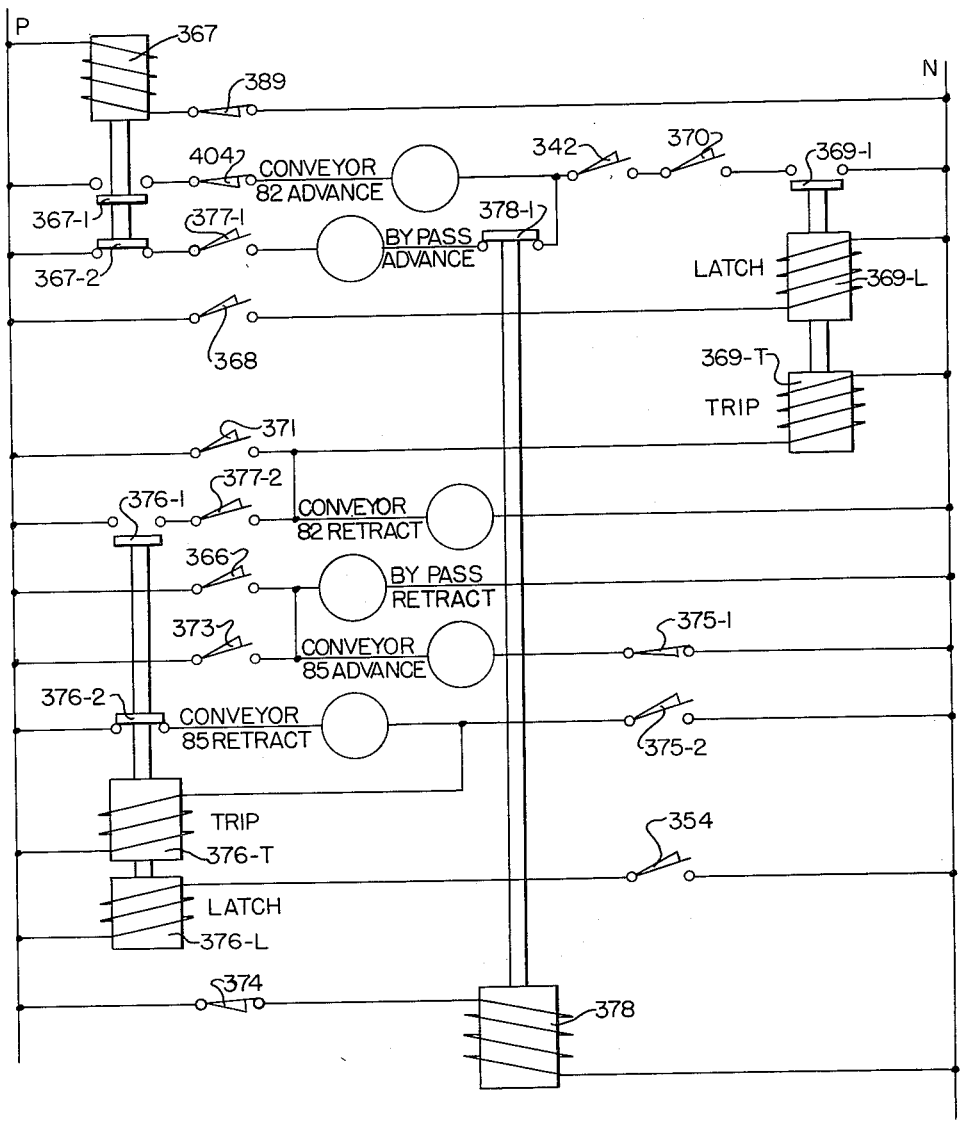
Fig. XII

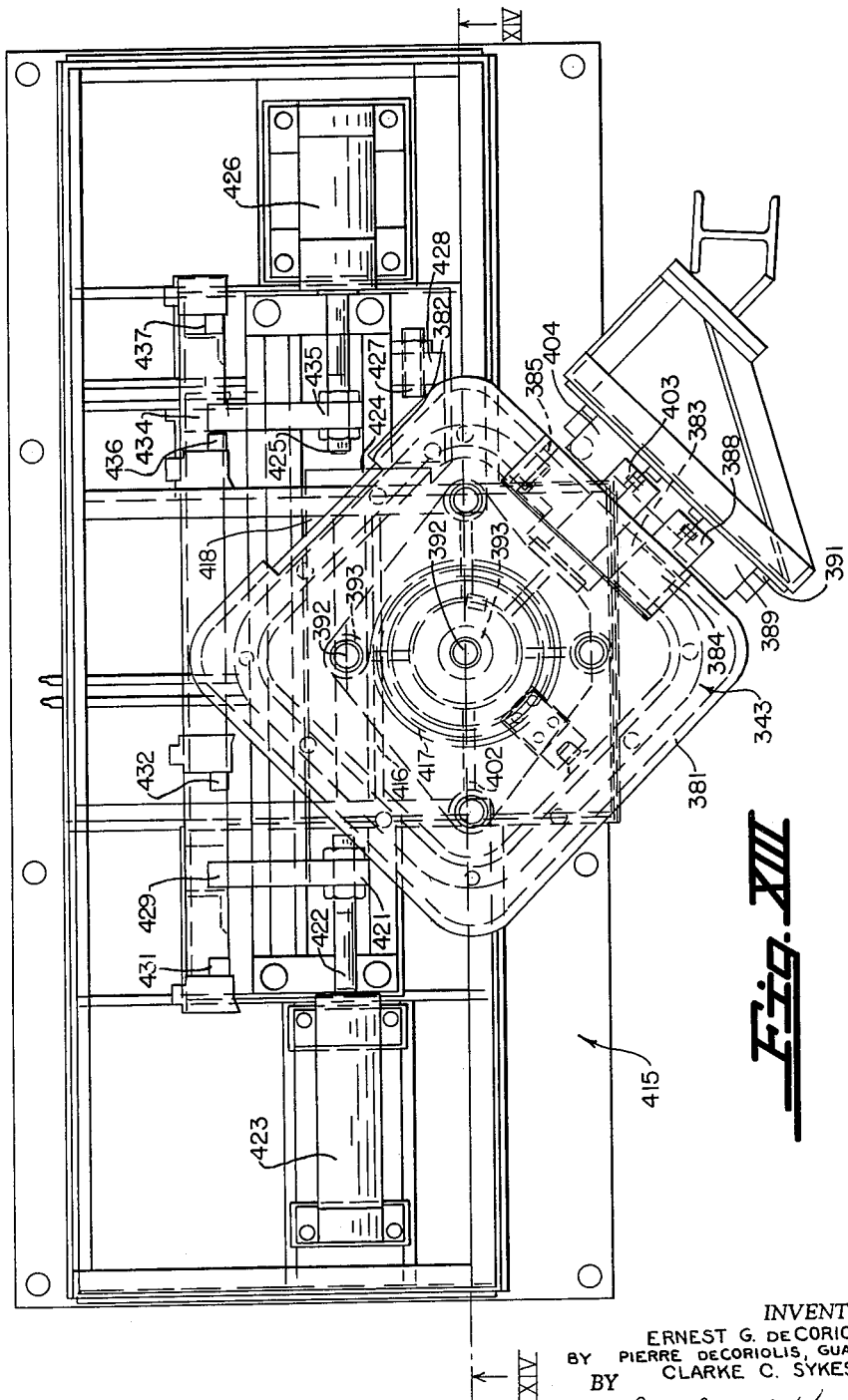

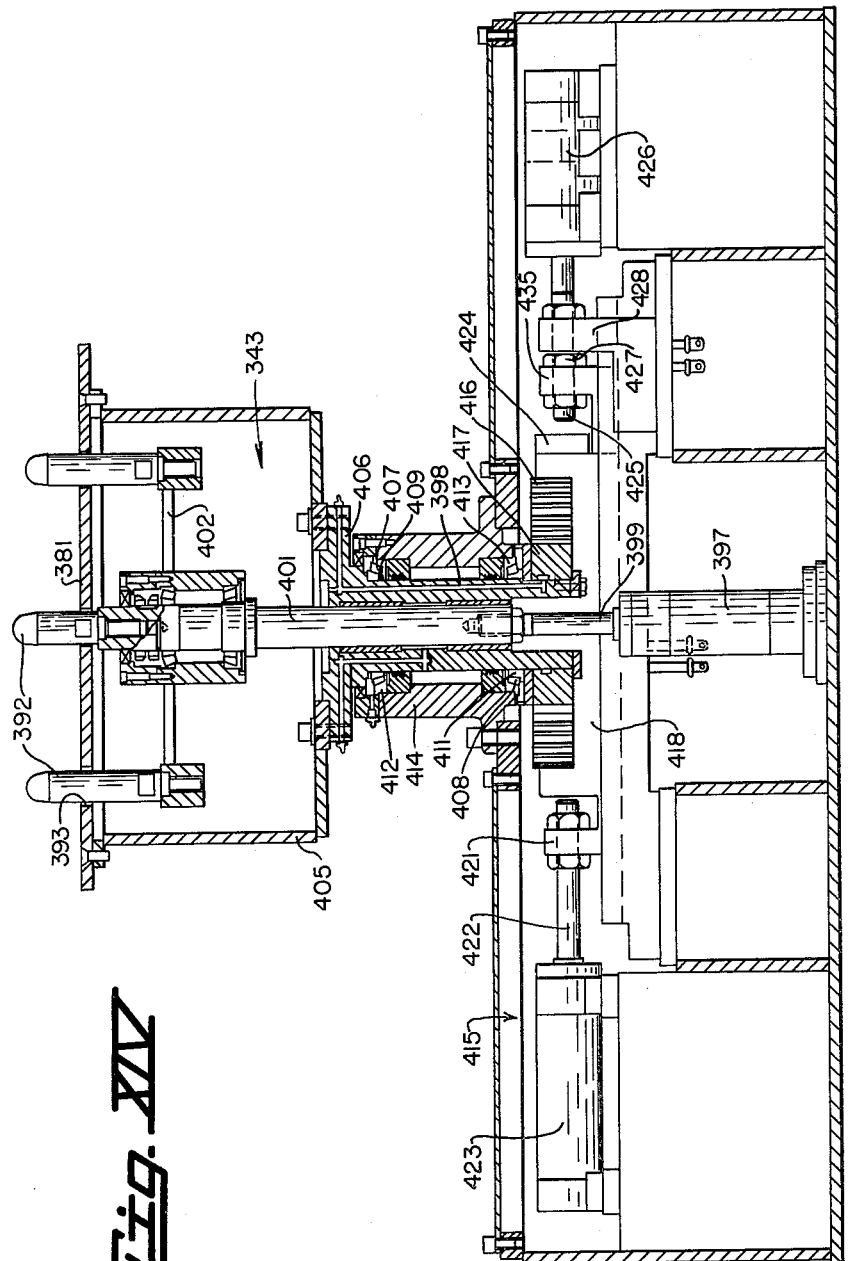

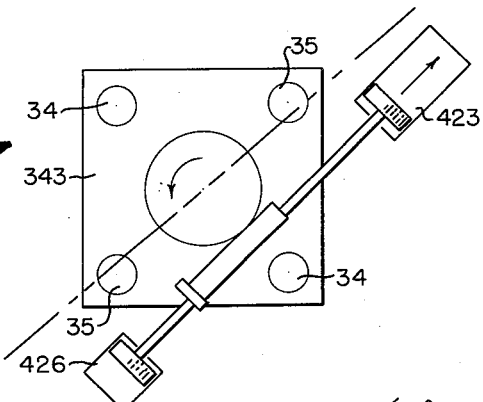
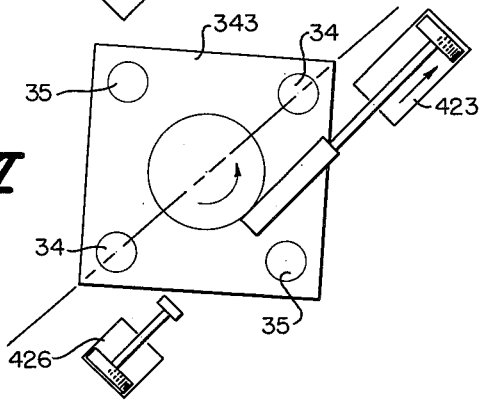
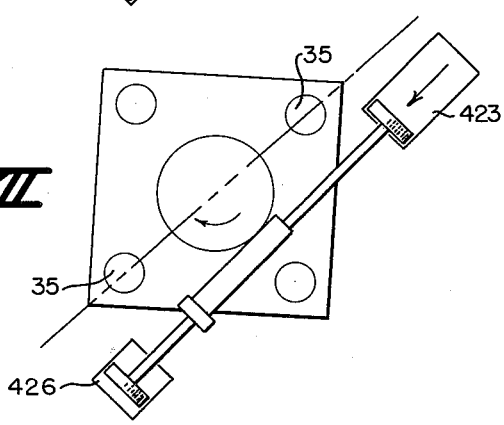

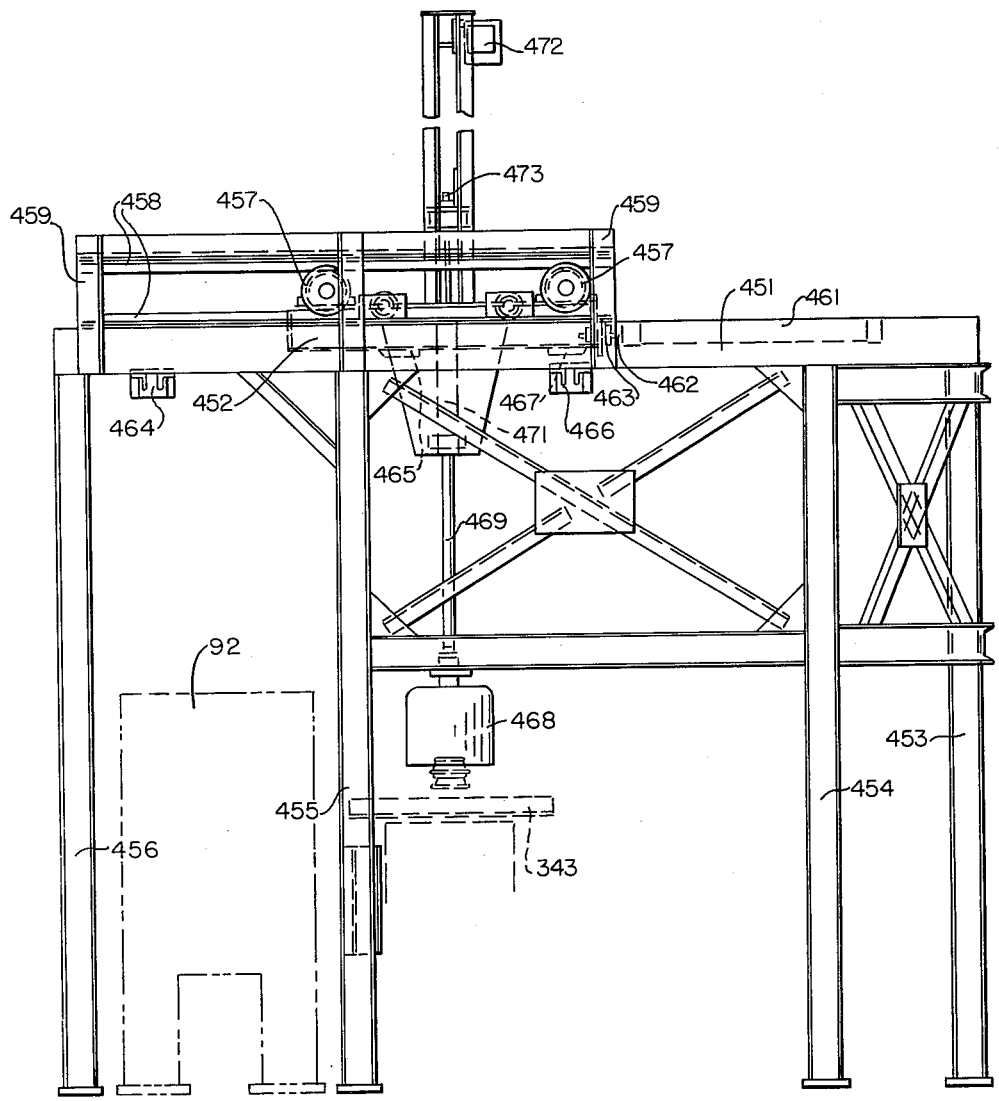
Fig. XVIII

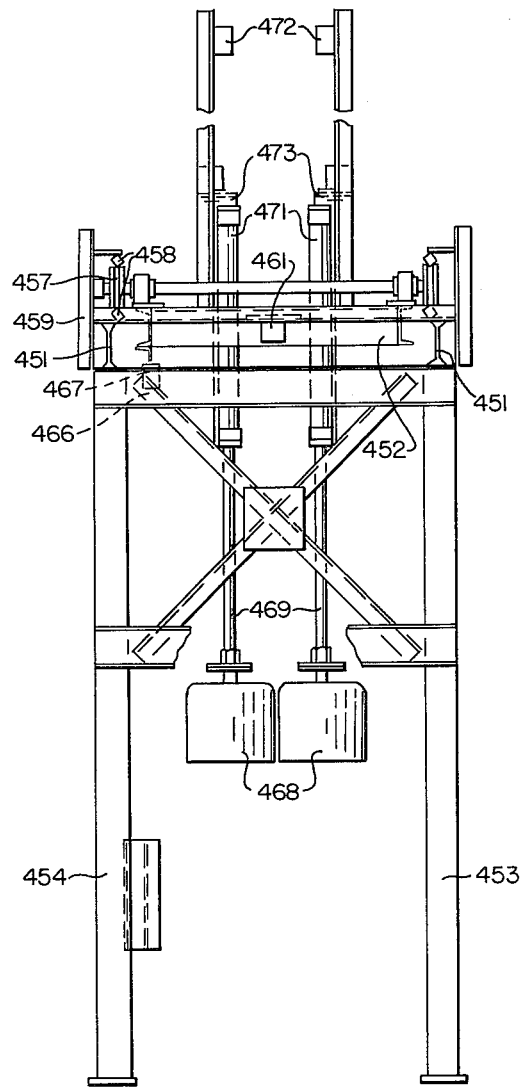
Fig. XIX

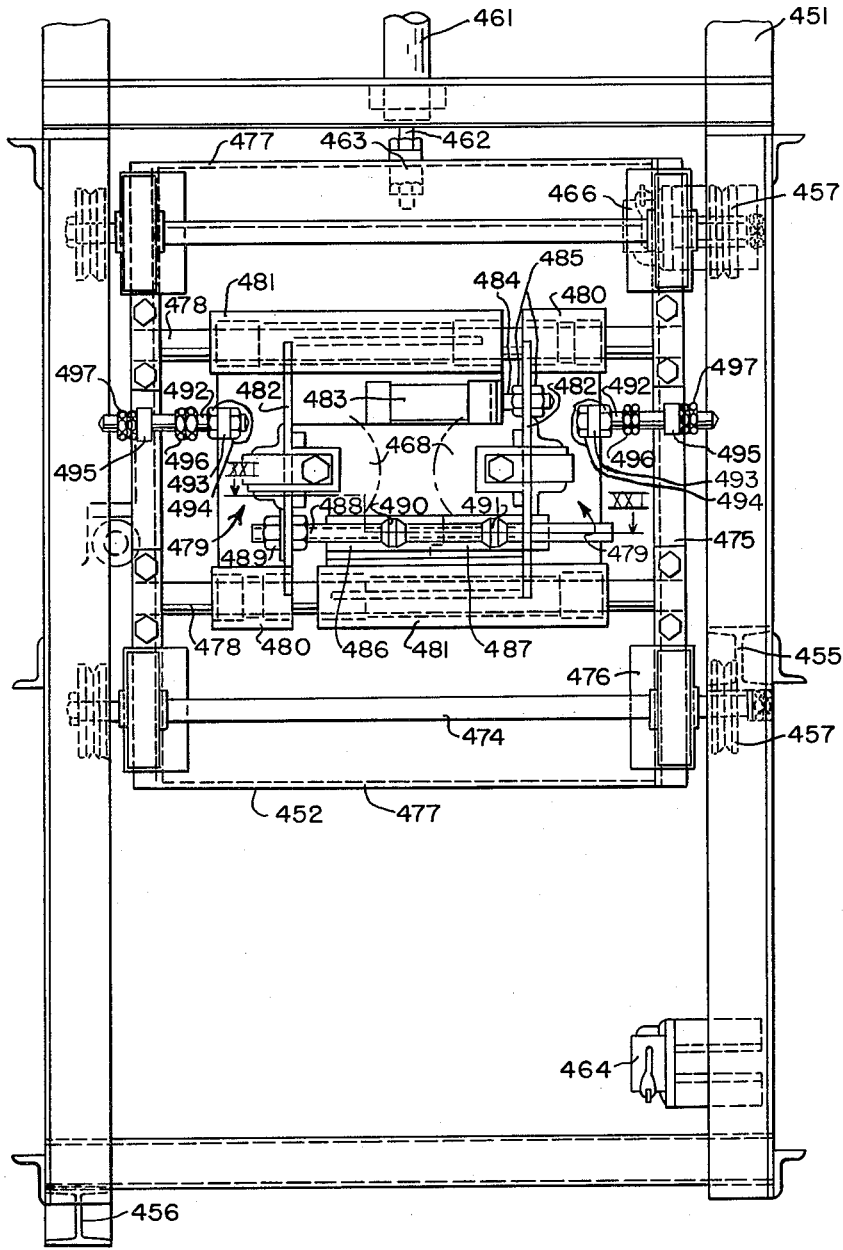
Fig. XX

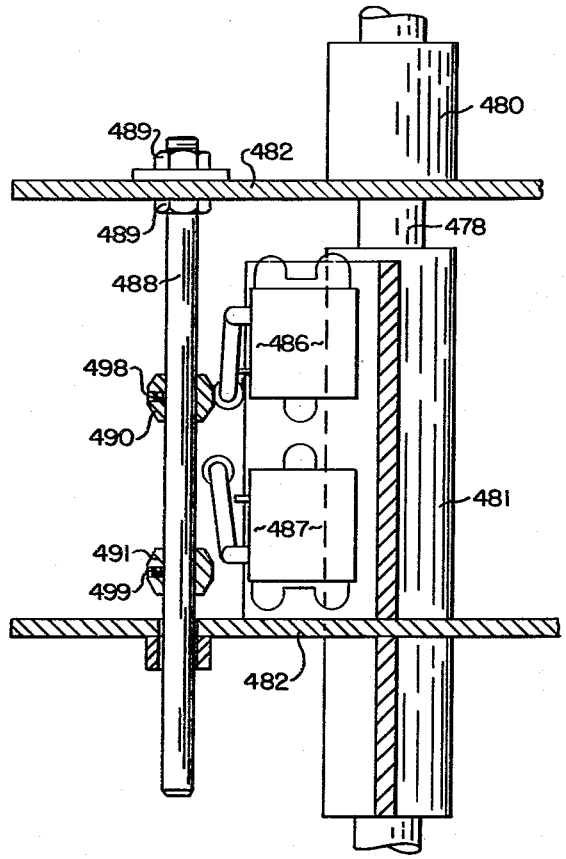

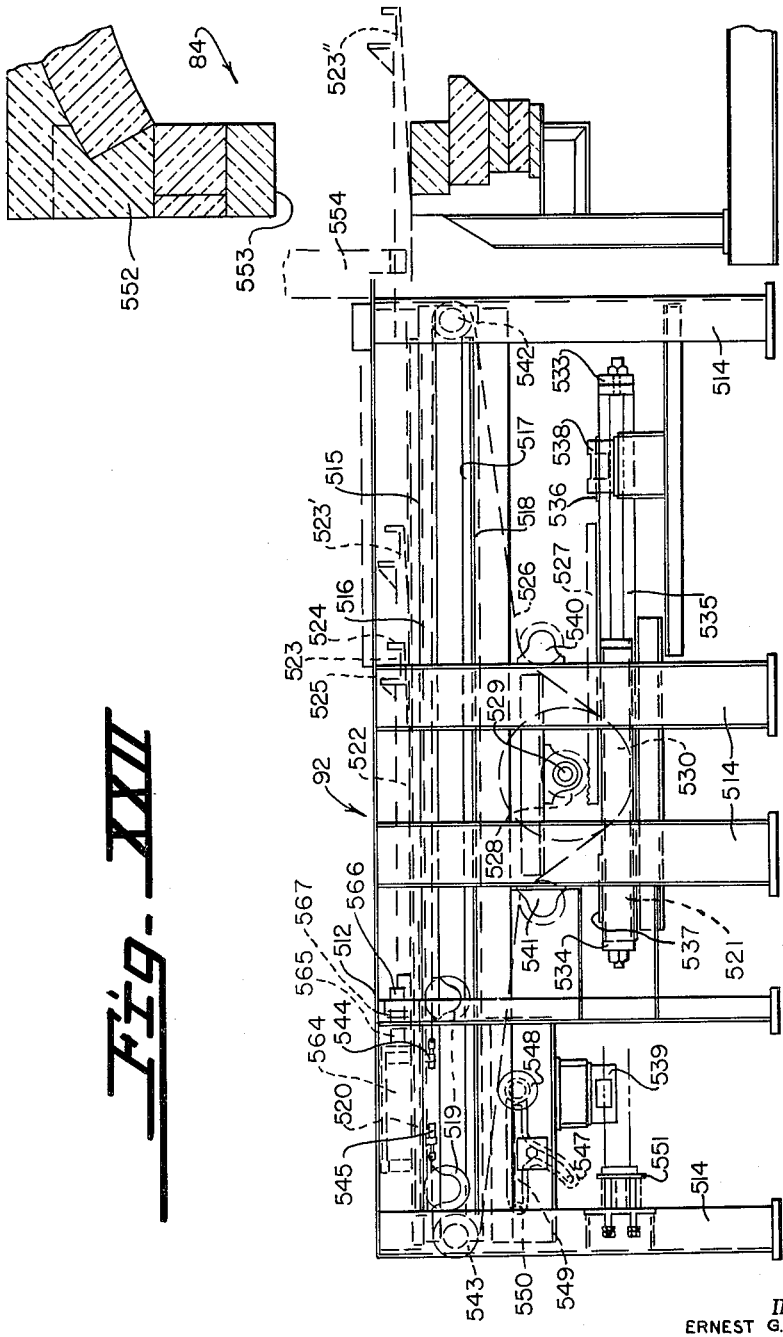

Aug. 29, 1961  E. G. DE CORIOLIS ET AL  2,998,237
HEAT TREATING SYSTEM
Filed May 5, 1958  30 Sheets-Sheet 20
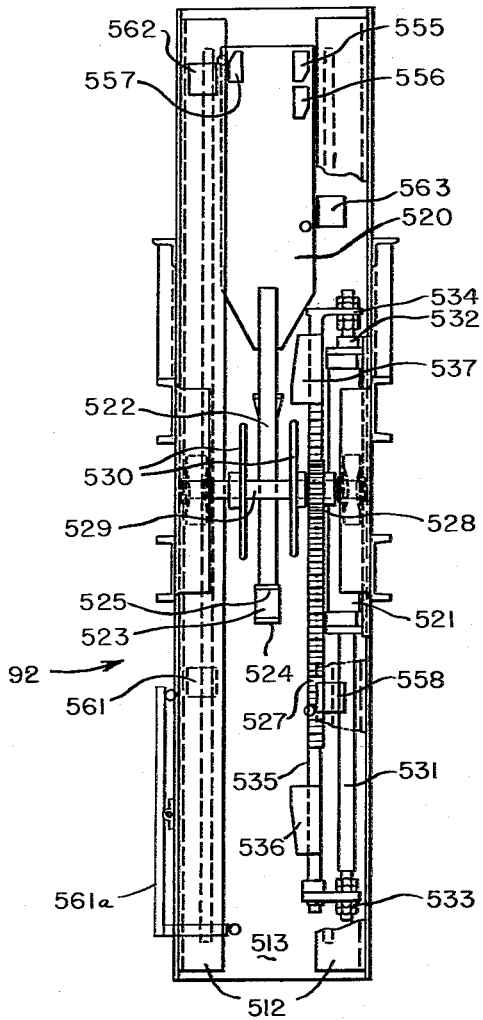
_Fig. XXIII_
INVENTORS
ERNEST G. DeCORIOLIS
BY PIERRE DeCORIOLIS, GUARDIAN
CLARKE C. SYKES
BY
Charles J. Haughey
atty.

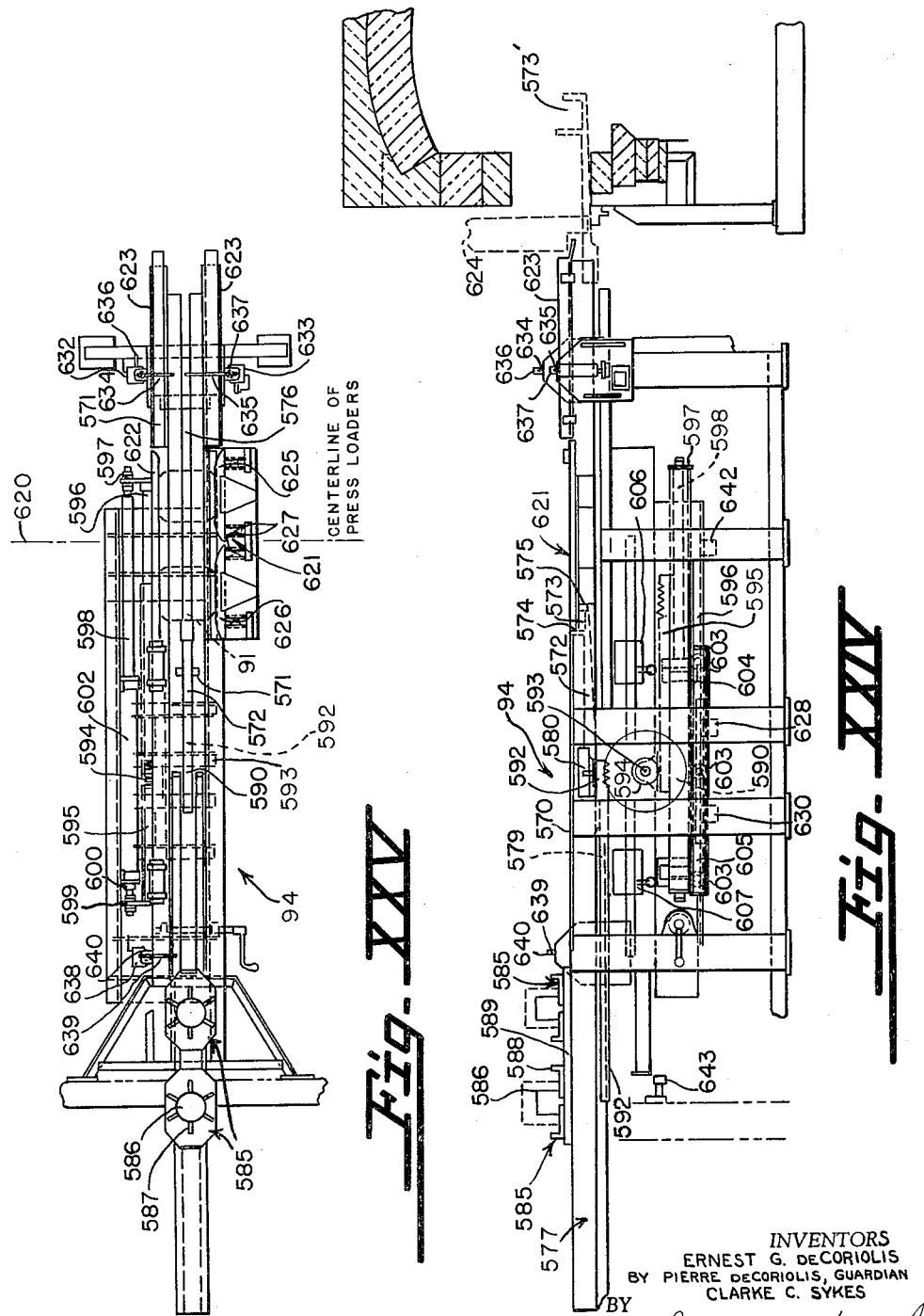

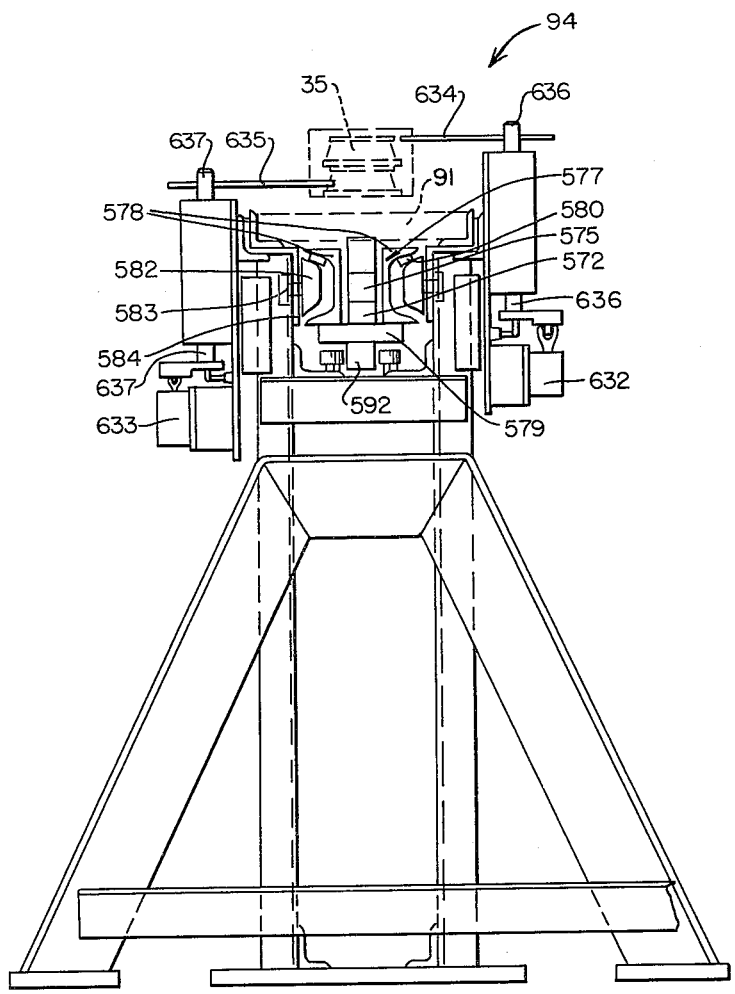
Fig. XXVI

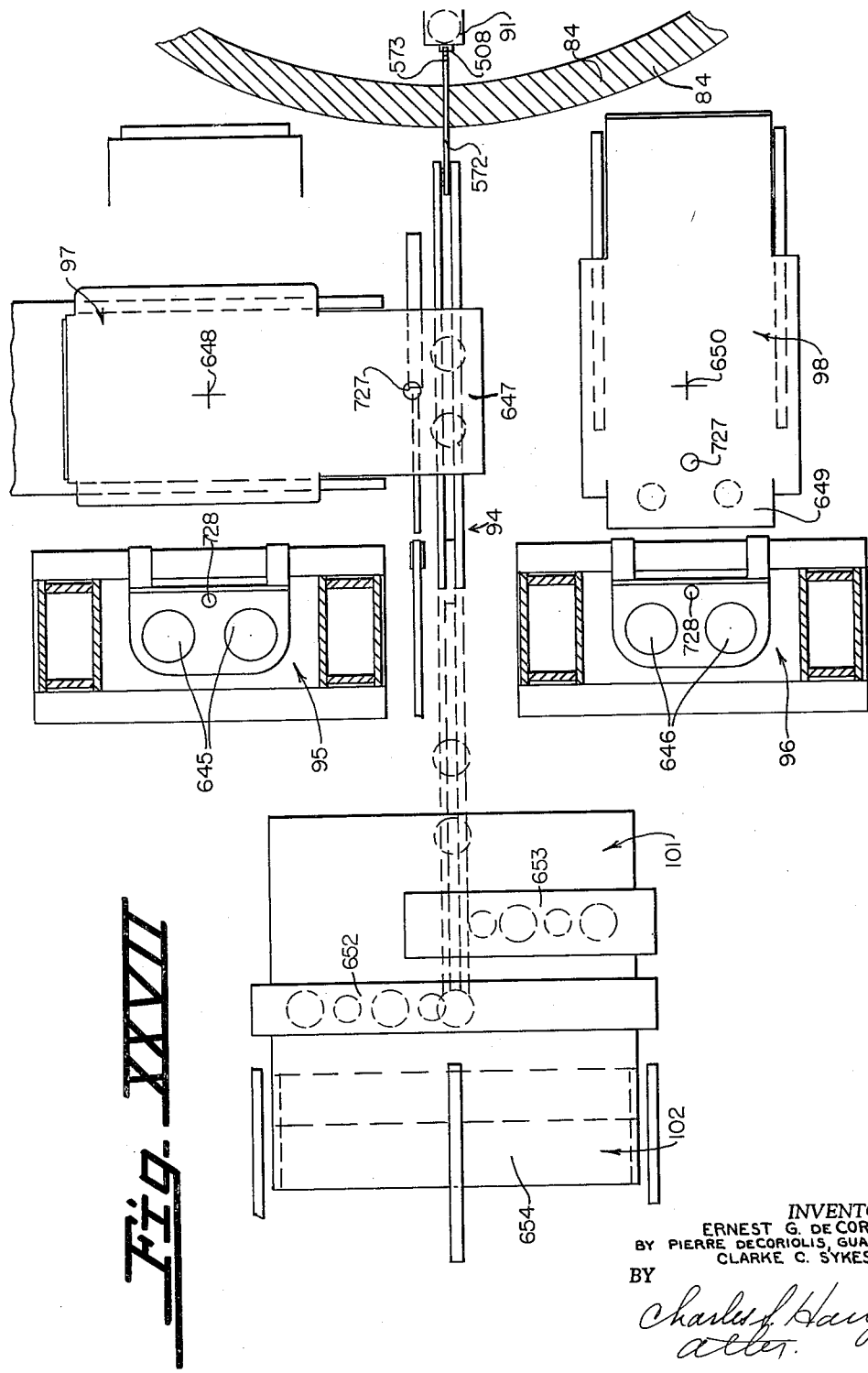

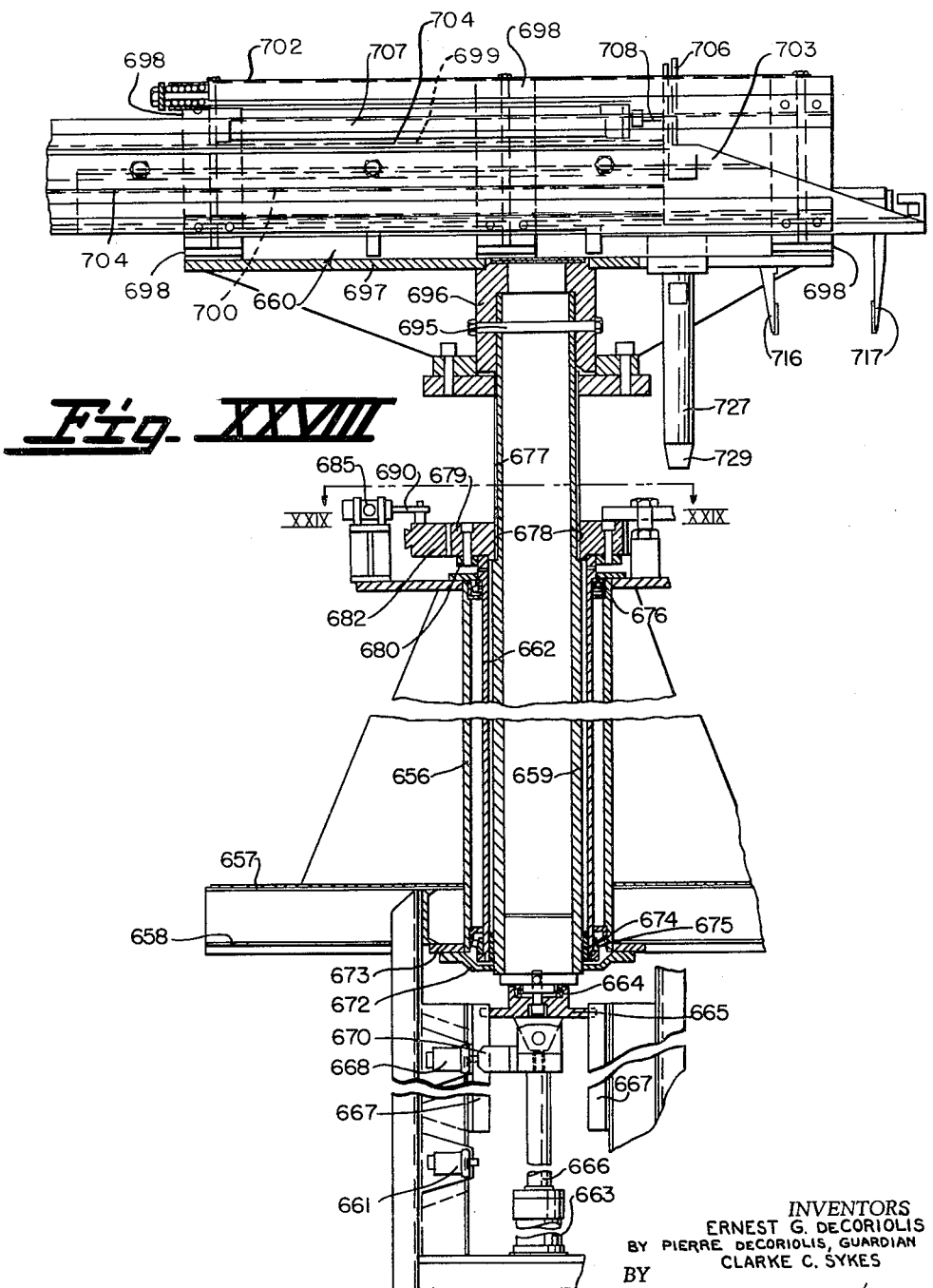

Aug. 29, 1961 E. G. DE CORIOLIS ET AL 2,998,237
HEAT TREATING SYSTEM
Filed May 5, 1958 30 Sheets-Sheet 25
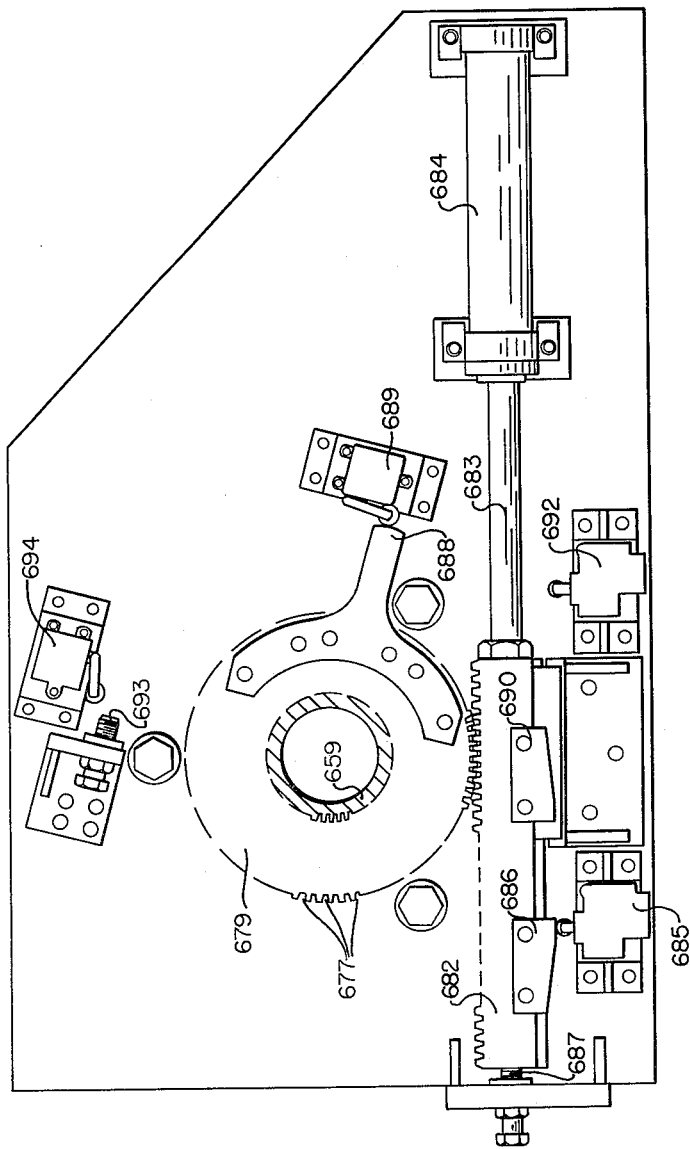
Fig. XXIX
INVENTORS
ERNEST G. DeCORIOLIS
BY PIERRE DeCORIOLIS, GUARDIAN
CLARKE C. SYKES
BY
Charles J. Haughey
atty.

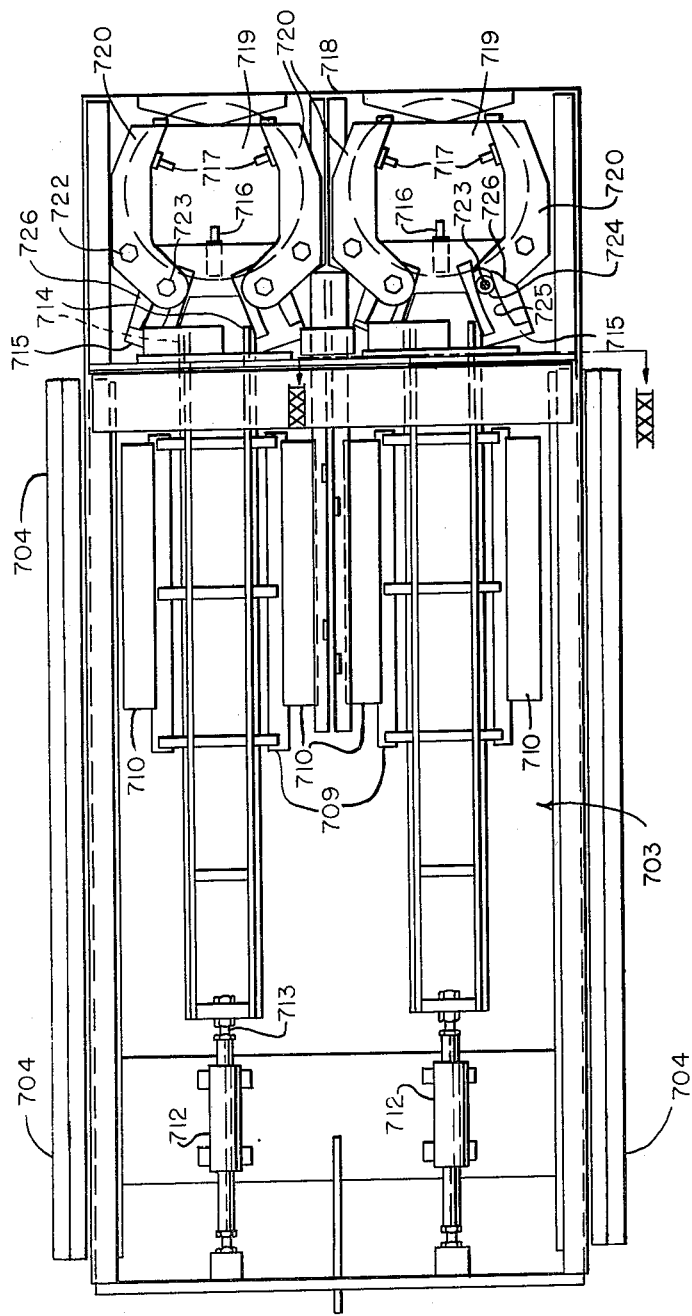

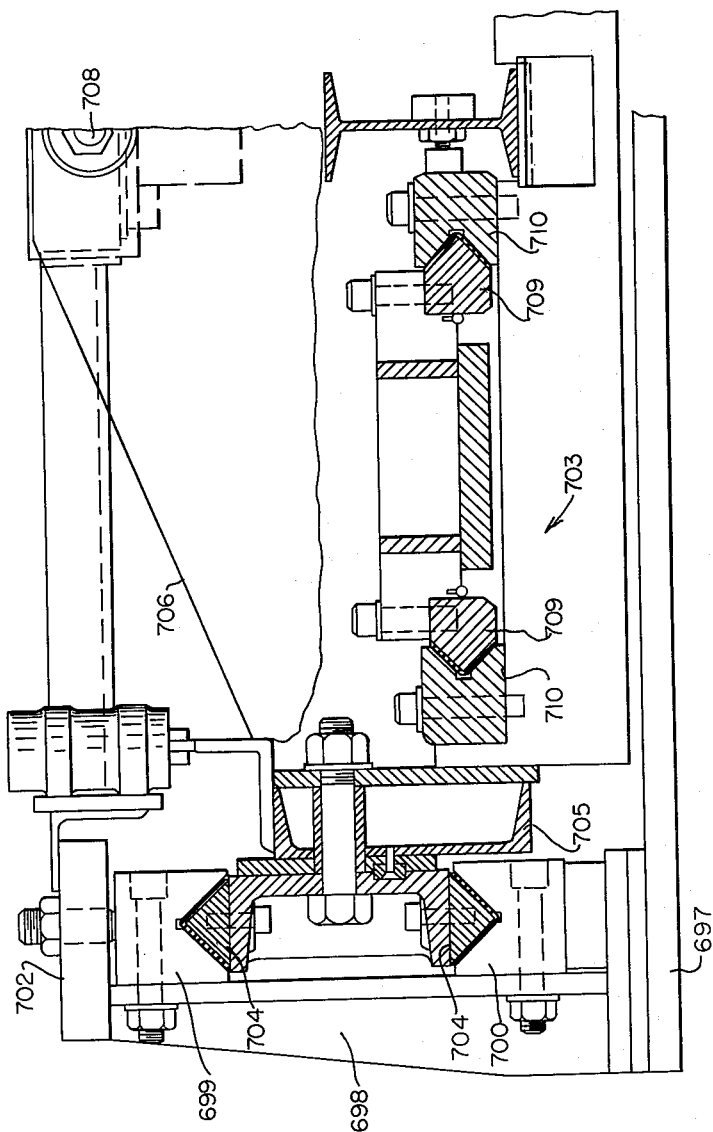

Aug. 29, 1961  E. G. DE CORIOLIS ET AL  2,998,237
HEAT TREATING SYSTEM
Filed May 5, 1958  30 Sheets-Sheet 28
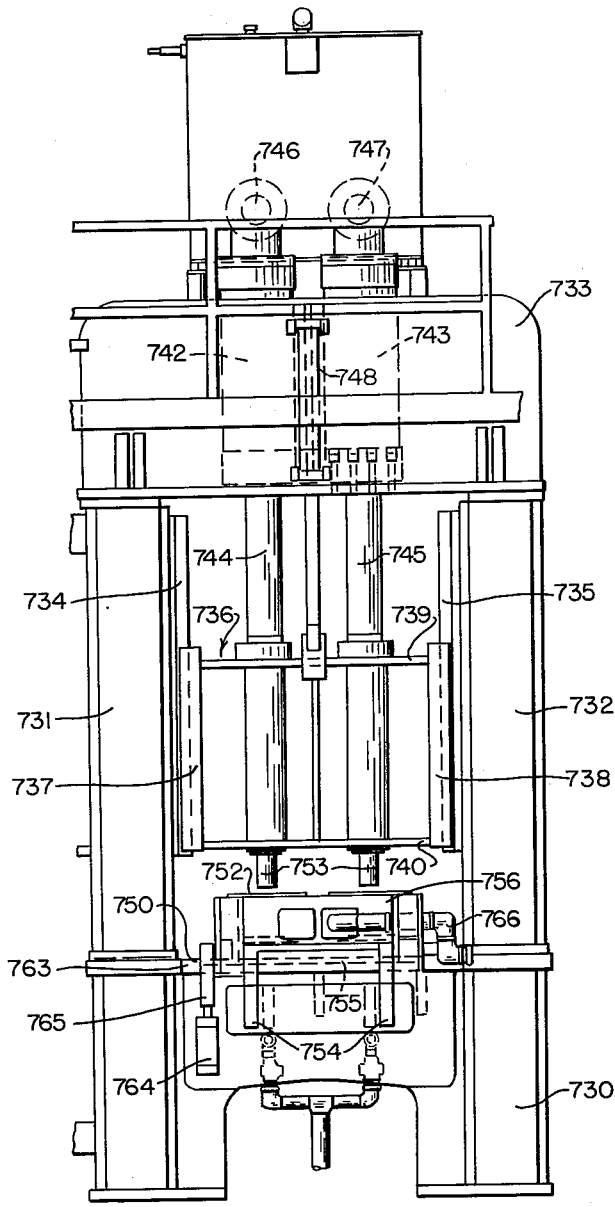
Fig. XXXII
INVENTORS
ERNEST G. DeCORIOLIS
BY PIERRE DeCORIOLIS, GUARDIAN
CLARKE C. SYKES
BY
Charles S. Haughey
atty.

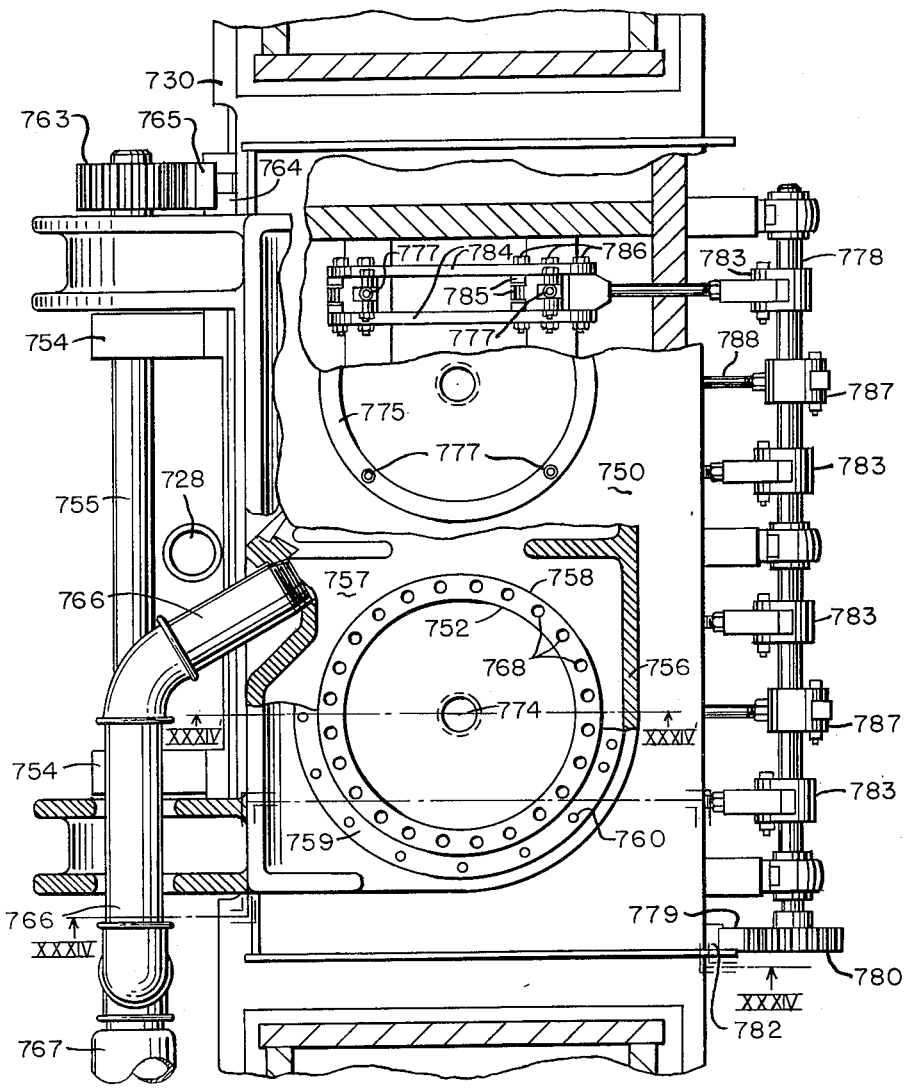
Fig. XXXIII

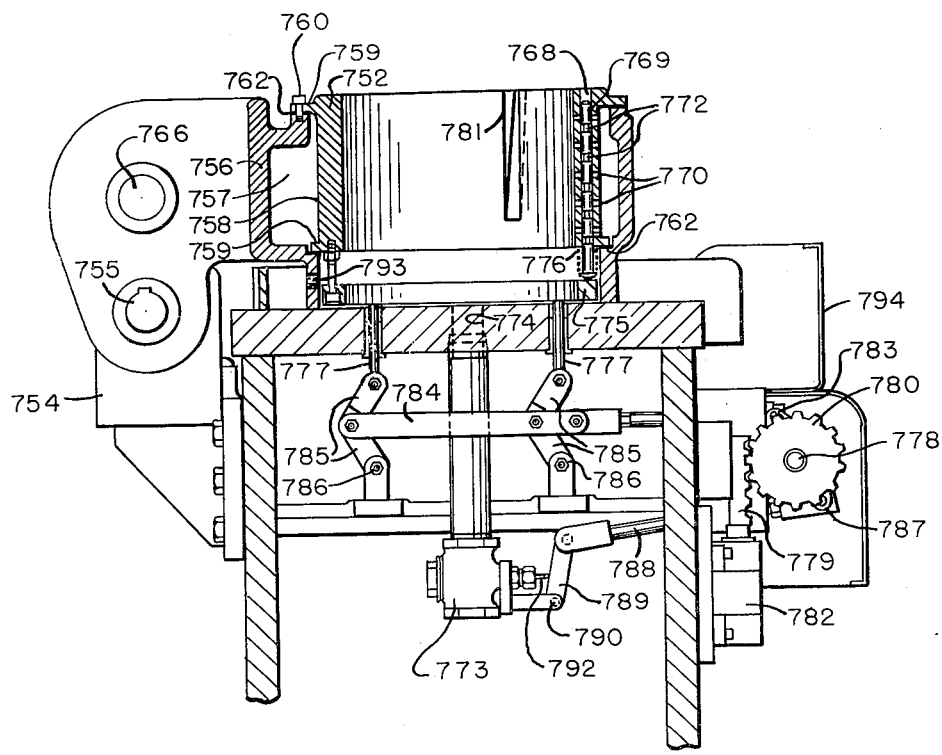
Fig. XXXIV

United States Patent Office 2,998,237
Patented Aug. 29, 1961

2,998,237
HEAT TREATING SYSTEM
Ernest G. de Coriolis, Toledo, Ohio, by Pierre de Coriolis, guardian, and Clarke C. Sykes, Toledo, Ohio, assignors, by mesne assignments, to Midland-Ross Corporation, Cleveland, Ohio, a corporation of Ohio
Filed May 5, 1958, Ser. No. 733,209
28 Claims. (Cl. 266—4)

This invention relates to means for heat treating metal articles and, more particularly, means for effecting automatically a plurality of heat treating steps involving successive heating and cooling of metal articles.

Heretofore, metal articles have been heat treated in a succession of steps. In such processes wherein the equipment for processing conforms to the shape of the articles, it has been necessary to restrict the processing to a single article form. One example of the heat treating apparatus of this type of which the invention is an improvement comprises that disclosed in Ernest K. Bastress patent application for "Metal Article Treating Apparatus," Serial No. 286,650 which was filed May 5, 1952, and is now Patent 2,822,162 which issued February 4, 1958. In this apparatus annular work pieces of like form are transferred upon inclined rails by rolling them on their periphery through a hardening furnace. Heating of the workpieces effects a desired composition change, usually in their surface regions, by modifying the effects of a preceding carburizing process. Once the workpieces have been heated over the necessary cycle, they are automatically transferred to a quench press platen; a quench ring is positioned around them to confine quench fluid to their vicinity; a mandrel is inserted within the open center of the annulus, and then the interior of the ring and the workpiece therein are flooded with quench fluid. The entire surface of the workpiece is flooded essentially instantaneously to avoid the development of undue strains. When cooling has been effected to the desired degree, the press is opened, and the workpieces are ejected in random fashion to a quench tank to complete the functioning cycle of the apparatus.

The apparatus of the present invention performs a combination of operations which are effected continuously and automatically on workpieces of different configurations which are maintained in a given orientation in accordance with their form throughout the processing. These operations are initiated by the introduction of sets of workpieces into a conveyor system which cooperates with the several pieces of apparatus performing individual heat treating functions, to carburize the workpieces, quench them as they are withdrawn from the carburizing furnace, subject them to a draw at an intermediate temperature, harden the carburized workpieces by a heat treating process followed by a rapid press quenching and then subejecting the quenched workpieces to a low temperature drawing operation. Washing and other ancillary functions are performed intermediate the major processing steps applied to these workpieces, all while maintaining synchronization of the workpieces through the combined apparatus such that they issue therefrom at a rate corresponding to their feed.

This apparatus is arranged to accommodate sets of workpieces of different configurations. Simultaneous processing of the cooperating elements of a mechanical unit in this manner insures that those elements will be subjected to the same process as regards furnace temperatures, processing atmosphere composition, quench fluid temperatures, and similar minor variations in parameters which affect the mechanical properties of the product such as deflection for a given loading and wearing characteristics. In the specific embodiment pairs of sets are processed in work units. In view of these different configurations and the utilization in the process of a press quenching step, the several forms of workpieces comprising each set must be fed to individual press quenching stations adapted to accommodate their particular configurations. In the illustrated embodiment the combination of workpieces are mounted on a common carrier for conveyance through certain processing steps wherein they require no unique treatment and the processing equipment is adapted to effectively operate on them. Subsequent to this common processing, the elements of like configuration of a work unit are segregated and are selectively fed to apparatus exclusively adapted to effect the process steps unique to those workpieces, for example, to individual pairs of press quenching stations suitable for their processing. Since in the specific example set forth, transfer from the hardening heat treating step to the quench station must be effected rapidly, it is advantageous to perform this segregation prior to the heat treating step and feed the pairs of elements as subunits of work to the hardening furnace from which they are subsequently withdrawn. The form of the subunits is monitored as they are withdrawn from the furnace, and appropriated press quench loading apparatus is controlled by the monitoring means to transfer the elements to the press quench expeditiously.

The apparatus for effecting a continuous carburizing and hardening process on sets of elements wherein the processing steps are synchronized and the workpieces are press quenched even though partially processed as work units including workpieces of unlike form embodies a number of unique features. The work units are conveyed as sets of workpieces of different configuration through a first portion of the process by means of trays upon which are locked fixtures for sustaining the several workpieces. The trays and combined fixtures are adapted to transfer the workpieces through a sequence involving carburizing, quenching, washing, a low temperature draw, and a washing operation in a compact array as possible yet permit selective loading and unloading, advantageously by magnetic means. Accordingly, the fixtures are provided with locking means to secure them to the tray whereby neither the several transfer operations to which they are subjected nor the magnetic unloading operation will disrupt their orientation with respect to the trays.

Segregation of the jointly processed workpieces of different character is accomplished in part by means of the work units each comprising a supporting tray with the workpiece or workpieces of like character in a given orientation on the tray. Each work unit is introduced to the system of conveying mechanisms and processing apparatus with an orientation corresponding to all other work units therein and is conveyed through portions of that system with the same manipulations as every other work unit so that it arrives at each station with the same orientation as every other unit. Segregation of workpieces for those operations within the system which are exclusively applicable thereto is effected by transferring them from the supporting elements to their individual processing stations in accordance with their location in the work unit at the transfer station.

The loaded trays are conveyed through a continuous carburizing furnace into which they are introduced by way of a sealed vestibule which is opened to admit the trays carrying the work units, is then closed and flushed of air by filling with the carburizing gases utilized in the carburizing furnace, and is then opened to the furnace so that the trays are introduced therein. The path the trays traverse through the furnace carries the work units through six zones each of which has its atmosphere controlled for optimum carburizing. They are transferred from the furnace by way of an exit chamber which is in sealed relationship to a quench tank transfer unit. Individual trays are withdrawn from the furnace into a hood which excludes the external atmosphere and has its lower portion open below the surface of the liquid in a quench tank. The trays are lowered from that chamber into the quench tank and transferred longitudinally of the tank to a position spaced from beneath the chamber hood so that when trays are raised from beneath the surface of the quench fluid they are outside of the hood and are in position to be conveyed to the next processing apparatus comprising a washer and thence to a draw furnace. The environmental atmosphere around the trays and workpieces as they are withdrawn from the draw furnace is controlled in a manner similar to that described for the withdrawal from the carburizing furnace to avoid undue oxidation by lowering them into a hooded quench tank adjacent the exit from the furnace and moving them from beneath the hood while immersed in the quenching liquid in the tank.

At the time the workpieces are extracted from the draw furnace they are prepared for reheating in a hardening furnace from which they are rapidly fed to appropriate quench presses. Since the pairs of like workpieces of a work unit are supported on the trays on given individually spaced centers and since the hardening furnace orientation with respect to the conveyors employed for the trays is not aligned so that its feed path is in alignment with the pairs of workpieces, the trays must be critically positioned adjacent the furnace in order to effect the segregation of like workpieces prior to their admission to the furnace. This orientation is effected by a turn table upon which the trays are indexed during its segregation. Magnetic loaders are provided in cooperation with the turn table so that pairs of electromagnets can be lowered onto the workpieces in order to lift them from the trays and supporting fixtures. The pair of lifting magnets of the loader can be spaced on appropriate centers for registering with the pairs of like workpieces on the tray. Thus, the tray is oriented with respect to the entry to the hardening furnace. The magnetic loader is oriented to position a pair of electromagnets on appropriate centers above the pair of workpieces to be transferred; the loader lowers those magnets and energizes them to attract the workpieces, and the magnets are raised and advanced transverse of the tray position to a furnace loading shuttle.

The paired workpieces are transferred to paired trays which are coupled together so that their separation can be altered within limits defined by the requirements of the apparatus with which they are associated. The minimum tray separation is utilized in the hardening furnace to maintain the furnace dimensions at a minimum, and the maximum separation is employed while the trays are being unloaded and the workpieces transferred to the quench presses so that workpiece spacing corresponds to quench station spacing within the multistation presses. Conveniently a uniform spacing of the paired trays is established on the charge shuttle in positioning the trays for reception of workpieces from the loader. It is advantageous to make this spacing the minimum particularly where that minimum is the same as the shorter spacing of workpieces on the carburizing trays since only one repositioning cycle of the loader heads is required for each carburizing tray unloaded. Once the extensible tray portions have been loaded by lowering the magnets to place the workpieces on appropriate tray portions, the magnets are deenergized to release the workpieces and are raised to disengage them from the workpieces. The extensible tray is then pushed into the hardening furnace by the loading shuttle and is released by the loading shuttle so that during the cyclic operation of the furnace the tray is moved away from the shuttle and a new tray which has just previously been unloaded is engaged by the shuttle for utilization in the next tray unloading operation.

A rotary hearth hardening furnace has been employed to effect the hardening heat treatment. In this furnace the loaded trays are carried in a plurality of discrete steps through an arc of about 320° from a hearth radius aligned with the furnace charge shuttle to a hearth radius aligned with a furnace discharge shuttle. Each step of the rotary hearth moves a pair of loaded trays from the charge shuttle radius and moves a pair of unloaded trays onto that radius so that they can be withdrawn, loaded, and replaced in the furnace.

Upon completion of the hardening furnace cycle, the loaded extensible trays are engaged by a portion of a discharge shuttle. This discharge shuttle withdraws the trays from the hardening furnace so that the first and second portions of the trays separate to a fix separation which corresponds to the separation of the quench press stations to which the workpieces are to be transferred. While being withdrawn by the discharge shuttle, the workpieces are carried past a sensing station immediately adjacent the hardening furnace exit. At this sensing station controls are actuated to insure that the proper quench press loader is conditioned to receive those elements. This loader then positions the workpieces in proper position for engagement by the mandrels of the quench press stations and actuates the quench press to flood the loaded stations with quenching fluid. When press quenching has been completed, the press loader removes the workpieces from the press and positions them on the discharge shuttle which at that time has been repositioned to return the emptied trays to the furnace and, after the furnace advances another step, withdraw another charge of workpieces from the hardening furnace. As the second charge of workpieces is withdrawn by the discharge shuttle, the quenched workpieces are advanced to a washing station from which they are removed by a conveyor element and sent through a low temperature draw and final quench and washing steps.

A surge point is provided in the automatic heat treating apparatus to enable the processing within the carburizing furnace to be continued despite any delay at the magnetic loader or equipment subsequent thereto. Normally the carburizing and high temperature draw cycles are synchronized with the hardening, press quench, and low temperature draw operations so that during the interval that one carburizing charge is introduced in the apparatus an equivalent number of sets of workpieces issue from the low temperature draw at the end of the apparatus. Accordingly, in the absence of some means of absorbing that work a delay at the hardening furnace or any subsequent point would cause work to accumulate and back up in the preceding apparatus and thus in the carburizing furnace. The conveyor between the high temperature draw furnace and the hardening furnace provides such a surge absorbing means. Sensing means are embodied in that conveyor to sense the introduction of a tray of workpieces to a portion of that conveyor, which can be considered a transfer station between cooperating conveyor sections, and to sense the presence of a tray on the conveyor unloader. If the conveyor unloader is not in a condition to accept the available tray of workpieces, as indicated by the coincident operation of the two sensing means, a by-passing conveyor is actuated to shunt the work unit around the unloader and onto another conveyor which normally returns emptied carburizing trays from the unloader to the loading station adjacent the entry to the carburizing furnace. Since the cycles involved herein are of the order of hours in length, an attendant for the apparatus will observe the presence of loaded trays on the return conveyor and can take appropriate measures to remove the carburized workpieces therefrom prior to those trays reaching the loading station. The workpieces shunted past the loading station in this manner can be fed to the hardening furnace and press quenching elements of this apparatus at some subsequent time when workpieces are not issuing from the carburizing unit at the capacity rate of the hardening and press quench units.

In accordance with the above one object of this invention is to automatically and continuously carburize, hardened, and press quench articles.

A second object is to process essentially simultaneously articles requiring common and unique processing steps in a single processing system.

Another object is to heat treat articles of different configurations in a single process while maintaining the articles distinct where such segregation is essential for proper processing.

Another object is to minimize the labor required in carburizing, heat treating and quench pressing articles.

An additional object is to facilitate the heat treating of metal articles.

An additional object is to position workpieces in several successive optimum positions at different process stations in automatic processing apparatus.

Another object is to segregate workpieces of different forms which have been processed together so that they are conveniently and expeditiously routed to apparatus uniquely adapted to accommodate their forms.

An additional object is to accurately index the position of workpieces which are conveyed as work units wherein some latitude in the position of the workpieces within the work unit is afforded.

A further object is to expeditiously and effectively convey work units through the series of processing stations in a processing apparatus.

The above and additional objects and features of this invention will be more readily appreciated from the following detailed description when read with reference to the accompanying drawings wherein:

FIG. I is a schematic or block diagram of the overall apparatus of this invention showing the pattern of flow of work units and individual workpieces therethrough;

FIG. II is a plan view of a tray with a mounted representation of the cooperating fixtures for carrying a pair of sets of workpieces, hereafter referred to as a work unit, through portions of the apparatus;

FIG. III is a broken sectioned elevation of the tray, and mounted fixtures and workpieces of FIG. II taken along the line III—III of FIG. II;

FIG. IV is an elevation of the tray loading station, tray pushoff, the first tray conveyor and fragments of the tray pushoff to a second conveyor with parts broken to reduce the drawing size;

FIG. V is a sectioned longitudinal elevation of the carburizing furnace of this apparatus which, in the interest of maintaining the drawings compact, has been broken to eliminate portions of the furnace which are duplicated;

FIG. VI is a cross section of the carburizing furnace of FIG. V taken along the line VI—VI of FIG. V;

FIG. VII is a cross section of the carburizing furnace at its exit end taken along the line VII—VII of FIG. V showing the furnace seal and its relationship to the quench tank and transfer mechanism therefrom;

FIG. VIII is a longitudinal sectional view of the quench tank at the exit of the carburizing furnace taken along the line VIII—VIII of FIG. VII with portions broken away to show the means for effecting the sealed transfer of work units from the furnace;

FIG. IX is an elevation of the conveyor for transmitting loaded trays from the exit of the draw furnace and includes the mechanism for bypassing or shunting trays around the loading apparatus for the hardening furnace;

FIG. X is a schematic plan view showing the relationship of the conveyors for the trays, the turn table for orienting the trays for unloading, the magnetic loader, the reheat furnace and the charge shuttle for receiving the pairs of workpieces from the magnetic loader and inserting them in the reheating furnace;

FIG. XI is a schematic plan showing the relationship of the turn table and cooperating loader to a more detailed representation of the charging shuttle, and portions of the conveyors in their vicinity;

FIG. XII is a spindle type wiring diagram of the sensing means and controls shown in FIGS. IX, X and XI;

FIG. XIII is a detailed plan of the turn table illustrated schematically in FIGS. X and XI;

FIG. XIV is an elevational view of the turn table of FIG. XIII sectioned along the line XIV—XIV to better illustrate the interrelationship of the several elements;

FIGS. XV, XVI and XVII are schematic views of the turn table and its actuating means as conditioned for accepting and discharging the trays, unloading a first pair of workpieces of like character from the trays and unloading a second pair of workpieces of like character but different from the first workpieces from the trays;

FIG. XVIII is a side elevation of the magnetic loader with portions thereof broken away to better illustrate the operative relationship of the parts;

FIG. XIX is a partially broken away end elevation of the magnetic loader of FIG. XVIII;

FIG. XX is a plan view of the magnetic loader of FIG. XVIII;

FIG. XXI is an enlarged portion of the magnetic loader carriage in section taken along lines XXI—XXI of FIG. XX.

FIG. XXII is a side elevation of the charge shuttle for moving the extensible trays into and out of the hardening furnace;

FIG. XXIII is a plan of the charge shuttle with certain details eliminated to better illustrate the drive and control mechanisms;

FIG. XXIV is a side elevation of the discharge shuttle for moving the extensible trays and the workpieces from the hardening furnace to the quench press loaders and for moving the quenched workpieces from the quench press loaders to the final washing and drawing stations of the apparatus;

FIG. XXV is a plan view of the discharge shuttle of FIG. XXIV;

FIG. XXVI is an enlarged end view of the discharge shuttle of FIG. XXIV showing the load sensing switches for controlling the quench press loaders;

FIG. XXVII is a schematic diagram in plan showing the orientation of the hardening furnace, the discharge shuttle, the quench presses, the press loaders, and a following conveyor to additional processing apparatus;

FIG. XXVIII is a partially sectioned elevation of the quench press loaders;

FIG. XXIX is an enlarged plan of the rotating mechanism and controls for the press loader of FIG. XXVIII taken along line XXIX—XXIX thereof;

FIG. XXX is an enlarged plan view of the feeder head of the press loader of FIG. XVIII;

FIG. XXXI is an enlarged fragment of a sectioned view of the feeder head carriage and its mounting as taken along line XXXI—XXXI of FIG. XXX;

FIG. XXXII is a front elevation of a quench press according to this invention;

FIG. XXXIII is an enlarged plan view of the platen of the press in FIG. XXXII, quench rings, a quench rings frame and quench fluid valve actuators, with the several portions broken away to better reveal details of the construction, and FIG. XXXIV is a sectioned elevation of the quench ring, quench ring frame, and quench fluid valve actuator taken along the line XXXIV—XXXIV of FIG. XXXIII.

The work unit upon which this apparatus is effective in the first portion of its cycle is best illustrated in FIGS. II and III. In plan it comprises a generally square tray 30 having an open latticework deck 31 arranged to permit the free flow of carburizing gases about the workpieces which are supported thereon while being transported through the carburizing furnace. The slats 32 in the grillwork forming the deck of tray 30 intersect to define open squares therein. The periphery of deck 31 is bounded by a raised lip 33. Each set of workpieces in the illustrative example comprises three pieces, a cup-like member 34 having a generally cylindrical outer surface, flat ends normal to the axis of the cylinder and a cylinder wall of varying thickness, as best seen in section in FIG. III. The other workpieces of each set comprise spool-like members 35 having a hollow interior bounded by a right circular cylinder and an exterior generally of the form of a frustum of a cone having end flanges, as best seen in section in FIG. III. The ends of members 35, hereafter termed cones, define planes normal to the axis of the inner cylinder. Tray 30 supports two cups and four cones for processing. The larger diameter cups are mounted on a diagonal of the square of the tray on fixtures 36 and are appropriately spaced on the diagonals to enable them to be maintained within the periphery of the tray lip 33. The smaller diameter cones 35 are stacked one upon the other in pairs, and each pair is mounted on the opposite diagonal of the square tray from that on which the cups are mounted by fixtures 37 corresponding in some respects to the cup fixtures 36. The separation of the cone fixtures along the diagonal is somewhat greater than that of the cup fixtures in order to enable the cones to be accommodated with their respective cups on a tray of minimum dimensions.

Each cup fixture comprises a central sleeve 38 and a spider comprising three legs 39 extending radially from the sleeve or spindle 38. The legs 39 sustain the fixture on the grillwork deck 31 by engaging their undersurfaces 41 with the upper surfaces of the slats 32. These undersurfaces 41 extend from spindle 38 above its lower extremity 40 so that that lower extremity extends into the interstices of the latticework in deck 31 to provide lateral indexing of the fixtures thereon. The extension or lower extremity 40 of spindle 38 is engaged by the sides of two of the slats 32 in each instance and by the ends 42 of lugs 43 extending perpendicularly from the sides of the slats in the lattice square into which the spindle 38 is inserted. Cup 34 rests with its lower annular periphery on the upper surface 44 of spider legs 39 and is maintained generally concentric with the spindle 38 by means of the well 45 in that surface into which its wall thickness fits.

Latitude in the type and size of workpieces to be processed in this system is afforded by arranging the fixtures 36 so that they can be removed from the trays and other fixtures substituted therefor. Removal of fixtures is facilitated by providing them with some freedom of movement on the tray surface. Thus the ends 42 of lugs 43 do not precisely maintain the spindles 40 tightly against the sides of opposed slats 32 and some transverse shifting of the fixtures on the trays is possible. As will be described in greater detail below, displacement of the fixtures may impede the loading and unloading of workpieces thereon; hence tapered apertures 395 are provided in the bottom of the spindles 38 for the reception of indexing keys 392, as best illustrated in FIG. XIV, at processing stations where precise positioning is required of the fixtures or the workpieces they support. It has been found advantageous to employ such keys for all fixtures on the trays and to provide a tray key as well. The tray key fits within an open region in the tray undersurface defined by lugs 394 at the tray center to embrace a circular region corresponding to the key and represented by dashed lines in FIG. II.

The workpieces are arranged to be loaded and unloaded from the tray and fixtures by magnetic means which enables them to be lifted off of the tray. Although the fixture supporting the workpiece is not initially ferromagnetic, it is necessary to avoid its separation from the tray as the workpiece is lifted from the tray. Further, the fixture tray assemblies are subjected to a number of manipulations which might cause their separation. Such separation is avoided by providing the spindle 38 with a bayonet 46 which engages the undersurface of one of the lugs 43 so that the fixture cannot be lifted free of the deck unless that bayonet is turned from beneath the lug. The bayonet is maintained in alignment with the lug by the detents 47 on the upper surface of deck 31 and so located as to maintain a leg 39 between them unless the fixture is intentionally released from the tray by a compound motion involving lifting the fixture sufficiently free of the tray to free its leg 39 from the detents and then twisting the fixture around the axis of its spindle to free the bayonet from the undersurface of lug 43.

Cone fixture 37 corresponds to the above described cup fixture 36 in most respects. It differs therefrom in that the legs 48 of its spider supporting the spindle 49 are much shorter than those legs 39 on spindle 38. Each of the legs 48 have upwardly extending fins 51 which exceed the height of the lower cone 35 thereby projecting into the upper cone 35 to insure that it is maintained in registry with the lower cone. The lower projection of the spindle 49 is positioned within the grating of the deck 31 by lugs 43 having ends 42 and by the sides of the slats 32 diametrically opposed to those ends 42. A bayonet 50 projects from the lower portion of spindle 49 and locks under one of the lugs 43 to prevent lifting of the spindle inadvertently. Rotation of the fixture to free the bayonet is inhibited by detents 47 on opposite sides of one of the spider legs 48.

The path of motion and the arrangement of processing stations in the apparatus of the present invention as it is traversed by a work unit comprising the tray 30, pairs of fixtures 36 and 37 and two sets of workpieces comprising a pair of cups 34 and two pairs of cones 35 is illustrated in FIG. I. The tray 30 and the fixtures 36 and 37 are reused in this apparatus by being carried through a continuous path and past a loading station 52. At the loading station a superimposed pair of coaxial cones are mounted on each fixture 37 and a cup is mounted on each fixture 36. The loaded tray is then advanced along a conveyor 53 which may be of conventional form, for example of the endless chain type wherein dogs engage an edge of a tray and carry it forward along a path indicated by the arrows. Suitable limit switches or other sensing devices (not shown) can be incorporated in the conveyor structure to indicate the presence of trays thereon.

As a file of loaded trays is accumulated on conveyor 53, controls are actuated to cause a first file of five trays to be shifted from the conveyor transversely in a rank of five along the conveyor 54. Conveyor 54 by selecting a rank of five trays positions those trays so that they can be introduced by means of conveyor 55 along the path indicated by the arrows in single file into the vestibule 56 of a carburizing furnace 57. This rank of five trays comprises a single charge for furnace 57. A carburizing furnace 58 corresponding to furnace 57 is positioned adjacent thereto. The next succeeding file of five loaded trays on conveyor 53 is advanced beyond transverse conveyor 54 by master controls (not shown) to a position opposite transverse conveyor 59. Conveyor 59 corresponds to conveyor 54 and advances the file of five loaded trays as a rank to the conveyor 61 arranged to feed them as a file of five to the vestibule 62 of furnace 58. The five loaded trays are then fed from that vestibule into the carburizing furnace 58 as a charge for that furnace, and the succeeding file of five trays conveyed from load station 52 on conveyor 53 is fed to vestibule 56 of carburizing furnace 57 so that charges are alternately fed to the adjacent carburizing furnaces 57 and 58 automatically.

Upon completing their traverse of the carburizing furnace 57 or 58 the trays are delivered to an exit chamber for the furnace individually. The exit chamber for furnace 57 is shown at 63. It comprises a hooded compartment which is essentially air tight and which, upon the opening of the furnace door along its side, as will be described in detail, introduces the atmosphere within the furnace to the chamber so that the tray ejected from the furnace into the chamber is maintained in an atmosphere which does not alter its condition appreciably. The lower portion of the chamber 63 is open. The tray comes to rest within the chamber on an elevator which is capable of descending through the bottom of the chamber. In order to maintain the seal of the exit chamber, the lower periphery of its hood is in registry with a quench tank 60 and positioned below the surface of the quench liquid therein. Thus, the work unit is maintained in a favorable atmosphere until subjected to quenching by being immersed in the quench liquid.

While immersed in the quench tank 60 the work unit is transferred laterally of the elevator station so that it is no longer beneath the open bottom of the exit chamber 63 but instead is in a transfer station 64. The elevator within the quench tank has a platform section which raises the now quenched work unit to admit that work unit to a conveyor 65 and position itself for the reception of another work unit from the furnace 57. The quenched work unit is next carried by means of conveyor 65 through a wash station 66 and thence to a transverse conveyor 67.

A furnace exit chamber 68, transfer station 69 and quench tank 70 integral therewith, corresponding to chamber 63, station 64 and tank 60, are provided for carburizing furnace 58. Similarly, a conveyor 71 of the type of conveyor 65 carries the quenched work units from transfer station 69 through a wash station 72 to conveyor 67.

Conveyor 67 is fed work units from both sides, which it delivers one at a time to conveyor 80. When five units have been accumulated therein, it advances those five units in rank over conveyor 80 to conveyor 73. Conveyor 73 functions much in the manner of conveyors 55 and 61 in advancing the entire rank of work units in single file into a vestibule 74 of a draw furnace 75 wherein the rank of work units are advanced down the length of the draw furnace. Upon completion of their transit of furnace 75, the work units are individually withdrawn from the furnace through an exit chamber 76, corresponding to exit chamber 63 and 68, in which they are quenched and transferred to station 77 and thence through a washer 78 by conveyor 79.

In normal operation work units are carried by conveyor 79 to transfer station 81 and thence by way of conveyor 82 to loading station 83 for the rotary hearth hardening furnace 84. At loading station 83, cups 34 and cones 35 are lifted free from their respective cup fixtures 36 and cone fixtures 37 and the unloaded tray and fixtures are transferred to a return conveyor 85 which carries the trays back to loading station 52.

When the carburized, quenched, and drawn workpieces are withdrawn from washer 78, they have reached an intermediate stage in their processing wherein their characteristics are stable and therefore their processing can be interrupted for a substantial interval if necessary. At this time, a substantial number of workpiece manipulations and processes which are of a critical nature timewise remained to be performed on the workpieces. Conditions can arise wherein the rate of issue of work units from conveyors 79 to load station 81 exceeds the rate at which those work units can be processed through loading station 83. Such conditions may be created by a carburizing and drawing process which prepares the units for hardening and press quenching operations at a faster rate than those hardening and press quenching operations can be performed. Such conditions might also arise where the processing units beyond the loading station are required to be shut down while work units are issuing from the carburizing and draw furnace. Surges of work units at transfer station 81 are absorbed without causing those units to back up in either the draw or carburizing furnaces by by-passing conveyor 82 and loading station 83. This by-passing is performed by a by-pass pusher 86 which is integrated with conveyor 79 and is actuated when a work unit is positioned at transfer station 81 and loading station 83 is unable to accommodate that unit. When actuated, pusher 86 advances the work unit from transfer station 81 along the axis of conveyor 79 and across conveyor 82 so that it is placed on return conveyor 85 at surge station 87. Once a loaded work unit is placed in the return conveyor, it is carried along that conveyor and is stored thereon so that attendants can remove the work units therefrom prior to their return to loading station 52 and insert them in the hardening furnace loading station 83 at such time that the equipment following the hardening furnace can accept and process those work units.

Upon introduction of a work unit into loading station 83, it is indexed on a turn table 88 and is turned so that a diagonal is parallel to the feeding axis of hardening furnace loading shuttle 92. A loader 89 superjacent the turn table 88 is arranged to pick up pairs of cups and transfers those cups to a pair of extensible hardening trays 91 positioned on the hardening furnace loading shuttle 92. Loading shuttle 92 advances extensible trays 91 into the hardening furnace and positions them on a station of hardening furnace hearth 93. The hearth carries the trays free of the loading shuttle and ultimately through about three hundred and twenty degrees of rotation to an unloading station where the tray is engaged by hardening furnace unloading shuttle 94. As the hearth rotates, it carries a pair of empty extensible trays, which have been manipulated out of the furance to an unloader by shuttle 94 and returned to the furnace empty during the interval the loaded trays have been inserted by the shuttle 92, to a position enabling those trays to be engaged by the loading shuttle 92. Thus, when shuttle 92 is withdrawn from the furnace, it withdraws a pair of empty extensible trays and positions those trays appropriately with respect to the loader 89.

Subsequent to the removal of the first pair of work units from the carburizing tray 30, the turn table 88 is again indexed to reposition the tray in a manner such that the other pair of fixture mounted workpieces are positioned for engagement by the loader 89. These workpieces may be pairs of coaxially stacked cones which are picked up by lifting magnets of the loader, are advanced to be positioned above the extensible trays brought into loading position by the shuttle 92, and are deposited on the trays 91. The reloaded extensible trays 91 are then inserted into the furnace. As the hardening furnace hearth 93 is advanced through one step, the reloaded trays are picked up by that hearth, and are carried through a hardening heating cycle.

The two hardening trays are collapsed upon each other when inserted in the hardening furnace to maintain the workpieces thereon in as compact an arrangement as is possible and thereby limit the dimensions required in the hardening furnace. The trays are extended so that they are separated by a fixed distance when they are withdrawn by the shuttle 94, that distance being the workpiece separation corresponding to the separation of pairs of press quenching stations in quench presses 95 and 96. Thus, these trays enable the optimum workpiece separations to be established at a loading station, in the hardening furnace, and at the unloading station from which they are fed to the quench presses.

Distortion of workpieces is prevented by press quenching wherein the workpiece configuration of the cups and cones is constrained by mandrels or dies which fit into the open centers of those elements and have outer dimensions which correspond to the desired inner dimensions of the elements. Since the cups have a substantially greater inner diameter than do the cones, separate quenching stations must be provided for these workpieces. In loading the extensible hardening trays, the workpieces are positioned thereon in pairs such that a pair of cups are positioned on one pair of hardening trays and a set of four cones are positioned on the other pair of hardening trays. When the trays are withdrawn from the furnace, each tray load is transferred to quench press station by a quench press loader 97 or 98. When a tray bearing a pair of cups is withdrawn from the hardening furnace 84, a monitoring unit adjacent the furnace exit senses the load of cups and controls loader 97 so that it can function to pick up the cups and transfer them to the cup quenching stations in quench press 95. While the cups are being press quenched, the shuttle 94 advances into the furnace again to return the emptied extensible trays 91 and to pick up the next succeeding trays of workpieces brought into registry with the exit path by the furnace hearth 93. This next tray contains a load of cones. When it is withdrawn from the furnace, the monitoring device senses the presence of the cones and permits the loader 98 to pick up those cones from the shuttle and transfer them to the press quenching stations for cones in quench press 96.

Loader 97 removes the cups from quench press 95 when the cups therein have been press quenched and places those cups on shuttle 94. The operation of the quench press, the loader, the shuttle and the hardening furnace 84 are all synchronized so that press quenching is completed while the shuttle is returned to furnace 84 to pick up the next succeeding tray. At that time the loader transfers the press quenched workpieces to the shuttle 94 before it is withdrawn from the hardening furnace. Shuttle 94, therefore, is provided with a work carrier 99 on the end opposite that engaging the hardening trays. When the work carrier 99 is loaded, the shuttle operates to advance the workpieces thereon to magnetic loader 101 which picks them up and transfers them to a conveyor 102 made up of a hydraulic pusher and conveyor belts. Thus, press quenched workpieces are transferred to a following conveyor while heated workpieces are positioned for introduction into the quench presses by a single reciprocating motion of the shuttle 94. Further, the loader which placed the quenched workpieces on carrier 99 remains positioned for the reception from shuttle 94 of heated workpieces since the alternate loads of cups and cones in furnace 84 insures that the load withdrawn from the furnace is of the same nature as the load advanced to unloader 101.

Once the workpieces are appropriately positioned on the conveyor belts of conveyor 102, they are washed, rinsed and advanced through a low temperature draw furnace 103 so that they are reheated and then delivered from the furnace 103 in condition for final processing.

In considering the detailed operation of the system and the elements of which it is constituted assume that twenty-five sets of workpieces are to be produced an hour. Since two sets are processed in each work unit a work unit rate of twelve and one half per hour or one every 4.8 minutes is required and a loaded tray issues from one of the carburizing furnaces 57 and 58 every 9.6 minutes. All of the functions to be described can be operated manually or by means of a timer such as a motor driven cam actuating switches in sequence. Further, interlocks are provided to insure against malfunctions of the system when a succeeding stage is unprepared to receive a work unit.

FIG. IV shows the loading station 52 for the system as a turntable shown only in outline but corresponding generally to that shown in detail in FIGS. XIII and XIV and described below. Trays are received on that turntable from tray return conveyor 85. Cups and cones can be loaded on their fixtures 36 and 37 either manually or automatically as with a magnetic loader of the type described below and shown in FIGS. XVIII through XXI. Once a work unit is assembled it is transferred from the loading station by a pushoff 1 which slides the tray off of the turntable and onto a continuous chain conveyor 53.

After the loading of a tray has been completed the pushoff 1 is actuated either automatically or manually so that its pusher bar 2 extending between a pair of arms 3 extending upward from channel like beams 4 engages tray 30 and carries it onto conveyor 53. Arms 3 and beams 4 are spaced to straddle the turntable of loading station 52. A drive rod 5 is coupled to the beams 4 by cross beam 6 and is reciprocated, as by a hydraulic cylinder (not shown) controlled in its stroke by cam 7 actuating limit switches 8. The beams 4 ride on rollers 9 secured to the supports for conveyor 53.

Motion of the pushoff 1 imparts motion to the chain conveyor 53 once the work unit has been advanced into the range of the conveyor. Coupling is achieved through a lost motion mechanism 10 from beam 4 to a cross head 11 to which is secured an endless chain 12. Chain 12 is trained over sprockets 13 and 14. Sprocket 14 is coupled to a sprocket 15, as by a unidirectional clutch to drive endless chain 16 in a counterclockwise direction as viewed in FIG. IV. Chain 16 rotates drive sprocket 17 for conveyor chains 18. Transverse slats 19 extend between chains 18 on opposite sides of the conveyor deck to engage the rear face of the trays 30 and maintain their separation as they are advanced along the conveyor deck. Thus, pushoff 1 is driven through a stroke for each tray loaded at station 52 to travel through a limited distance and to begin to move the loaded tray onto conveyor 53. As the stroke continues beyond that limited distance the conveyor chain 18 is placed in motion to advance the chain one work unit position and pick up the work unit newly admitted to the conveyor.

When five work units have been advanced onto the conveyor 53 its primary drive which can be a hydraulic motor (not shown) coupled through chain 16 to drive chain 18, is actuated and the trays are advanced to a pushoff station associated with either conveyor 54 or 59. When both furnaces 57 and 58 are being operated the drive alternately advances five trays to a position opposite conveyors 54 and 59. The pushoff station for conveyor 54 is represented in fragmentary outline by the frame 20 in FIG. IV. This pushoff has five downwardly projecting arms (not shown) each engaging a side of a tray to advance a work unit transversely of conveyor 53. The arms depend from a cross beam 21 which advances into the plane of the paper on flanged wheels 22 riding rails 23.

Precise positioning of the work units in alignment with the pusher arms of pushoff 20 is essential. This precision is insured by means of a positioner comprising a short stroke hydraulic cylinder 24 for advancing a slide supported crosshead 25 mounting an upwardly extending dog 26. Course positioning of chain 18 is effected by means of its primary drive. As the trays 30 and slats 19 advance above dog 26, it is depressed below them by a camming action. Thus, the dog 26 is behind at least one slat 19 when the chain 18 has been advanced to place the work units in the vicinity of the pushoff 20. The positioner is then actuated to advance the dog 26 against a slat 19 and advance the chain 18 and work units into alignment with the pushoff 20.

The pushoff 20 is actuated when the work units have been aligned therewith provided the following apparatus is conditioned to receive work. Conveyor 54 can be of the dog beam type wherein work units are advanced in successive steps, thus in a three step conveyor three charges of five work units each are maintained on this conveyor, the lead charge being advanced to the conveyor 54 to empty the first position on the conveyor for reception of a new charge under the impetus of pushoff 20. This lead charge will be passed to conveyor 54 only when that conveyor, a charge car in the illustrative system, is retracted from the furnace vestibule and is empty.

A longitudinal section of the carburizing furnaces 57 and 58 is shown in FIG. V together with the tray conveying equipment utilized in carrying the trays into and through the furnaces. The furnace comprises an elongated chamber of multi-layer walled construction comprising an outer wall of metallic sheets 105 supported at the bottom on I-beams 106 mounted on a floor 107. The metallic plates 105 making up the outer layer of furnace walls are banded at spaced intervals by I-beams 108. Several layers of refractory material 109 and 110 are superimposed within the metallic plate shell of the furnace to form the bottom, side walls and arched ceiling thereof. The work unit conveyor within the furnace comprises pairs of rails 112 which are flanged to confine the trays 30 on the rails while they are pushed therealong. The rails are supported in spaced relationship to the bottom of the furnace by a plurality of piers some of which 113 are of checkered or are open brick work and certain other piers 114 being of solid construction.

Carburizing is effected in the furnace by conveying the work units through six successive zones, only the first, a portion of the second, and the sixth being shown in the drawings, wherein the environmental conditions are closely controlled to approach the optimum for carburizing ferrous objects efficiently and thereby at the maximum rate practical without subjecting the workpieces to excessive carbon which might induce the formation of massive carbides thereon. Since the amount of carbon which can be accepted by the workpieces without the formation of carbides varies as carburization proceeds, the carburizing atmosphere within the several zones of the furnace is not constant if carburization is to occur at the maximum rate throughout. Accordingly, the atmosphere of the several zones is partially isolated from adjacent zones by means of baffles. The solid piers 114 form a portion of these baffles below the conveyor rails 112. The space below the ceiling 115 of the furnace is baffled by arches 116; the upper portion 117 serves as a ceiling support element, and the lower portion of which is a shallow arch providing sufficient clearance for the passage of tray mounted workpieces. Radiant heater tubes 118 and 119 are arranged in pairs transverse of the furnace both above and below the work unit paths to enable the temperature in the several zones to be controlled. Heat is developed in tubes 118 and 119 by admitting a combustible mixture of gas into the tubes which lead through a port in the side of the furnace. Combustion occurs in the tubes in inlet tube 118. From tube 118 the products of combustion pass to a U-bend 121, best seen in FIG. VI, which is connected to exhaust heater tube 119 coupled to an exhaust port in the furnace wall. The pairs of tubes 118 and 119 positioned below the rails 112 are supported on beams 122 extending between adjacent piers 113 or 114. Those paired tubes above the path of work travel are supported from the top of the furnace by beams 123 suspended on hanger rods 124 passing through the roof of the furnace to expansion couplings 127 secured to the outer steel plates 105 of the furnace roof. Conveniently, expansion and contraction of the hanger rods 124 can be accommodated in the coupling by means of springs (not shown) concentric with the hanger rods maintained within a sleeve housing or coupling 127. These springs are held in compression concentric with the hanger rods and between the roof plate 105 and a flange secured to the hanger rod. The ends of the upper heater tubes are sustained at the inlet ends by the couplings through the furnace wall and at the U-bend 121 by brackets 128 mounted on the walls adjacent those bends.

The composition of the atmosphere within the several zones of the furnace is controlled with considerable exactness by gas blending and control equipment which is not shown. The variation in composition of the atmosphere arises as a result of the adjustment of the proportions of carbon enriching gas to a gas, termed the carrier, which is essentially inert with regard to the workpieces in the furnace. The blended gases are admitted to the several zones in different compositions through gas inlets 129 disposed along the furnace wall on both sides at a level somewhat above the path of the workpieces. Apertures 131 are provided in the furnace wall throughout the several zones at about the level of the workpieces to enable sensing elements to be mounted within the processing zones. These apertures 131 contain elements such as thermocouples for monitoring the temperature within the zones and means for withdrawing gas samples from within the zone to be fed to the monitoring and control elements which determine the blend of gas fed to that zone. Gas outlets from the furnace are provided in several of the zones. In the exemplary furnace, outlets 132 are located below the conveyor rails 112 in the first, third (not shown) and fourth zones (not shown). The gas from the first zone is fed to the furnace vestibule to purge its atmosphere when a charge has been placed therein, and the vestibule has been sealed. In order to avoid any stratification of the atmosphere whereby the carburizing constituents in the atmosphere immediately adjacent the workpieces would be depleted while the remaining portions of the furnace zone contained higher concentrations, each of the second, third, fourth and fifth zones of the furnace are provided with an overhead fan 133 which is driven by means of a shaft 134 journaled through oil-cooled bearing 135 and driven from some convenient means located on the exterior of the furnace at its upper surface. The fan and its bearing 135 are suitably supported in a cast cup-like member 136 which is secured in the furnace ceiling and is arranged to support bearing 135.

The present furnace construction and the atmospheric controls therefor are such as to enable an ideal carburizing condition to be maintained wherein the workpieces are carburized at an efficient rate while being passed therethrough. Precise control of the furnace atmosphere tends to avoid the build up accumulations of carbon at the rates that have been experienced in the past. However, after substantial use, some carbon can accumulate. This carbon is eliminated by admitting air to the furnace interior in controlled amounts to burn out the accumulated carbon on its inner surfaces at a time when no workpieces are passing therethrough. Air inlets 137 are provided at the lower portion of the furnace wall adjacent its floor. Other adjuncts of the furnace construction which are illustrated in FIG. V include spaced expansion joints 138 in the refractory walls a sight hole 139 adjacent the work path comprising a glass covered opening having a removable metal cover which protects the transparent glass except when it is desired to observe the work units 125, represented as dash lines rectangles in FIG. V, within the furnace interior. Access to the furnace interior is gained by means of a manhole 141 having a cover 142 in the form of an inverted cup which is sealed by the immersion of the lip of the cup in a trough 143 containing oil 144. A screw clamped cover 145 is located adjacent the exit end of the furnace and can be removed to provide access to a bung 146 which is withdrawn when it is required to enter the final zone as in the case where repairs are necessary on the pushout.

Portions of the furnace charge conveyor 55 shown in FIG. I which are effective in positioning the work units within the furnace vestibule 56 are shown in FIG. V. Conveyor 55 is in the form of a shuttle having a charge car which can be moved from a position transverse of the line of advancement of the dog beam conveyors 54 to a position transverse of the longitudinal axis of the carburizing furnace and within the vestibule 56. The shuttle comprises a deck 148 from which depend slides 149 formed by lower upturned flanges. The lower flanges ride within guides formed by track-like members 152 extending over the path of travel of the shuttle.

Shuttle deck 148 is caused to slide along the track members by hydraulic cylinder 153 mounted below the floor 154 of the furnace vestibule. Piston rod 155 from cylinder 153 is coupled to a car (not shown) which rides on tracks 156, the car in turn is connected to the end of the shuttle deck 148 and carries a door (not shown) for closing the open end of the furnace vestibule 56 when the furnace charge has been positioned for introduction into the furnace. A travel limiting rod 157 is coupled to the car and moves in parallelism to the piston rod 155 so that it carries limit cams 158 into engagement with limit switches (not shown) at the limits of travel of the car. These limit switches in turn control the flow of hydraulic fluid to cylinder 153 as is well known. The vestibule 56 is enclosed by a wall 159 which is continuous with floor 154, and a ceiling 161 which extends from wall 159 to the front face of the carburizing furnace. Thus, when shuttle deck 148 is moved from its extended position opposite conveyor 54, it advances work unit trays positioned thereon by conveyor 54 into the furnace vestibule which is then sealed by the vestibule door which moves in unison with the deck.

It is desirable to avoid contamination of the furnace atmosphere in introducing a charge thereto. Accordingly, the atmosphere of the vestibule 56 is purged once a charge has been introduced and the vestibule door closed by a mixture of carrier and carburizing gas withdrawn from the first zone of the furnace and introduced into the vestibule by means of a gas conduit having an aperture 162 in the vestibule wall. During the interval that the furnace vestibule is opened and until its atmosphere has been purged the furnace entrance is closed by a lift door 163. Door 163 is made up of a metal framework 164 and face 165 sustaining refractory material 166 of the type used in the furnace walls. In order to provide dimensional stability during furnace operation, the door and the frame around the furnace entry are water cooled. Header 167 is integral with the upper portion of the door and is of hollow construction to provide a conduit for water or some other cooling fluid which is fed thereto by means of pipe 169 extending upward out of the top of the door chamber 171 to a supply hose 172.

The door is opened by lifting it in chamber 171 by means of cables 173 running to sheaves 174 on an overhead framework 175. The lifting impetus can be imparted to cable 173 by any convenient means such as a hydraulic cylinder. The limits of door motion are defined by cam arm 176 extending from the pipe 169 integral with the door structure so that it moves vertically with the door. At the lower limit of door travel cam face 177 actuates follower 178 of limit switch 179 in the control of the door driving mechanism; while at the upper limit of travel, follower 181 of limit switch 182 is engaged by cam face 177 to terminate the lifting of the door.

Door chamber 171 interconnects furnace 57 and vestibule 56 in an essentially gas-tight assembly. However, since vestibule 56 is opened periodically, the door frame 183 between the vestibule 56 and chamber 171 is closely fitted to the door when in closed position. Inasmuch as this frame is in close engagement with the door, its dimensional stability is maintained by cooling it with some cooling fluid circulated through its hollow interior forming a duct 184 integral therewith. The space from the door frame to the tracks 112 for conveying the work units along the furnace is filled by a water-cooled bridge 186 somewhat below the hearth line as defined by the plane upon which the bottom of the work supporting trays are mounted while the door 163 is closed. When the door is opened, bridge 186 is raised to provide a continuous surface across which the work units can be advanced. Lifting of the bridge 186 is effected by the lifting of door 163 through the medium of lift rods 187 which slide freely within metal brackets 188 secured to the door frame. As the door is raised, the lower surface of nut 189 on lift rod 187 engages the upper surface of the bracket 188 and the bridge is lifted by further movement upward. The relative position of the nut 189 on lift rod 187 is adjusted so that the bridge is lifted only during the final portion of the upper motion of the door to bring it up to the hearth line at the time the door reaches its maximum upper travel. Stuffing box 191 provides a sliding connection for pipe 192 thereby enabling cooling water to be continuously circulated through the bridge while it is at either of its two limits or is in motion.

Once shuttle deck 148 is positioned within the charge vestibule with work units located along its length in the compartmented sections defined by the transverse flanges 193 secured to the upper surface of the deck; the sealed vestibule has been flushed with the furnace atmosphere; the furnace entry has been opened by lifting door 163, and bridge 186 has been positioned across the gap between the entry sill and the rails 112; a pusher rod 194 is actuated by the admission of hydraulic fluid to its cylinder 195 to advance its pusher head 196 against the rearmost face of a work unit tray mounted on deck 148. In the example where five trays constitute a single charge, five pusher rods, one for each tray, are provided and are actuated individually to advance the trays in succession into the furnace. With the assumed timing one tray is advanced each 9.6 minutes. The degree of tray advancement effected by the pusher rods is illustrated in phantom in FIG. V as the distance between the dotted rectangle 125 in vestibule 56 and the first dotted rectangle 125 in Zone #1 of furnace 57, each such rectangle representing the dimensional limits of a side view of a carburizing tray 30 and workpieces 34 and 35 constituting a work unit. This displacement involves sliding the trays transversely of deck 148 onto ramp slide 197, then across bridge 186 to the initial portion of the rails 112. The work units on the track ahead of the newly admitted tray are advanced by pusher rod 194 as the new tray is introduced inasmuch as the leading edge of that tray encounters the trailing edge of a preceding work tray and pushes all trays ahead of it through the furnace. Travel of the pusher rod is monitored by a cam carrying rod which moves in unison therewith to actuate limit switches controlling the flow of hydraulic fluid to the driving cylinder 195. These limit switches, cams and control rod are of conventional form and are not shown here. Once the rod attains its maximum extension the limit switches, indicating such extension, terminate its feed motion and cause it to retract to the position shown. Succeeding rods are then actuated until the entire charge on the shuttle has been introduced into the furnace, at which time the furnace door 163 is closed, and the vestibule 56 is prepared to receive a new furnace charge.

The work units and the operation of the conveyor elements thereon can be observed within the furnace vestibule through a sight glass 198 positioned on a quick release door 199 providing access to the interior of the vestibule so that any maintenance required of the conveyors can be performed conveniently. Several quick release covers and sight glasses are positioned along the length of the furnace vestibule and an explosion cover 201 is provided on the roof 161 of the vestibule. The cover 201 fits onto a cylindrical extension 202 from that roof and is held in position on the upper lip of extension 202 by spring loaded holddowns 203. Thus any minor explosion which may occur within the vestibule due to introduction of the combustible gases of the furnace atmosphere and the mixing of that combustible gas with atmospheric air are relieved by the lifting of cover 201 against the holddowns 203.

When a new charge is introduced into a loaded furnace, the foremost charge therein is advanced from the conveyor slides at the exit end to a side pushout conveyor 205, portions of which can best be seen in FIGS. V and VII. The final pier 206 of the furnace is of substantial width to provide a base for the elements which effect the ejection of workpieces from the furnace. It is provided with an axial trough 207 which is transverse of the furnace and in which portions of the side push out 205 travel. Pier caps 209 and 211 are provided on either side of the trough and are held down by means of rods 212 extending to cantilever brackets 213 mounted on rods 214 which are biased downward by springs 215 engaged by brackets 216 mounted on the walls 217 of the pusher assembly chamber which extend downward from the bottom of the furnace. The accurate location of the pier caps is important in view of the several operations involving relative motion of parts thereon.

As a work unit is advanced to a position above pier 206 as a result of the introduction on its rails of a new work unit by a pusher rod 194, any bond which may have been established between the contacting surfaces of adjacent trays is broken by stripper 218 for that file of work units which is advanced longitudinally of the furnace to ride beneath the tray and raise its leading edge above the bearing surface above the pier. The edge of the tray is cammed upward by an incline surface 219 on the ends of stripper rods 218. The stripper rods may be driven by any convenient means such as hydraulic cylinders and are actuated in synchronism with the pusher rods 194 by suitable electrohydraulic controls (not shown).

Once a work unit is positioned above the pier 206 in one of the positions represented by the dashed rectangles 125 above pier cap 211 in FIG. VII and has been broken free of its next succeeding work units, it is ejected from the furnace in a direction transverse of the furnace axis by the side push out 205. The push out is similar in some respects to the charge shuttle in that it comprises a car 221 having two wheels 222 riding on a track 223 located below the floor of the furnace. Stability of the car on track 223 is established by means of guide rollers 224 engaging overhead rails 225 secured to the toe end of L-shaped brackets 226 which are vertically adjustable with respect to the holddown rods 214, as best seen in FIG. V. The car is driven across the furnace by means of a pair of continuous chains 228 riding over sprockets 229 and 231 and secured to the carriage by a suitable coupling extending between brackets 232 on the carriage and the chains. When the upper lay of chain 228 is drawn to the right in FIG. VII, the carriage 205 ejects a work unit from the furnace. When it is drawn to the left, it retracts carriage or side pushout 205.

Since control of the furnace atmosphere is critical and the side push out requires an open path in which its movable arm projects into the furnace, the push out is housed in a closed chamber in communication with the furnace. The driving mechanism for the pushout and its controls are outside of the furnace and push out chamber. A driving connection to sprocket 231 is effected through shaft 233 passing through a suitable stuffing box (not shown) in the chamber wall. A pinion 234 is secured to shaft 233 and is engaged by a rack 235 which is moved vertically by means of a hydraulic cylinder 236 mounted adjacent the furnace. Suitable motion limiting controls can be incorporated with this carriage as in the previously described shuttle-type conveyors to control the feed of hydraulic fluid to the actuating cylinder 236, all in a manner not shown.

A pusher arm 237 extends upward from the carriage and terminates in a T-shaped pusher face 238 as best seen in FIG. VII. Pusher face 238, when engaged with the side of a work unit tray, advances that tray toward the side exit aperture 239 in the furnace wall and through that aperture to transfer the tray to the furnace exit region.

The furnace seal is maintained around the pusher mechanism by a casing below the floor of the furnace comprising ceiling portions 241 extending laterally from the furnace walls where the push out element extends beyond the furnace. Side walls 242 depend from the lower casing of the furnace or from the chamber ceiling 241 and are sealed to floor sections 243, 244 and 245. Access to the side pusher mechanism is afforded from below the sealed chamber by releasing and dropping the panels 244. Each of the bottom sections 244 is provided with a continuous peripheral trough 247 which registers with downward extending lips 248 from bottom portions 243 and 245. A seal is effected between these portions by filling the troughs 247 with oil 249 to a point above the lower limits of the downward depending flanges 248.

A close fitting door 251 closes the furnace exit aperture 239 until a charge is to be ejected. Tolerances for the door and door frame 252 are maintained by water cooling. Thus, frame 252 is hollow and forms a conduit for circulating water from a suitable source. Similarly, door 251 is constructed of a tubular frame 253 and a hollow wall 254 in which water is circulated. The face of the door toward the furnace interior is covered with refractory material 255 to provide thermal insulation.

Door 251 is opened by raising it in closed chamber 256 by means of hydraulically actuated lift rods 257 coupled to a piston in hydraulic cylinder 258. The cooling water coupling to the movable door is taken through pipe 259 to a hose coupling 261 at its upper end so that cooling water is supplied through hose 262 while the door is in any position.

The exit chamber 63 of the furnace is made up of a hood 263 which is a continuation of the walls 264 of the door chamber 256 and extends from around the door aperture 239 to a point below the surface of quench fluid 265 in a quench tank 266 which is below the hood. When pusher face 238 is actuated to push a work unit through open door 251, that unit advances onto an elevator platform 267 comprising a plurality of fingers 268 cantilever mounted on a frame 269 which is sustained on an open frame 271 of channel beams 272 extending beyond the hood 263.

An enlarged side view of the elevator and quench tank is shown in FIG. VIII. Each of the four corners of frame 271 is supported on a continuous chain 273 which runs over sprockets 274, which are mounted on shafts 275 journaled in pillow blocks 276 secured to the bottom of quench tank 266, and over sprockets 277 having shafts 278 or 279 suitably journaled above the tank and outside of the exit chamber 63. One pair of sprockets 277 have a common shaft 278 extending longitudinally of the quench tank. That shaft is driven in rotation by pinion 280 and rack 281. Hydraulic cylinder 282 drives rack 281 linearly through piston rod 283. The sprockets 277 on individual shafts 279 are driven from shaft 278 by chains 284 running from sprockets 285 on shaft 278 to corresponding sprockets on shaft 279.

Once a work unit 125 is positioned on platform 267 the elevator is lowered by operation of appropriate hydraulic controls (not shown). Frame 271 descends around a platform 287 and platform supporting frame 288 to a point superjacent slides 289 so that the fingers 291 making up platform 287 and interdigitating with fingers 268 extend above platform 267 and support the work unit as shown in phantom in FIGS. VII and VIII. Fingers 291 are supported on a plate 292 mounted on cross beams 293 of frame 288. Frame 288 includes a pair of runners 294 which are embraced by slides 289 and support the frame 288 and platform 287 for movement longitudinally of the quench tank and within frame 271. Movement of this nature is afforded by a rack 295 secured to the frame 288 between runners 294 and engaged by pinion 296 driven by sprocket 297 on shaft 298. A chain 299 extends from a sprocket drive (not shown) at the top of the tank which can be driven in any convenient manner as by a hydraulically actuated rack and pinion (not shown).

The platform 287, its supporting plate 292 and the frame 288 can be moved longitudinally of frame 271, support frame 269 and the fingers 268 comprising platform 267. These several elements clear each other to provide freedom along the longitudinal axis of the quench tank, that is, the open center portion of platform 267 existing between the ends of fingers 268 accommodates the supported plate 292 for platform 287 which is above platform 267 while the open portion below fingers 268 and within frame 269 provides sufficient clearance to permit frame 288 to move along the longitudinal axis. At the limit of travel of the frame 288 and the platform 287, the platform 287 is subjacent a platform 301 corresponding to platform 267 in that it is comprised of pairs of fingers 302 having an open portion between their ends supported on a frame 303 extending downward to frame 271. Fingers 302 interdigitate with the fingers 291 of the platform 287 in the same manner as fingers 268 so that when the elevator frame 271 is raised to introduce platform 267 into the exit chamber of the furnace for reception of another work unit from the furnace the now quenched work unit is raised by platform 301 on frame 271 to a position laterally displaced along the longitudinal axis of the quench tank from beneath the hood 263 of the exit chamber for the furnace. Thus, the work unit is advanced to transfer station 64 outside of and adjacent that chamber without breaking the seal excluding atmospheric air from that chamber.

While the elevator frame 271 is in its raised position, the reciprocating transfer platform 287 and its carrying frame 288 are returned to their initial position beneath the furnace exit chamber hood 263 so that the cycle of transfer of a work unit can be repeated when the next work unit is lowered in the quench tank for quenching. Thus, it will be seen that this transfer mechanism enables the seal of the furnace to be maintained while the continuous process is practiced in an uninterrupted fashion, maintaining this seal and avoiding the contact of the heated workpieces by an oxidizing atmosphere. The workpieces are transferred directly to a quench bath and while in the quench bath they are taken out of the vicinity of the exit chamber so that as the cycle continues the workpiece is removed from the quench tank to condition the apparatus to receive a subsequent work unit.

Additional adjuncts of the exit chamber 63 which have not been described above include an access door 304 which can be raised by means of a wire rope 305, thereby, providing access to the interior of the exit chamber in the immediate vicinity of the station at which the loading of the elevator platform 267 is effected. Wire rope 305 is carried upward to a pulley 306 mounted on a cantilever beam 307 on the furnace door lifting mechanism. From pulley 306, rope 305 extends to pulley 308 and thence to a counterweight (not shown) for the door. As in the case of the furnace vestibule, the exit chamber is provided with an explosion cover 312 which is held down on a cylindrical extension 313 from the ceiling of exit chamber 63 by a spring biased hold down 314. As shown in FIG. VIII, the bottom of the quench tank is arranged so that it has an increasing depth towards the longitudinal center of the tank and a drain plug 315 is positioned at that maximum depth to enable the tank to be completely drained. Maintenance of the tank and the transfer conveyor at the bottom is facilitated by the access doors 316 at the bottom of the tank which can be secured in place in fluid-tight relationship with the tank walls by suitable gaskets and clamps, not shown.

The transfer of quenched work units to the draw furnace 75 and through the washer 66 is effected by conventional conveyor equipment which will not be described in detail here inasmuch as many forms of equipment known to the art would be suitable to perform these functions. The draw furnace is constructed much in the manner of the carburizing furnace described in that it is provided with a controlled atmosphere, for example an inert atmosphere such as the carrier gas employed in the carburizing furnace, and therefore has a charge vestibule 74 which is loaded and then flushed with the controlled atmosphere to avoid contamination of the atmosphere within the furnace as the work units are advanced into the furnace. Similarly, at the exit end of the furnace a quench tank including a sealed exit chamber 76 above the tank and having a hood depending therefrom and extending to below the surface of the quench fluid in the tank is provided to maintain the heated workpieces in the furnace atmosphere and free of the oxidizing effects of air until the pieces have been quenched and transferred at the bottom of the quench tank to the region 77 wherein they are raised and conveyed from the tank.

The transfer from the draw furnace to loading station 83 or tray return conveyor 85 is effected by conveyors 79 and by-pass pusher 86 in combination as shown in FIG. IX. Conveyor 79 comprises a plurality of stanchions 317 supporting at their upper limits rails 318 upon which the tray of each work unit is slid. Each rail has an upturned flange 319 on its outer edge to confine the trays thereon. The trays are advanced along the rails by dogs 321 including arms 322 having at their opposite ends counterweights 323 to cause the dogs to be maintained above the plane of the rails 318 by pivoting arms 322 on pivots 324 journaled in brackets 325 on a channeled-shaped pusher beam 326. As the pusher beam is reciprocated the advance of the beam toward transfer station 81 causes the leading face of dogs 321 to engage the trailing face of work unit trays 30 and advance them a distance corresponding to one work unit separation. The pusher beam is then retracted from the direction of transfer station 81 so that the inclined faces 327 of the dogs 321 engage the leading face of the next succeeding tray on rails 318 and are cammed in a manner causing them to rotate about their pivots and thus pass beneath the trays to a position behind them. The next succeeding advance of the pusher beam 326 causes the dogs 321, each of which by virtue of the counterweight 323 is raised above the rails 318 when it passes from beneath the tray 30, to engage the rear surface of the following tray so that it is pushed to advance it one step toward the transfer station 81.

Pusher beam 326 is made up of channel members which have bearing surfaces 328 conveniently in the form of plates secured to the undersurface of the beam assembly as by welding. The bearing surfaces 328 are engaged by rollers 329 having flanges which embrace the sides of bar-like bearing 328 to guide the travel of the pusher beam. Pusher beam 326 is driven by means of a hydraulic cylinder 332 through a piston rod 333 secured to a bracket 334 depending from the undersurface of the pusher beam. Stroke limits of the pusher beam are defined by limit switches 335 and 336 which are actuated by camming surfaces 337 on a bracket 338 secured to the side of the pusher beam to operate in a manner whereby the actuation of switch 335 as the beam is retracted from transfer station 81 terminates the flow of hydraulic fluid to cylinder 332 to prevent further movement in the retracting direction, and actuation of switch 336 terminates the advance of the pusher beam toward transfer station 81 by shutting off the flow of hydraulic fluid on one side of the piston within cylinder 332 and initiates retraction of the beam by initiating the flow of fluid on the opposite side of the piston.

As a work unit is introduced into transfer station 81 by the advance of pusher beam 326, the unit engages a limit switch roller 339 on a limit switch arm 341 and displaces that arm to actuate the limit switch 342. Two courses of travel are available to a work unit positioned at transfer station 81. The actuating mechanism for travel along either of the courses requires the operation of limit switch 342 as a condition precedent to its operation. A control interlocking with the control afforded by limit switch 342 actuates a transfer conveyor 82 having an axis at right angles to the axis of conveyor 79 to advance the work unit to a loading station 83 comprising a tray turntable 343 shown in FIG. X, provided no tray is present on turntable 343. Conveyor 82 advances the work unit from transfer station 81 to loading station 83 in a single step and therefore requires that loading station, namely the turntable 343, to be empty at the time conveyor 82 is operated. In the event that the loading station 83 is not conditioned to receive a new work unit from transfer station 81 the interlocking controls actuate a by-pass pusher 86 which advances the work unit along the longitudinal axis of conveyor 79 beyond the transfer station 81 and onto a conveyor 85 which also returns emptied carburizing trays from the loading station 83 to the loading stations 52 for the carburizing furnaces.

When dormant, the by-pass pusher 86 straddles the path of work units along conveyor 79 adjacent the work station 81 and maintains all of its operating elements clear of that path so that the work units pass beneath it. It is supported by legs 344 from the frame of conveyor 79 and by a pair of legs 345 secured to the framework 346 coupling the reheat furnace conveyor 82 and empty tray return 85. The by-pass pusher element comprises a shuttle carriage 347 which reciprocates along a rail 348 and has a pusher arm 349 which can be extended downward therefrom to engage the rear surface of a tray 30 while in the transfer station 81 and advance it across conveyor 82 and into station 87 in the empty tray conveyor 85. Shuttle carriage 347 is driven by a hydraulic cylinder 351 coupled to the carriage through a piston rod 352 to extend the cross head carriage over a range of travel sufficient to first lower the pusher arm 349 to a position for engaging the work unit tray and then advancing the lowered push arm. Motion of the carriage 347 is controlled by cam actuated limit switches 353 and 354. Carriage 347 has a depending bracket 355 having a cam 356 for engagement with the follower of limit switch 353 when the cross head carriage is fully retracted and cam 357 for engagement with the follower of limit switch 354 when the crosshead is at its maximum extension.

Pusher arm 349 is pivoted on shaft 358 secured in bracket 359 on the underside of the crosshead carriage 347. A trolley wheel 361 is journaled for rotation on one side of the pusher arm 349. The wheel tracks in a cam groove 362, cut in plate 363, secured on the frame of the by-pass pusher. Cam faces 362 follow a flattened S contour so that at the maximum retraction of crosshead 347 the cam rollers 361 have raised pusher arm 349 to a horizontal position wherein the axis of the rollers 361 are in horizontal alignment with the axis of shaft 358, and wherein upon the initial advancement of the carriage toward the surge station 87 the rollers ride downward to a point where their axis is immediately below the axis of pivot 358 to position pusher arm 349 vertically beneath the crosshead carriage 347. Arm 349 is maintained vertically below the crosshead carriage 347 by the engagement of the upper periphery of rollers 361 with trolley rails 364 secured to the by-pass pusher frame in the unitary assembly including the camming plate 363. Trolley rails 364 extend slightly beyond the edge of surge station 87 whereby the extension of piston rod 352 drives crosshead 347 beyond that edge of the surge station 87. The pusher arm carries a work unit into the surge station and releases it at that point for transmittal by the empty tray return conveyor 85 to the storage portion of that conveyor extending to the loading station 52.

The introduction of a work unit tray into the surge station 87 displaces follower 365 of limit switch 366, shown in FIG. X, to actuate the empty tray shuttle conveyor 85 and cause it to make one cycle wherein a tray carrier is caused to move from one end of the shuttle to the other thereby advancing the work unit from the surge station 87 to the end of empty tray shuttle 85 so that it can be introduced into the tray storage conveyor which ultimately returns it to the load station 52.

If at that time limit switch 342 is actuated the tray turntable 343 is empty, conveyor shuttle 82 carries the tray from the transfer station 81 to the turntable 343 in a single cycle. While on the turntable, the tray and its precisely positioned load of workpieces is indexed with respect to a loader 89 which in turn is accurately aligned with a charge shuttle 92 for a rotary hearth reheating furnace 84 wherein the carburized workpieces are subjected to a hardening heat treating process preparatory to the press quenching operation which establishes their metalurgical characteristics. As shown diagrammatically in FIG. X and in more detail in FIGS. XVIII through XXI the unloader mechanism has a load carriage which at one limit of travel is indexed above the properly oriented tray on turntable 343 and at the other limit of travel is positioned above a reheating tray 91 on the charge shuttle 92 for the rotary furnace.

The plan form of the deck 381 of the turntable 343 corresponds to that of the carburizing trays with the exception of a peripheral indentation 382 opposite the end of the reheat conveyor shuttle 82 to provide clearance for the pusher arm on that shuttle. The surface of deck 381 is generally flat to facilitate the sliding of trays thereon. However, as shown in FIGS. XI and XIII one peripheral portion of the surface has a hinged gate 383 which is raised in a sloping manner from the direction trays are slid onto the turntable so that as a tray is fed to the turntable, gate 383 is depressed, and when no tray is on the turntable the free end 384 of gate 383 rises slightly above the surface of the deck 383. Gate 381 is pivoted on the deck around hinge 385. The free end of gate 383 is biased upward by a spring (not shown) and carries a transverse extension 388 which projects beyond the limits of the tray. Extension 388 actuates a limit switch 389 mounted on a stationary bracket 391 which is below the level of the turntable so that the turntable is free to rotate above the bracket without having the bracket interfere therewith.

Actuation of switch 389 at the time that switch 342 is actuated by the introduction of a work unit to transfer station 81 causes by-pass pusher 86 to be placed in operation. If switch 389 is deactivated to indicate that no tray is on turntable deck 381 when switch 342 is closed, the work unit introduced into transfer station 81 is advanced along conveyor 82 and onto turntable deck 381. The control circuit for effecting these results is shown in FIG. XII.

Normally the work units are passed from transfer station 81 to loading station 83 since the unloaded tray will be transferred from the turntable 343 to the back end of the transfer portion of conveyor 85 at the time a work unit is advanced into transfer station 81. The removal of the tray 30 from turntable 343 permits limit switch 389 to close thereby completing a circuit from bus P to bus N connected across a source of electrical energy (not shown) and energizing work unit acceptance relay 367, closing its contact 367–1 and opening its contact 367–2. This establishes the first prerequisite for the operation of advance control for conveyor 82 represented by a circle to advance a work unit to turntable 343. Additional conditions must be fulfilled for proper operation of conveyor 82 including the retraction of the indexing or guide pins on the turntable below the table surface ( to be described) as indicated by the closure of limit switch 404, the advancement of the mechanism advancing work units to the conveyor 79 to feed a new work unit to the back end of that conveyor as indicated by the closure of limit switch 368 to energize latch coil 369–L of the tray feed relay 369 and close contacts 369–1, the retraction of the mechanism for advancing work units to the conveyor 79 to close limit switch 370, and the presence of a tray in the transfer station 81 to close limit switch 342. When all of these conditions are met, conveyor 82 advance control is energized from bus P to bus N through closed contacts 367–1, 404, 342, 370 and 369–1.

When conveyor 82 has advanced the work unit to the turntable a conveyor limit switch 371 is closed to trip tray feed relay 369 by energizing trip coil 369–T and actuate the retract control for conveyor 82. As conveyor 82 moved the work unit out of transfer station 81, limit switch 342 reopened as shown in FIG. XII. Thus a new cycle of operations is again required to proceed the advance of a subsequent work unit on conveyor 82.

Upon completion of the unloading of the trap 30, it is moved onto conveyor 85 by means of a turntable pushoff comprising a reciprocating bar 372 and a pusher arm 372a extending therefrom, as best seen in FIG. XI, to close limit switch 373 and close limit switch 374 on that pushoff. If there is no tray at the corner of conveyor 85 depressing limit switch 375 to open contact 375–1, the tray is carried from the back end of that conveyor to its corner by actuation of the advance control for conveyor 85. The complete advance of tray 30 to the corner of conveyor 85 depresses limit switch 375 to open contact 375–1 barring a second advance of the conveyor and closes contact 375–2. Since by pass pusher relay 376 has not been energized, its back contact 376–2 is closed. Hence, an energizing circuit is completed for the retract control of conveyor 85 through closed contacts 376–2 and 375–2 to cause conveyor 85 to return to its back end preparatory to receiving another emptied tray from the turntable pushoff. This completes a normal carburizing tray unloading cycle.

If a work unit comes out of the washer 78 and onto conveyor 79 and the tray on turntable 343 has not pushed off, conveyor 82 will not operate since limit switch 389 will be operated to deenergize relay 367 and maintain open contact 367–1 in the circuit energizing advance control for conveyor 82. Instead, the by-pass pusher will be actuated to transfer the work unit from the back of conveyor 82, transfer station 81, to conveyor 85 at surge station 87. With relay 367 deenergized, its back contact 367–2 is closed. Limit switch 377 is closed while conveyor 85 is at its back end to close contact 377–1. The feed to conveyor 79 has operated as indicated above to close limit switch 368 and latch-in relay 369 by energizing latch coil 369–L. Limit switch 370 is closed while the work unit feed mechanism to conveyor 79 is retracted. Limit switch 342 is closed to indicate the presence of a work unit at the transfer station. The absence of a tray on the back end of conveyor 85 or of the advancement of pushoff 372 for the turntable is also essential for the proper operation of conveyor 85 and is made a prerequisite to the advance of the by-pass pusher 86 since push off forward relay 378 must be maintained deenergized so that its back contact 378–1 remains closed. This relay is deenergized so long as pushoff 372 is back and limit switch 374 is open. Thus, the by-pass advance control is energized through closed contacts 367–2, 377–1, 378–1, 342, 370 and 369–1 to advance the work unit to surge station 87 and close limit switches 366 on conveyor 85 and 354 on by-pass pusher 86. Limit switch 366 energizes by-pass retract control to cause the by-pass carriage 347 to be driven back to its retracted position and by-pass pusher arm 349 to be raised clear of the work unit path on conveyor 79. Limit switch 366 also energizes the advance control for conveyor 85 provided no tray is on the back end of the storage section of tray return conveyor 85 as indicated by opening of limit switch contacts 375–1.

When the by-pass pusher reaches the forward limit of its travel, it closes limit switch 354 to energize the latch coil 376–L of relay 376 thereby opening back contact 376–2 to bar operation of the retract control of conveyor 85 and closing contact 376–1 to complete partially an energizing circuit for the trip coil 369–T of relay 369. That trip coil is energized when conveyor 85 is moved to its back end to operate limit switch 377 by virtue of the closure of contact 377–2. While relay 369 is latched, from the instant of admission of a new work unit to conveyor 79 to its reset by the advance of conveyor 82 in a normal operation resulting in the closure of limit switch 371 or by the advance of a work unit to the surge station to energize relay 376 and the return of conveyor 85 to its back end resulting in the closure of limit switch 377, turn-table pushoff 372 must remain in the retracted position with its limit switch 374 open since closure of the limit switch energizes relay 378. Thus, it is possible to get only one tray on the transfer portion of conveyor 85 at a time since a by-pass advance operation cannot occur if the pushoff has been advanced.

The circuit of FIG. XII enables the coincidence of the presence of a tray 30 on turntable 343 and a work unit 125 at transfer station 81 to be sensed, to actuate a by-pass pusher operation and to transfer the work unit to surge station 87 from which it is advanced to the storage portion of tray return conveyor 85. Alternatively, if a work unit is present at transfer station 81, and no tray is on turntable 343, the conveyor 82 advances the work unit to the turntable. Incidental to these primary functions safety interlocks are provided to bar the advance of a work unit to turntable 343 by conveyor 82 if the indexing or guide pins on that turntable are extended. The transfer section of conveyor 85 is prevented from advancing a tray to its corner if a tray is already present at that corner and contact 375–1 is opened thereby. Further, the by-pass pusher 86 is prevented from advancing if the transfer portion of conveyor 85 is not back to close contact 377–1 or if the hearth turntable pusher 378 has started forward permitting contact 374 to close.

When the presence of a tray is first sensed on the turntable deck 381 by the operation of limit switch 389, indexing fingers 392, see FIG. XIII and XIV are caused to extend from the surface of the deck through suitable apertures therein 393. The center indexing finger 392 registers with the center of the carburizing tray and enters the interstices of the tray lattice to a position engaged by the inclined ends of four indexing lugs 394 in the center square of the tray lattice. The pairs of indexing fingers 392 on the diagonals or deck 381 having the shorter separation each enter the open core of the cup fixture spindles 38 so that they are closely engaged along the frusto-conical portion 395 of that core interior to accurately index those fixtures and thus the position of the cups on the turntable 83. Similarly, the fingers 392 having the greatest spacing on the diagonals enter frusto-conical bottom portions 396 of the interior of the cone fixtures to index those fixtures for the unloading operation.

The mechanism for raising the indexing fingers 392 is best seen in FIG. XIV. It comprises a hydraulic cylinder 397 which is coaxial with the spindle 398 upon which the turntable rotates and has a piston rod 399 connected to a splined shaft 401 within spindle 398. Shaft 401 in moving along the axis of spindle 398 raises and lowers a spider 402 upon which the several indexing fingers are mounted. Spider 402 has a radial extension 403, best seen in FIG. XIII, which engages a limit switch 404 mounted on the bracket 391 supporting limit switch 389 to apply pressure on that switch.

A casing 405 extends downward from the undersurface of turntable deck 381 and is secured on an arcuate flange 406 on spindle 398 to enclose the shaft 401, spider 402, and the finger advancing mechanism. Rotational motion of the assembly is afforded by roller bearings 407 and 408 including respective inner races 409 and 411 secured to the spindle 398. Outer races 412 and 413 are secured to a hollow cylindrical standard 414 mounted on the upper portion of a housing 415 for the turntable driving mechanisms.

The rotating portions of the turntable are driven by a rack 416 which engages a pinion 417 mounted in driving relationship on spindle 398. Rack 416 is mounted on a slide member 418. Integral with slide 418 is a bracket 421 to which is connected piston rod 422 driven by a piston in cylinder 423. At the opposite end of slide 418, a contact surface 424 is provided which is engageable by the end of piston rod 425 of a piston in cylinder 426. An adjustable limit stud 427 is supported from a stationary lug 428 to engage an extension of the bearing surface 424 and limit the motion of rack 416 toward cylinder 426. The motion of piston rods 422 and 425 is precisely controlled. Slide 418 is provided with a transverse extension 429 as a continuation of bracket 421 which is arranged to actuate limit switches 431 and 432 at its limits of travel. These switches in turn control the hydraulic valves feeding the driving fluid to cylinder 423. In the same manner, extension 434 from piston rod bracket 435 secured to piston rod 425 defines the limit of operation of cylinder 426 by actuating the switch 436 and 437. The operation of turntable 343 to the several positions for effecting the unloading of trays 30 is diagrammatically represented in FIGS. XV, XVI, and XVII.

Loading of the rotary hearth reheating or hardening furnace 84 is effected by a loading shuttle 92 operating along a radius from the center of the furnace. Loading of workpieces onto the loading shuttle 92 is effected by a carriage moving normal to the moving path of that shuttle or normal to a radius from the rotary furnace. As described, the pairs of like work elements, cups 34 and cones 35, are mounted on diagonals of the carburizing trays 30. Transmission of these trays is effected along straight paths. In the illustrative embodiment, space limitations dictated that this path be oriented at other than an exact 45° angle to the axis of the conveyor 82. Hence, the tray diagonals on which the workpieces are situated are not parallel to the loading path of shuttle 92 as the tray is admitted to the turntable 343. Accordingly, the turntable 343 has been provided to accurately index the workpieces so that the diagonals on which like pairs are mounted will be oriented parallel to the loading radius at the time the magnetic loader picks up those workpieces for transfer to the loading shuttle. In one installation of a system embodying this invention, the trays are delivered by conveyor 82 to the load turntable 343 so that the diagonal on which the cups are located is 85° and 54 minutes clockwise from a position parallel to the radius for feeding the rotary furnace 84. It thus follows that the cones are positioned on a diagonal which is 4° and 6 minutes counterclockwise from a parallel to the feeding radius. This orientation is shown in FIG. XV.

Once the work fixtures have been properly indexed on turntable 343 by the extension of index keys 392 into the fixtures 36 and 37, as indicated by the operation of limit switch 404, the piston in cylinder 423 is retracted until limit switch 431 is actuated, this rotates the turntable in a counterclockwise direction 85° and 54 minutes to a position orienting the diagonal upon which the cups are located parallel with the loading axis for shuttle 92 as shown in FIG. XVI. When the cups have been picked up by the magnetic loader, as will be described, the turntable is rotated 90° clockwise by the extension of the piston in cylinder 423 to its maximum extent as shown in FIG. XVII, whereby extension 429 actuates limit switch 432. This causes slide 418 to engage its contact surface 424 with the end of piston rod 425 and to drive the piston connected thereto to its retracted position within cylinder 426, this maximum being defined by the engagement of contact surface 424 with the end of limiting stud 427. This locates the cones 35 at a parallel with the loading path of shuttle 92. After the cones 35 have been picked up by the magnetic loader, the turntable is reoriented to its load position by actuating cylinder 426 to drive its piston to its maximum extension as defined by the engagement of the limit switch actuator 434 with limit switch 436. Thus the tray is returned to the position shown in FIG. XV.

The magnetic loader is shown in elevation in FIG. XVIII wherein a pair of spaced I-beams 451 define the path of travel of a loader carriage 452 and are supported on a pair of legs 453 and 454 which straddle the empty tray shuttle conveyor 85 and a pair of legs 455 and 456 which straddle a loading shuttle 92 on a radius of the rotary hardening furnace. Legs 454 and 455 straddle the reheat conveyor shuttle 82 as best shown in FIG. XI. Carriage 452 can be reciprocated along I-beams 451 from a position above the turntable 343 as shown fragmentarily in phantom in FIG. XVIII to a position above the loading shuttle represented partially in phantom in FIG. XVIII. The carriage 452 rides on V-type wheels 457 which are confined in their paths of travel by upper and lower rails 458 secured to the I-beams 451 directly and by brackets 459 as best seen in the end view of the magnetic loader shown in FIG. XIX. Hydraulic cylinder 461 supplies the driving force for reciprocating carriage 452 through the connecting piston rod 462 which engages a bracket 463 on carriage 452. Actuation of limit switch 464 by a camming surface 465 beneath carriage 452 cuts off the advance of carriage 452 to accurately position that carriage over the loading shuttle, while limit switch 466 actuated by camming surface 467 on the underbody of carriage 452 limits the retraction of the carriage.

The lifting elements for the loader are a pair of electromagnets 468 positioned in side by side relationship transverse of the longitudinal axis of the loader. These electromagnets are raised and lowered hydraulically by the vertical movement of piston rods 469 to which they are secured. Driving force is imparted to the rods 469 by hydraulic fluid admitted in a controlled manner to lifting cylinders 471. As with previously described hydraulic controls, limit switches 472 are provided to restrict the upward movement of the magnets 468 by the engagement of the switch actuators by extensions 473 of the piston rods 469.

The two sets of workpieces each consisting of a pair of cones 35 and a cup 34 are processed through the preceding steps while mounted on a carburizing tray 30 and are positioned on diagonals of that tray in pairs such that a pair of cups are located on one diagonal and two pairs of cones are located on the other. The magnetic loader of FIGS. XVIII through XXI separates the workpieces into like pairs for the subsequent treatment and press quenching operations. In order to utilize the available volume for heat treating and processing the work units most effectively, they are mounted on the carburizing tray 30 with the larger diameter cups located on the tray with their centers at a smaller separation along their respective diagonal than the separation of the centers of the smaller diameter cones on that tray. The trays 91 employed in conveying the work units through the hardening process are identical for both the cups and the cones and, therefore, are arranged to receive those workpieces in pairs from the magnetic loader while those workpieces are on equally spaced centers. Accordingly, the magnetic loader is arranged to accommodate the several separations of centers for the workpieces which it transfers.

As best seen in the plan view of the carriage and a portion of the track upon which it operates in FIG. XX, separation of electromagnets 468 is adjustable on carriage 452 to accommodate the several separations of the centers of the cups and cones on the carburizing trays and to position those elements once lifted from the trays and conveyed to the hardening tray loading station so that they are on like centers when placed on the respective hardening trays.

The frame of carriage 452 is fixed in its dimensions to provide a rigid base upon which the axles 474 supporting V-type wheels 457 are mounted. Channel shaped side members 475 of carriage 452 mount axles 474 in journals 476 and are held with a fixed separation by end channels 477. A pair of transverse shafts 478 are fixed to side channels 475 and extend across the carriage in parallel relationship. Subcarriages 479 supporting cylinders 471 which determine the height of electromagnets 468 are mounted on the transverse shafts 478 by means of sleeves 480 and 481. Each of the sleeves 480 and 481 are free to slide along respective transverse shafts 478 and have secured thereto suitable supporting framework 482 to tie the sleeves together and provide a mounting point for the several elements associated with the respective subcarriages. The uppermost subcarriage in FIG. XX includes a hydraulic cylinder 483 having its axis parallel to the sleeves 480 and 481 and having a piston rod 484 extending therefrom to the framework 484 of the lower subcarriage. The rod 482 is secured to the lower carriage by a pair of nuts 485 threaded on the rod to embrace opposite sides of the framework of that carriage. Cylinder 483 provides means for adjusting the separation of the respective carriages 479. The flow of hydraulic fluid to cylinder 483 is controlled in part by cam actuated limit switches 486 and 487 carried on the lower of the subcarriages in a position corresponding to the position of cylinder 483 on the upper carriage. A cam shaft 488 is secured to the framework 482 of the upper carriage by nuts 489 and extends parallel to shafts 478 through a suitable aperture in the framework 482 of the lower subcarriage 479. A pair of cams 490 and 491 are secured to shaft 488 with appropriate spacings to actuate the limit switches 486 and 487 respectively and thereby define the limits of operation of the controlling hydraulic valves for feeding fluid to cylinder 483.

Centering of the respective subcarriages within the framework of carriage 452 is assured by mechanical stops in the form of studs 492 which are secured to lugs 493 on respective subcarriages 479 but nuts 494 which are threaded on the studs and tightened on the opposite sides of the lugs 493. These studs also pass through an aperture in suitable lugs 495 located on each of the side channels 475 of main carriage 452. While the body of each of the studs 492 is free to move through its respective main carriage lugs 495 the limits of that movement are adjustably defined by nuts 496 and 497 which are threaded on the stud 492. With the respective subcarriages at their minimum spacing as shown in FIG. XX, the outer nuts 497 are abutting the outer faces of lugs 495. When at their maximum spacing the nuts 496 abut the inner faces of lugs 495.

FIG. XXI illustrates the relationship of limit switches 487 and 486 to the respective subcarriage frames 482 and the camming members 490 and 491 which actuate those limit switches. When the two subcarriages are at a minimum separation, cam 490 actuates limit switch 486 as shown in the drawing. When the two subcarriages are at their maximum separation cam 491 actuates limit switch 487. Adjustment of the range of separation for which the limit switches 486 and 487 define the motion limits for the carriage is afforded by the movement of cams 490 and 491 along shaft 488 and by securing them in the appropriate positions by tightening set screws 498 and 499 respectively.

In operation the carburizing trays 30 are initially placed on the conveyors of the system so that they all have the same orientation at loading station 52. Thus, the diagonals on which the cup fixtures are secured are parallel for each tray as it passes through the loading station and cups are located on those diagonals while cones are located on the diagonals perpendicular thereto in each of the several trays. Orientation for these trays is maintaned throughout the carburizing, quenching washing, high temperature drawing and the intermediate steps so that each tray arrives on the turntable 343 with like orientation. In the example, this orientation is with the diagonal upon which the cups are mounted, the diagonal having the closer spaced centers on which the fixtures are mounted, displaced clockwise 85 degrees and 54 minutes from the loading position, the position wherein that diagonal is parallel to the loading radius of the furnace. Thus, as the turntable limit switch 431 is actuated by rotation of the turntable to the cup unloading position as described above and illustrated diagrammatically in FIG. XVI magnet loader operation is initiated to unload those cups.

At the completion of the preceding unloading cycle the magnetic loader had its carriage 452 retracted to a position above the turntable 343 and had its subcarriages 479 positioned with a minimum spacing. Advantageously that minimum spacing corresponds to the cup spacing on trays 30 and to the fixture spacing on paired hardening trays 91. The first step in the next succeeding cycle of the unloader therefore is to lower the electromagnet heads to a position where they abut the workpieces which have been oriented beneath them by the turntable, those workpieces being the cups. When the heads have been brought into contact with the workpieces they are energized, by means not shown, and then lifted until limit switches 472 are actuated. This lifting motion frees the workpieces from the tray and from the spindles of their supporting fixtures so that the magnetic loader carriage 452 is free to move transversely of tray 30.

The operation of limit switch 472 upon the elevation of the electromagnets 468, actuates controls not shown for the carriage driving cylinder 461 so that carriage 452 is advanced from the turntable to a position above the hardening furnace loading shuttle 92. When the carriage is appropriately positioned above that shuttle, switch 464 is actuated to initiate the lowering of electromagnets 468. As will be described, at this point in the operating cycle the loading shuttle 92 has positioned a pair of hardening trays beneath the station on which the carriage of the magnetic loader has stopped, so that as the electromagnets 468 are lowered the workpieces secured thereto are mounted on spindles of mounting fixtures secured to the hardening trays in a manner corresponding to those on tray 30. When the workpieces have been lowered into engagement with the hardening trays, electromagnets 468 are demagnetized in response to operation of a suitable limit switch (not shown) monitoring the motion of the electromagnets. Demagnetization can be effected by progressively reducing the current through the magnets while the direction of that current is successively reversed. When released, the electromagnets 468 are raised until limit switch 472 is operated. At the time of this operation the retraction of carriage 452 is initiated by the appropriate feeding of hydraulic fluid to cylinder 461, and the separation of subcarriages 479 is effected by the flow of fluid to cylinder 483.

When sufficient fluid has been supplied to cylinder 483 to extend the subcarriages so that the separation of the centers of magnet heads 468 is equal to the separation of the centers of the cones on the carburizing tray 30. Limit switch 487 is actuated by cam 491 to terminate the flow of fluid to cylinder 483. Coincident with this operation, the carriage 452 is being retracted so that when it reaches a location orienting magnet heads 468 above the turntable 343 limit switch 466 is actuated to terminate the operation of cylinder 461 and to initiate the lowering of magnet heads 468 until they engage the respective pairs of cones 35. Turntable operation is synchronized with loader operation so that the described rotation of the turntable 343 to position the cones 35 parallel with the charge shuttle has been completed by this time. The magnets are then energized by passing current therethrough and when sufficiently magnetized are raised to lift the cones free of their spindles on carburizing tray 30. When the magnets are raised sufficiently to operate limit switches 472, cylinder 461 initiates the advancement of carriage 452 to a position above loading shuttle 92. At this time the loading shuttle has positioned another pair of hardening trays in its station below the magnetic loader so that when the loader is appropriately located above those trays, its controls are actuated to lower the magnet heads with their load of cones onto cone fixtures mounted on the hardening trays. Release the cones from the magnet heads by a demagnetizing cycle as outlined above is then effected, and the magnet heads are raised for retraction and utilization in the following cycle.

The pair of hardening trays bearing cone fixture, when positioned for the reception of cones, is oriented with their respective fixtures having their centers at the same separation as the previously loaded cup fixtures. The magnetic loader accommodates the separation of the widely spaced magnet heads 468 to the closer separation of the cup fixtures on the shuttle trays 92 during the advancement of carriage 452 from above the turntable to a position above that shuttle. Thus, as the carriage advances, hydraulic fluid is fed to cylinder 483 to draw subcarriages 479 together to their minimum spacing as indicated by the operation of limit switch 486 by cam 490. The magnetic loader thereby accommodates itself to the several required center separations for the pair of elements which it transfers from the turntable to the hardening furnace loading shuttle.

The furnace 84 in which the carburized workpieces are heat treated to effect their hardening includes a rotary hearth 93 wherein the workpieces of like form are paired on radii of the hearth and carried from a loading station associated with the shuttle loader 92 at which they are introduced to an unloading station where they are withdrawn by shuttle 94. It is desirable that the pairs of workpieces be held in the furnace in as compact an arrangement as possible in order to limit the furnace volume required to a minimum. Subsequent to the heating step the workpieces must be separated rapidly to enable them to be transferred with appropriate spacing to quench presses. These critical workpieces spacings and the efficient transfer are realized by the use of the coupled hardening trays 91.

In setting up the radial hearth 93 of furnace 84, trays on successive radii of the hearth are alternately provided with cup fixtures 36 and cone fixtures 37 and are synchronized with the loading operations of the magnetic loader so that a pair of trays conditioned for cup reception are positioned beneath the loader when cups are to be loaded and a pair of trays with cone fixtures are on the charge shuttle when cones are being transferred.

A side elevation showing details of the hardening furnace loading shuttle 92 appears in FIG. XXII while a fragmentary plan of that shuttle is shown in FIG. XI. That shuttle comprises a table having an upper face 512 made up of a pair of parallel strips as seen in FIG. XXIII which run the length of the shuttle and are separated by an open center portion 513. Strips 512 and the remainder of shuttle 92 are supported on appropriately spaced legs 514 so that the table surface is level with the hearth line (not shown) of radial hearth furnace 84. Beneath the strips 512 constituting the table top are mounted a series of longitudinally extending angle iron members supporting the various operating elements of the shuttle. The first of these members 515 supports a downwardly projecting rail 516 which is complemented by a lower rail 517 mounted on member 518 to sustain and guide flanged wheels 519 of shuttle carriage 520. Movement is imparted to carriage 520 along rails 516 and 517 by means of a hydraulic cylinder 521 to advance and retract a pusher arm 522 secured to the carriage and supporting on its forward end a hook 523 including a leading finger 524 and a trailing pusher face 525. Hydraulic cylinder 521 is coupled to carriage 520 by means of a chain 526 through a rack 527 and a pinion 528 engaged thereby and mounted on shaft 529 which also mounts a driving sprocket 530 for chain 526. Rack 527 is reciprocated by cylinder 521, as best seen in FIG. XXIII through the linkage from the piston rods 531 and 532 extending from opposite ends of the cylinder through end brackets 533 and 534 to a rod 535 upon which the rack is mounted. Rod 535 also mounts a pair of camming elements 536 and 537 which actuate deceleration valves 538 and 539 at appropriate positions approaching the limits of travel of the pistons within the cylinder 521.

The chain driven from sprocket 530 is trained over sprockets 540 and 541 to insure that it engages the driving sprocket over a substantial portion of its periphery and thence to end sprockets 542 and 543 from which it extends horizontally to the opposite ends of the carriage 520 to which it is connected by means of suitable couplings to lugs 544 and 545 depending from that carriage. In order to insure a proper driving relationship through the medium of chain 526, the chain tightener 547 provided with an idler sprocket 548 is mounted for rotation at the end of arm 549 on pivot 550 and can be adjusted with respect to a chain. A spring loaded bumper 551 is provided at the end of travel of rod 535 to cause a limited retraction of the pusher arm 522 when hydraulic pressure is relieved, as will be described.

The longitudinal center of the table 512 and the coinciding axis along which pusher arm 522 reciprocates are on the extension of the radius from the rotary hearth within the furnace 84. The walls 552 of that furnace are provided with an aperture 553 of dimensions suitable to admit the pusher arm 522 and a loaded pair of hardening trays 91. This furnace opening is provided with a door 554 shown in phantom in FIG. XXII which can be closed while pusher arm 522, as also shown in phantom, is extending within the furnace. The rotation of the furnace hearth, the operation of the furnace door 554, and the reciprocating motion of pusher arm 522 are all synchronized with the other operations within this heat treating system to effect the continuous processing of the workpieces therein.

Four primary functions are performed by the loading shuttle 92 in synchronism with the associated elements of the system. Following the loading of a pair of hardening trays 91 positioned on table top 512 beneath the magnetic loaders, those trays are fed along the table top and into the furnace by the loader and when positioned on the rotary hearth in the location from which they were removed as empty trays they are released so that the hearth is free to rotate and carry the trays to a new position. Following the release of the trays, an empty pair of trays are engaged with the hook 523 of pusher arm 522 incidental to the rotation of the rotary hearth. These trays are withdrawn from the furnace by the shuttle 92 and incidental to their withdrawal they are pulled apart to their maximum extension. Once they are free from the furnace, the furnace door 554 which was opened to permit them to be withdrawn is reclosed and the trays are collapsed upon each other to position them properly in the loading station beneath the magnetic loader for loading as described previously.

Control of the above functions of the shuttle and the synchronization of these functions with the operations of the associated furnace and magnetic loader is effected in an electro-hydraulic control, not shown, which is responsive to several limit switches illustrated in FIG. XXIII. Limit switch cams 555, 556 and 557 are positioned on the upper surface of carriage 520 and are arranged to engage followers of the several limit switches located below the upper surface 512 of the loading shuttle table. At the time that a pair of hardening trays 91 have been loaded with workpieces by the magnetic loader, the hook 523 is in the position shown in phantom at 523' in FIG. XXII. The completion of the operation of magnetic loader initiates the feeding operation of shuttle 92 by first opening furnace door 554 and then causing pusher arm 522 to advance from the position of loading to a point positioning hook 523 at the location 523'' as shown, in FIG. XXII wherein the trays are located on the rotary hearth in the position from which they were withdrawn initially. When the pusher arm 522 has been advanced to its maximum extent within the furnace as indicated at 523'', cam 555 actuates limit switch 558 to terminate the advancing motion of the carriage which was initially decelerated by the operation of deceleration valve 539 when engaged by cam surface 537. Incidental to the completion of the advance of trays 91 into furnace 84, the furnace door 554 is closed. In this position the pushing face 523 of pusher arm hook 523 abuts the rear face of a hook (not shown) on tray 91. When the furnace is rotated, it is necessary for the tray hook to disengage the pusher arm hook 523 by moving transversely of that hook. However, side flanges (not shown) on the tray hook prevent such movement when the pusher arm is in its most advance position abutting face 525 against the rear face of the tray hook. Accordingly, the pusher arm is retracted sufficiently to disengage the hooks by positioning the tray hook within the open center portion of hook 523 between pusher face 525 and the hook finger 524. Spring biased bumper 551 effects this retraction. At the maximum extension of pusher arm 522 the rack support rod 535 engages and displaces bumper 551 toward the rear of the conveyor. This displacement is maintained while driving pressure is imposed on the hydraulic fluid on the advance side of piston 521. When that pressure is relieved the spring of bumper 551 displaces rod 535 toward the front of the conveyor until it balances the load imposed by the rod thereby retracting the pusher arm 522 sufficiently to free the tray hook from pusher hook 523. When the tray hook and hook 523 have been disengaged, the hearth is caused to rotate thereby advancing a pair of coupled hardening trays 91 which have previously been unloaded by shuttle 94, as will be described in detail, to a position where the tray hook is within the open portion of hook 523. Upon completion of the stepping of the rotary hearth, the furnace door 554 is opened and a pair of empty hardening trays is withdrawn from the furnace by the retraction of carriage 520 to the end of table 512.

Cam 557 actuates limit switch 562 to terminate the reversing motion which was decelerated by means of decelerating valve 538 responsive to actuation by cam 536. At this time the furnace door 554 is closed and the shuttle carriage collapses the extended trays upon each other and advances them into the loading station for the magnetic loader by advancing carriage 520 until its cam 556 actuates limit switch 563. Operation of limit switch 563 terminates the advancing motion of carriage 520 and initiates a loading operation by the magnetic loader. When loading by that loader is completed, the furnace door is reopened and the carriage again is advanced to insert the trays 91 into the furnace through another cycle as described. Thus, the charge shuttle 92 performs two cycles for each carburizing tray load handled by the magnetic loader.

Limit switch 561 provides a safety function in that it stops the operation of the shuttles, loader and hardening furnace if the shuttle carriage is retracted without withdrawing a tray from the furnace. Thus, a tray having a broken hook will not be recycled. This switch is actuated by a pivoted arm 561a provided with a sensing element above the table 512 and in the tray path so that it is displaced by a tray moving along the table.

Tray collapse is effected by operation of a tray collapse cylinder 564. This cylinder is coupled to the frame of table 512 above the path of carriage 520. A piston rod 565 extends from the cylinder 564 to abut an adjustable stud 566 mounted in a tapped hole in a lug 567 on carriage 520. Thus, when the carriage is advanced, it is free of rod 565 and can be separated therefrom and when it is retracted stud 566 is brought against the end of rod 565 so that the admission of hydraulic fluid to cylinder 564 advances the rod 565 and thereby advances stud 566 to drive the carriage to the tray collapse position wherein the tray hook is at the phantomed position 523' in FIG. XXII.

When the trays are withdrawn from the furnace, they separate. The application of an inward force on the outermost tray tends to collapse them. Tray collapse and proper positioning in the loading station is assured by means of a tray locator, best seen in FIG. XI. This locator comprises a stationary shoe 568 positioned adjacent the tray path on charge shuttle table 512 and a pair of spring biased shoes 569 on the opposite side of the tray path spaced so that they engage and frictionally retard the movement of the trays along the table. Thus the innermost tray 91 is withdrawn sufficiently to bring it into its loading station when the trays are extended. Since that tray is retarded by engagement of its sides by shoes 568 and 569 the inward advance of the outermost tray 91 causes that tray to be brought into abutting relationship to the inner tray and to be held in position by its shoes 568 and 569.

Discharge shuttle 94 for rotary hearth furnace 83 is positioned with its longitudinal axis coinciding with a furnace radius immediately preceding the radius on which the load shuttle 92 is oriented so that the loaded hardening trays are stepped around the hearth as the loading shuttle effects its loading cycles and are ultimately brought to the radial position coinciding with the discharge shuttle axis. The discharge shuttle withdraws the trays from the hardening furnace after they have proceeded through the cycle and positions them so that they can be unloaded during the interval that empty trays are withdrawn and loaded while on shuttle 92.

Discharge shuttle 94 is shown in a side elevation in FIG. XXIV and in plan in FIG. XXV and in end view in FIG. XXVI. It corresponds to charge shuttle 92 in some respects in that it includes a table 570 made up of a spaced pair of flat-topped side rails 571 and has a pusher arm 572 terminating at its furnace end in a hook 573 having a pushing face 574 and a finger 575. The pusher arm 572 and hook 573 are arranged for reciprocation along the longitudinal axis of the table 570 in an open center portion 576 between the side rails of the table top. Pusher arm 572 in turn is mounted on a carriage 577 made up of a pair of channels 578 secured to a flat bar 579 as best seen in the end view of FIG. XXVI. A bar-like bearing surface 580 is mounted on the undersurface of the upper flange of each of the channels 578 to provide the surface on which rollers 582 ride. Rollers 582 are mounted for rotation on suitable cantilever axles 583 in the stationary longitudinal side members 584 depending from the table top side rails 571.

Carriage 577 performs two transfer operations in this system. In addition to withdrawing loaded hardening trays from the rotary hearth furnace, positioning them for the removal of the workpieces by press loaders 97 and 98, to be described, and thereafter returning the unloaded hardening trays to the furnace 84, carriage 577 also transfers the press quenched workpieces received from the press loaders to a following workpiece conveyor 102 in the system. This transfer of quenched workpieces is accomplished by means of workpiece carriers 585 on the end of carriage 577 which is most remote from furnace 84. Work carriers 585 are universally adaptable to sustain individual cups or pairs of cones during the reciprocating motion of the carriage 577. They each comprise a central cylindrical portion 586 providing a spindle which is embraced by the workpieces having the smaller inner diameter (the cones) and radial arms 587 extending therefrom to form a supporting deck for the end of workpieces and terminating in upturned fingers 588 which prevent the displacement of the workpieces having the larger outer diameter (the cups) beyond the ends of those fingers. Each workpiece holder 585 is mounted on a plate 589 secured to the upper flanges of the channels 578.

Motion is imparted to carriage 577 by a hydraulically actuated pinion 590 engaging a rack 592 secured to the undersurface of carriage plate 579. Rotation of pinion 590 is effected through its shaft 593 which is coupled to a smaller pinion 594 at one side of the shuttle 94. Pinion 594 is engaged by a rack 595 mounted on a rod 596. Rod 596 is coupled through bracket 597 to piston rod 598 and through bracket 599 to piston rod 600. Each of piston rods 598 and 600 are coupled to a piston with a hydraulic cylinder 602 whereby the feed of hydraulic fluid to one end of the piston drives the rod 596 and thus the rack 595 in one direction parallel to the longitudinal axis of discharge shuttle 94 while the admission of fluid to the outer end of the piston drives the rack in the opposite direction. The reciprocating motion of rod 596 is facilitated by supporting rollers 603. As in the case of load shuttle 92 the rod 596 moving in synchronism with the piston within the cylinder 602 is provided with cams 604 and 605 adjacent its ends whereby hydraulic decelerating valves 606 and 607 are actuated to slow the motion of the reciprocating drive near the ends of its travel.

Control of the reciprocating motion of carriage 577 is afforded by the master electrohydraulic control system which is not shown and which is responsive to several limit switches mounted at appropriate positions on the supporting structure for shuttle 94.

A cup quench press loader 97 and a cone quench press loader 98 are positioned on opposite sides of discharge shuttle 94 so that their pickup mechanisms are centered on line 620 as shown in FIG. XXV. A tray positioner 621 is provided at this station to insure the proper orientation of hardening trays 91 in their extended position as they are withdrawn from furnace 84. Positioner 621 consists of a fixed shoe 622 extending inward from the outer limits of the side rails 571 and above those rails whereby the trays are centered on the rails 571 after being confined to the table by upstanding side flanges 623 intermediate the furnace door 624 and the tray positioner 621. Separate shoes 625 and 626 are provided on the opposite side of the shuttle table in cooperative relationship with shoe 622 to individually engage the extended trays at the maximum spacing of their centers. This separates the workpieces to proper centers for accommodation in the quench presses and the press feeders. Shoes 625 and 626 are mounted for transverse displacement and are biased by springs 627 toward shoe 622 to insure that trays 91 are engaged positively. This engagement of the tray 91 which is innermost in the furnace offers sufficient resistance to its introduction into the positioner to insure that the trays are extended to their limits at the termination of shuttle retraction.

In FIGS. XXIV and XXV the shuttle carriage is shown withdrawn or in its "out" position with work holders 585 at the transfer station for loader 101 and hook 573 positioning trays 91 (represented in dotted outline) in the tray positioner 621. However, it is convenient to consider an operating cycle as initiating with the shuttle carriage advanced or in its "in" position with hook 573 in position 573' shown in phantom in FIG. XXIV.

When the shuttle is in the furnace, hook 573 is positioned to straddle the path of the tray hooks as the trays are rotated by the rotary hearth. As a tray is indexed to its discharge position, hook 573 is aligned to engage a tray hook when the shuttle is retracted. In the synchronized operation of the system a press feeder for a pair of workpieces is positioned over the shuttle 94 at tray positioner 621 to pick up hot parts as they are withdrawn, having just deposited quenched parts of that type on the work holders 585 which are located within the tray positioner 621. As the door of furnace 84 for the charge shuttle 92 is closed following the introduction of a loaded pair of hardening trays 91 by that shuttle, the discharge shuttle door 624 is opened and retraction of carriage 577 is initiated. Since tray retraction begins before the door 624 is fully open, a safety interlock is provided to prevent the contact of the door by the trays or work units. This interlock is afforded in a control (not shown) which prevents the motion of carriage 577 beyond a position short of the door if limit switch 628 of FIG. XXIV, actuated from a cam (not shown) appropriately positioned on reciprocating rod 596 in the drive linkage for carriage 577, is operated while the door is short of its fully open position as sensed by conventional means such as another limit switch (not shown). In normal operation door 624 is fully open prior to the operation of limit switch 628, and the shuttle carriage 577 continues toward its fully retracted position until decelerating valve 606 is operated by cam 604 on rod 596. At the fully out position limit switch 630 is actuated by a cam on rod 596 to close furnace door 624, to start the unloading operations of the work holders 585 by unloader 101, and to start unloading of the trays 91 by press loader 97 or 98.

Since the work must conform to the quenching fixtures in the quench presses 95 or 96 an interlock is provided to stop the press feeders and prevent further operation of the shuttle if the operation is out of phase whereby the workpieces withdrawn from the furnace 84 are of a type which should not be picked up by the feeder 97 or 98 positioned to unload the trays. This interlock is provided by limit switches 632 and 633 having feeler rods 634 and 635 mounted on rotatable shafts 636 and 637, respectively, to actuate the switches when the feeler rods encounter a workpiece of the type they are adjusted to sense and are displaced to rotate their respective shafts. When hot parts are discharged from the furnace, they actuate the appropriate limit switch to enable operation of the feeder positioned to receive the work. If the wrong type of parts come from the furnace or if no parts pass the limit switches to actuate one or both of the switches, the discharge shuttle is stopped in its "out" position, the door 624 is closed, and an alarm is operated (all by means not shown) to avoid faulty operation and damage to work or machines. The absence of parts at this point in the process might result from their loss from the trays within furnace 84 or might indicate an absence of a tray as could result from a broken hook on the trays or on the discharge shuttle.

When unloading operations have proceeded to a point where the workpieces have cleared work holders 585 and the trays 91 (by control means not shown), the discharge shuttle door 624 is opened and the shuttle carriage 577 is advanced toward the furnace. This collapses the emptied trays 91 and inserts them in the furnace while repositioning work holders 585 for the reception of quenched workpieces from the loader opposed to that loader which has just previously transferred the hot work pieces to its press. As the work holders 585 are withdrawn from loader 101, they are monitored by a limit switch 638. If the switch is not actuated, the cycle is permitted to continue. If a workpiece remains on one of the holders 585, it engages feeler arm 639 mounted on rotatable shaft 640 and causes that arm and shaft to rotate and actuate switch 638. Similarly, if the feeder fails to remove all work from the trays 91, feeler limit switch 632 or 633 is operated. In either instance the shuttle is caused to retract to its "out" position, door 624 is closed, and an alarm is operated (all by controls not shown) to indicate the malfunction.

If none of limit switches 632, 633 or 638 is operated, when the shuttle carriage 577 is fully advanced, limit switch 642 is operated by the cam on rod 596 which operated limit switch 630 when the carriage was fully retracted. Upon operation of limit switch 642 door 624 is closed. Completion of the closure of door 624 operates controls which relieve the hydraulic pressure in cylinder 602 tending to force carriage 577 into the furnace. At the maximum extension of carriage 577, bracket 599 on the end of piston rod 600 engages and displaces spring biased bumper 643. When the hydraulic pressure in cylinder 602 is relieved, the bumper 643 returns the rod 600 from its position of maximum extension to a point which withdraws hook 573 sufficiently so that it again straddles the path of tray hooks to release the tray hook of the empty tray just returned to the furnace. The hearth then advances another step to index a loaded tray so that its hook is within hook 573 and the cycle is repeated.

In a system arranged to convey a carburizing tray from the draw furnace 75 to the turntable 88 every 4.8 minutes, a hardening tray loading cycle and an unloading cycle as described is performed every 2.4 minutes.

Transfer of the workpieces from the hardening trays 91 on shuttle 94 to the quench presses to the work holders 585 is performed by feeders 97 and 98. These feeders are of like construction with the exception of the pickup fingers which are chosen to accommodate the elements to be handled by the individual feeders. A typical feeder is shown in elevation in FIG. XXVIII, and the relationships between the rotary hearth furnace 84, the discharge shuttle 94, the feeders 97 and 98, the quench presses 95 and 96 and the magnetic loader 101 are shown in FIG. XXVII.

Each pair of tray borne workpieces withdrawn from furnace 84 by the engagement of the tray hook and hook 573, and the retraction of pusher arm 572 is positioned for unloading with the pair of trays 91 having a separation defined by the length of coupling rods therebetween. The separation of trays 91 at the unloading station corresponds to the separation of the paired workpiece stations 645 in cup quench press 95 and the like separation of cone stations 646 in quench press 96. Each press feeder has a pickup head including a pair of pickup finger- arrays. This head is arranged for rotation about a vertical axis located at the intersection of lines perpendicular to a bisecting line between the centers of the two tray positioners on shuttle 94 and between the centers of the quenching stations in the respective quench presses. Thus, cup press feeder 97 has a pickup head 647 rotatable around axis 648, and a cone press feeder 98 has a pickup head 649 arranged for rotation about a vertical axis 650. In order to afford the required manipulations, feeders 97 and 98 are each arranged to rotate about their axes 648 and 650, to reciprocate along those axes from a depressed to an elevated position, and to cause the pickup heads 647 and 649 to reciprocate longitudinally in a horizontal plane normal to axes 648 and 650. In the depressed position the feeders either pickup or deposit workpieces while in the elevated position they clear the workpieces of their several mountings whereby relative movement can be effected therebetween.

Cup feeder 97 is positioned as shown in FIG. XXVII after it returns quenched cups from press 95 to the workpiece holders 585 on shuttle 94. Once the cups have been released by the pickup head 647, it is elevated so that the shuttle 94 is free to reciprocate and carry the quenched workpieces to magnetic loader 101 and to carry heated cups from the furnace to a position below head 647. At that time, head 647 is depressed to permit the cups to be picked up. It is then elevated to lift the cups free of their mounting fixtures on trays 91, is retracted toward axis 648, is rotated clockwise 90 degrees about axis 648, and is advanced toward cup stations 645 in press 95. When the cups are located above their stations 645 by head 647, the head is lowered and the cups released. The quench plugs of press 95 are depressed through the open centers of the feeder head 647 (to be described) so that the cups are subjected to pressure and are flooded with quenching fluid. After a suitable timed interval, the press head is raised, the fingers of the feeder head are closed on the quenched work, and the work is raised. A draining interval is provided to permit the quench fluid to drain from the workpieces while they are held above the quench stations. Upon termination of that interval the feeder head is retracted, then rotated counterclockwise 90 degrees, and when aligned with the loading station for shuttle 94 advanced to a position over that station from which it is lowered to place the work parts on the work holders 585. The feeder head fingers are then released and elevated to clear the work.

At the time the cup feeder pick-up head 647 is lowered at the beginning of the cycle, a pair of magnetic heads in individual loader sections 652 and 653 (shown only schematically in FIG. XXVII) are also lowered each to engage the upper of two cones stacked on the workpiece mountings 585. These magnets are energized and after a suitable interval they are raised for example hydraulically (by means not shown) and shifted transversely of their rectangle 653 or 652 (by means not shown) to limits defined by the ends of those rectangles or by previously mounted workpieces therein. When fully loaded, the loader represented by rectangle 653 is advanced into alignment with that represented by rectangle 652 and the two are advanced in unison toward conveyor belt 654 in conveyor 102.

With the lift magnets of 652 and 653 up and the cup press feeder up, the discharge shuttle 94 is signaled to return to its "in" position. Upon advancing into the furnace it collapses the emptied cup trays and returns them to the rotary hearth while positioning workpiece holders 585 in the loading station. The rotary hearth furnace 84 indexes to move the tray hook of two cone trays 91 into registry with shuttle hook 573 while cup feeder 97 is retracting and rotating its feeder head 647 to carry the hot cups to cup press 95 and cone feeder 98 is withdrawing quenched cones from the drain-dwell position above cone quench station 646. Cone feeder head 649 is then rotated to a position above the work holders 585 on the rear of the carriage of shuttle 94, is lowered to place a set of two cones on each holder 585, is released from that pair of sets, and is elevated. When cone feeder 98 is positioned above shuttle 94 and freed of its cones, the shuttle carriage 577 retracts to convey the cones on holders 585 to the magnetic loaders 652 and 653 and to bring heated cones on the extended trays 91 beneath cone feeder head 649. Thus, the cone feeder 98 proceeds through a cycle as described for the cup feeder 97 in synchronism with the furnace 84, presses 95 and 96 and magnetic loaders 652 and 653 and alternately with cup loader 97. A sequence of operations for one cycle includes the transfer of hot cups to the cup feeder 97, the transfer by shuttle 94 of press quenched cups to the magnetic loaders 652 and 653, the removal of the cups by the feeder 97 and loaders 652 and 653, the repositioning to the "in" position of the shuttle 94, the transfer of press quenched cones to the "in" shuttle by feeder 98 and the transfer of cone trays to the shuttle by rotary hearth 93, the transfer by shuttle 94 of the hot cones to the feeder 98 and of press quenched cones to the loaders 652 and 653, the removal of the cones at the feeder 98 and loaders 652 and 653, the repositioning to "in" of the shuttle 94, the transfer of the press quenched cups to the shuttle 94 by feeder 97 and the transfer of a second pair of cup trays to the shuttle by rotary hearth 93, the transfer by shuttle 94 of the second pair of hot cups to the feeder 97 and of the now quenched original cups to the magnetic loaders 652 and 653.

The general construction of feeders 97 and 98 is shown in FIG. XXVIII. Each comprises a fixed cylindrical stand 656 supported from a base 657 resting on a floor 658. A hollow splined shaft 659 is mounted for rotation and reciprocation within housing cylinder 656 and supports at its upper end a base 660 for feeder head 647 or 649. Splined shaft 659 is coupled to an intermediate cylinder 662 which rotates therewith and within cylindrical stand 656, and with respect to which shaft 659 can be axially displaced.

Reciprocation of shaft 659 along its axis 648 or 650, as shown in FIG. XXVII, is accomplished by means of hydraulic cylinder 663 mounted below the level of floor 658 and on that axis. A piston (not shown) within cylinder 663 is coupled to a thrust bearing 664 by means of thrust plate 665 and piston rod 666. Thrust plate 665 is guided for reciprocation and confined to prevent rotation by guide rails 667 which extend parallel to the axis of the piston and are embraced in slots in the periphery of the plate 665. A pair of deceleration valves 668 and 661 are arranged for actuation by cam 670 carried by piston rod 666 so that the flow of hydraulic fluid to cylinder 663 is gradually cut off as the piston therein approaches its respective upper and lower limits of travel. As shown in FIG. XXVIII, shaft 659 is raised to its maximum height and thereby has its lower end immediately below annular oil seal 672 which is fastened to the lower flange 673 of casing 656.

Cylinder 662, concentric with shaft 659 and casing 656, embraces at its lower end an annular bearing 674 which embraces the outer surface of shaft 659 and is slidable therealong. The outer surface of cylinder 662 is embraced with tapered roller bearings 675 and 676 which respectively are mounted within casing 656 at its lower and upper ends to support cylinder 662 for rotation within the casing. A drive for rotating shaft 659 is coupled thereto from shaft 662 by means of splineways 677 on the upper end of shaft 659 and cooperating spline 678 on the inner periphery of pinion 679 secured to the upper flange 680 of shaft 662. As best seen in FIG. XXIX, pinion 679 is driven by the reciprocation of rack 682 coupled by piston rod 683 to driving piston 684. The maximum extension of rack 682 is determined by a combination of hydraulic deceleration valve 685 actuated by the rack borne cam 686 and by adjustable stop 687 engaging the end of the rack. The cooperating controls for the system (not shown) are actuated in response to the rotation of shaft 659 to the one of its operating positions corresponding to maximum piston rod extension by cam 688 secured to pinion 679, which engages limit switch 689. Similarly, the shaft limits for rotation in the counterclockwise direction are determined by cam 690 which actuates deceleration valve 692 and by adjustable stop 693 engaging cam arm 688. The controls are actuated when the counterclockwise limit is reached by the operation of limit switch 694 by cam 688.

Feeder head base 660 is secured to shaft 659 by a bolt 695 extending through a spindle 696 secured to base plate 697 upon which are mounted brackets 698 supporting upper and lower side rails 699 and 700 and an upper framework 702. A feeder head carriage 703 is mounted between base plate 697 and upper framework 702 for advancement from its retracted position as shown in FIG. XXVIII to the right. Carriage 703 rides on V ways 704 between gibs 699 and 700 as shown in the end view of the feeder head in FIG. XXXI. It is made up of side channels 705 coupled as by end plate 706 shown broken away in FIG. XXXI. A driving cylinder 707 is mounted on the upper framework 702 and is coupled to the end plate 706 by piston rod 708 whereby the carriage can be extended outward along rails 699 and 700 and retracted to its illustrated position. The hydraulic controls for cylinder 707 and the position sensing elements associated with the cylinder and carriage have not been shown since they correspond to those previously described.

Carriage 703 is shown in plan in FIG. XXX. It includes a pair of V ways 709 fitted in gibs 710 and arranged for reciprocation by means of cylinder 712 connected to the slides 709 through piston rods 713. The ends 714 of these slides each support a plate 715 from which depends a pickup finger 716. Pickup finger 716 cooperates with outer pickup fingers 717 to close upon and grasp workpieces when the associated ways 709 are advanced along carriage 703. Projecting from the pickup end of the feeder head is a framework 718 having open portions 719 in registry with the region within the pickup fingers to pass the mandrels of the quench press. Bell crank levers 720 are pivoted at 722 on framework 718 and have fingers 717 depending therefrom at their outer ends. The driving ends of the bell crank levers 720 support pins 723 on which are journaled cam followers 724 arranged to roll within cam slots 725 on cam plates 726 secured to slide end plate 715. Thus, when slide 709 is advanced to advance end plate 715 inner finger 716 moves forward and toward the center of open portion 719, and the bell crank levers 720 are rotated about their pivots 722 to move outer fingers 717 inward toward the center of open portion 719. Retraction of slide 709 releases a workpiece held by fingers 716 and 717 by causing those fingers to move away from each other.

When the feeder has been rotated into feeding alignment with its press and its feeder head has been advanced, it is necessary to precisely position the work units upon the press mandrel in order to index the workpieces properly during quenching and avoid malfunctions and possible damage to workpieces and equipment as the press is brought into engagement therewith. Indexing of the workpieces is effected by means of guide pin 727 which enters a hardened bushing 728, see FIG. XXVII, in the lower anvil of the quench press. The lower end 729 of guide pin 727 is tapered to facilitate its introduction into bushing 728.

A front elevation of a quench press typical of presses 95 and 96 is shown in FIG. XXXII. It comprises a base 730, two columns 731 and 732, and a top 733 forming the frame of the press. Ways 734 and 735 are secured to each column to serve as a way for a cross head 736 of the press. Ways 737 and 738 slidably engage ways 734 and 735 respectively and couple upper and lower cross bars 739 and 740 of cross head 736. The cross head is moved up and down in the ways 734 and 735 by a pair of small hydraulic cylinders 748 and their rams shown in their extended position. Hydraulic fluid for actuating rams 744 and 745 is supplied to cylinders 742 and 743 by means of conduits 746 and 747.

Paired workpieces are quenched in the press in side by side relationship as a pair of cups 34 or a pair of cone stacks each consisting of two cones. Each of the workpieces or workpiece stacks is mounted on the main anvil or platen 750 of the press. These mountings are within quench rings 752 which are flooded with quenching fluid during quenching. Plugs or press mandrels 753 are advanced by means of hydraulic pressure applied to cylinders 748 to a position inserting them within the workpieces. The mandrels confine the workpieces to a predetermined configuration while they are flooded with fluid in the quench stations. The quench rings and their operating elements are best seen in FIGS. XXXIII and XXXIV. FIG. XXXIV is a side elevation sectioned substantially along line XXXIV'—XXXIV' above anvil 750 and sectioned substantially along line XXXIV—XXXIV below the anvil.

Mounted on the base 730 of the press are a pair of gudgeons 754 through which extends a shaft 755 supporting quench ring frame 756. Two quench rings 752 are mounted within that frame, as best seen in FIG. XXXIII. In operation, the hot workpieces are flooded virtually instantaneously to insure a uniform quench over their entire body. Quench fluid is maintained adjacent the quench stations within rings 752 by means of the manifold 757 formed by the hollow interior of quench ring frame 756 in cooperation with the outer wall 758 of the quench rings. A seal is effected between the rings and frame by ring flanges 759 secured to the frame by bolts 760 and sealed thereto by gaskets 762. Several sizes of quench rings can be accommodated in the frame and are interchangeable by virtue of the flanged connections.

Normally the rings and frame are permitted to remain on the press base during quenching operations since work is admitted to the quench stations by the feeder through the upper open portions thereof. However, maintenance may require their removal from the anvil. This is accomplished by raising the frame around shaft 755 by means of a pinion 763 secured thereto and driven from hydraulic cylinder 764 through rack 765. The quench fluid conduit 766 to manifold 757 is not disrupted by the pivoting of frame 756 on shaft 755 since it is connected to its main supply (not shown) through a swivel joint 767 having its axis on the axis of shaft 755.

Fluid is passed through quench rings 752 from manifold 757 to the quench stations at appropriate instants in the press quenching cycle by means of valves disposed about the periphery of the rings. The valves each comprise a bore 768 parallel to the axes of the rings and disposed peripherally around the rings within their walls. Spindles 769 are fitted within the bores over a substantial portion of their lengths as best seen in FIG. XXXIV. A plurality of radial bores 770 (only one set being shown in FIG. XXXIV) in the walls of rings 752 intersect each axial bore 768 to form passages from the manifold 757 to the quench station. These passages are ordinarily closed by the enlarged portions of the spindles 769 to bar the passage of fluid to the interior of the rings. The passages are opened by axially displacing the spindles 769 so that the spaced portions 772 of reduced diameter are in registry with radial bores 770.

Rapid flooding of the workpieces is accomplished by opening all of the valves in the quenching walls simultaneously with the opening of valve 773 feeding a port 774 in the center of the quench press platen. The ring valves are opened by raising a valve operating ring 775 against which the ends of spindles 769 are biased by springs 776. Two pairs of pins 777 are journaled for reciprocation through the platen to raise valve operating ring 775. A shaft 778 actuates the pins upon rotation by means of a rack 779 and pinion 780 drive coupled to a hydraulic cylinder 782 to rotate an eccentric 783 thereon and displace links 784 coupled thereto to the left as shown in FIG. XXXIV. This displacement straightens toggle links 785 coupled between fixed pivots 786 and pins 777 to raise those pins. Another eccentric 787 through link 788 displaces link 789 to the right around its fixed pivot 790 to depress actuating plunger 792 for valve 773 thereby opening that valve as the quench rings valves are opened. Thus the quench rings is simultaneously flooded from its center and its periphery.

Hydraulic cylinder 782 is driven to the valve opening position in response to the master control for the system. This control function is initiated in response to the advancement of plugs 753 into engagement with the workpieces which, in turn, is initiated in response to the mounting of the workpieces in the quenching stations by the press feeder and the release of those workpieces by the press feeder pickup fingers. As in the previous control functions, the means for accomplishing these results is conventional once the sequences are determined, and therefore are not shown.

Operation of the press is synchronized with press loader operation so that the press cross head is raised sufficiently to permit access of the feeder head and workpieces to the region above the quench stations when the feeder is rotated into alignment with the quench stations and advanced. As the feeder head is lowered within the press so that fingers 716 and 717 enter quench rings 752 while grasping the hot workpieces, the press cross head 736 begins to lower into position so that as fingers 716 and 717 of the head release the workpiece, backing off into slots 781 in the quench rings walls, the mandrels 753 are advanced into the centers of the workpieces and the quench rings 752 are flooded with quench fluid.

After a suitable quench interval, the quench valves are closed by reversal of the hydraulic drive of cylinder 782 and the quench fluid is permitted to flow from ports 793 in the quench ring frame below the lower limit of the quench rings and thence across the platen to trough 794 from which it is returned to its reservoir. This flow occurs during quenching, however, fluid is supplied to the quench station at a much greater rate than it escapes therefrom through ports 793, and, therefore, some of the excess even flows over the upper lip of the quench rings and quench frame and thence across the platen to the trough from which it is reused after suitable cleaning.

The controls then raise the press plugs 753, close the lift fingers 716 and 717 of the press feeder and cause the feeder to lift the quenched work to a drain-dwell above the quench stations. After a suitable drain interval, the feeder head is retracted, rotated to a position aligned with the shuttle 94, advanced to a position superjacent the work holders 585, lowered, and the fingers 716 and 717 opened. When the work is placed on work holders 585 of discharge shuttle 94, the shuttle transfers it to the magnetic loaders 652 and 653 of loader 101 for washer 102.

In recapitulation of the invention, the above system integrates apparatus for performing a multiplicity of heat treating steps each involving precisely controlled heating and cooling cycles in a predetermined sequence. In the operation of the system, at least two different forms of workpieces are processed by means wherein the pieces are grouped during certain steps for purposes of efficiency yet are segregated where the operations performed on them are unique to a particular workpiece. The mode of jointly and separately processing the workpieces is so arranged that the system can be expanded, in the specific example utilizing four work positions on trays 30, two work positions on trays 91 and four work positions in presses 95 and 96, to as many separated unique processes as there are workpieces, without departing from the concepts embraced herein. The various combinations of equipment and processing steps and the details of such can be altered substantially, as can the form of the workpieces and the details accommodating those workpieces, within the spirit and scope of this invention.

The concept of maintaining the orientation of the workpiece carriers uniform at each processing station and recycling those carriers, even through alternative paths, without altering that orientation enables the heat treating and processing to be accomplished in a virtually unattended operation. Further this utilization of a maintained orientation and accurate indexing even during transfer from one carrier to another, as from trays 30 to trays 91 or from trays 91 to work holders 585, enables each of the individual workpieces to be subjected to unique operations. Thus the workpieces in the left hand quenching station of a press 95 or 96 might be of different form from that in the right hand station without altering the system except for the utilization of appropriate fixtures, lift fingers, quench rings, press mandrels and the like. Therefore, the system could operate as described to process four different workpiece configurations.

In view of the numerous modifications which this system suggests to one skilled in the art it is to be understood that this detailed disclosure is to be read as illustrative and not in a limiting sense.

It is to be noted that a somewhat related quench press construction is disclosed in E. K. Bastress Patent 2,822,-162 entitled "Metal Article Treating Apparatus" which issued February 4, 1958, on an application filed May 5, 1952, and that a quench ring and valving construction as utilized in that press is the subject of an application entitled "Quench Press Apparatus" which was filed as a continuation of that patent filed August 26, 1957, which has been assigned Serial No. 680,087, now abandoned. The details of the by-pass pusher, its controls and the conveyors with which it is associated are embraced in a patent application Serial No. 732,517, now abandoned filed herewith in the name of Ernest G. de Coriolis et al. and entitled "Materials Handling System." Further the detailed system for feeding workpieces to the quench presses is the subject matter of Ernest G. de Coriolis et al. application Serial No. 736,656 entitled "Metal Article Treating Apparatus" filed herewith.

We claim:

1. A system for heat treating cooperating workpieces comprising a plurality of rectangular support members upon which a plurality of cooperating workpieces are conveyed through portions of said system, a first pair of positioning means fixed with a given spacing on a first diagonal of said support member, a second pair of positioning means fixed with a second spacing other than said given spacing on a second diagonal of said support member, each of said first and second positioning means respectively maintaining first and second workpieces of different configurations, said support members each having a plurality of critically oriented apertures in their undersurface, first indexing means for establishing a like workpiece orientation for each support member in the system, first heating means, first cooling means, second indexing means comprising a plurality of upwardly extensible keys conforming to the shape of said support member apertures and having an orientation conforming to said aperture orientation, first means for conveying successive support members from said first indexing means through said first heating means, and first cooling means to said second indexing means, said conveying means introducing successive support members to said second indexing means with like orientation and with said apertures in registry with said keys, means for extending said keys into said apertures in response to the reception of a support member on said indexing means, a pair of aligned means for unloading said workpieces from said support member, means for orienting said support member while on said indexing means to position the first diagonal in parallel with said aligned pair of unloading means, means for positioning said pair of unloading means with said given spacing above said first workpieces for unloading, means for orienting said support member while on said indexing means to position the second diagonal in parallel with said aligned pair of unloading means, means for positioning said pair of unloading means with said second spacing above said second workpieces for unloading, a plurality of workpiece support units, means for successively positioning said support units adjacent said indexing means, a pair of work positioners on each workpiece support unit, said pair of support unit work positioners having a third given spacing and being aligned with said pair of unloading means, said pairs of work positioners on alternate of said successive support units being particularly adapted to position said first workpieces and said pairs of work positioners on support units intermediate thereof being particularly adapted to position said second workpieces, means for positioning each of said pair of unloading means above a respective one of said support unit work positioners with said third given spacing, means for releasing workpieces from said unloading means to said support units, a second heating means, an unloading station, a quench press for said first workpieces, a quench press for said second workpieces, a first workpiece loader for transferring workpieces from a support unit at the unloading station to said quench press for said first workpieces, a second workpiece loader for transferring workpieces from a support unit at the unloading station to said quench press for said second workpieces, a second conveying means for conveying workpieces mounted on support units from said unloading means through said second heating means to the unloading station, and means associated with said second conveying means and controlling said first and second workpiece loaders for sensing the workpiece admitted to said unloading station.

2. A system for heat treating cooperating workpieces comprising a plurality of rectangular support members upon which a plurality of cooperating workpieces are conveyed through portions of said system, a first pair of positioning means fixed with a given spacing on a first diagonal of said support member, a second pair of positioning means fixed with a second spacing other than said given spacing on a second diagonal of said support member, each of said first and second positioning means respectively maintaining first and second workpieces of different configurations, indexing means for establishing a like workpiece orientation for each support member in the system, first heating means, first cooling means, second indexing means, first means for conveying successive support members from said first indexing means through said first heating means, and first cooling means to said second indexing means, a pair of aligned means for unloading said workpieces from said support member, means for orienting said support member while on said indexing means to position the first diagonal in parallel with said aligned pair of unloading means, means for positioning said pair of unloading means with said given spacing above said first workpieces for unloading, means for orienting said support member while on said indexing means to position the second diagonal in parallel with said aligned pair of unloading means, means for positioning said pair of unloading means with said second spacing above said second workpieces for unloading, a plurality of workpiece support units, means for successively positioning said support units adjacent said indexing means, a pair of work positioners on each workpiece support unit, said pair of support unit work positioners having a third given spacing and being aligned with said pair of unloading means, said pairs of work positioners on alternate of said successive support units being particularly adapted to position said first workpieces and said pairs of work positioners on support units intermediate thereof being particularly adapted to position said second workpieces, means for positioning each of said pair of unloading means above a respective one of said support unit work positioners with said third given spacing, means for releasing workpieces from said unloading means to said support units, a second heating means, an unloading station, a quench press for said first workpieces, a quench press for said second workpieces, a first workpiece loader for transferring workpieces from a support unit at the unloading station to said quench press for said first workpieces, a second workpiece loader for transferring workpieces from a support unit at the unloading station to said quench press for said second workpieces, and a second conveying means for conveying workpieces mounted on support units from said unloading means through said second heating means to the unloading station.

3. A system for heat treating cooperating workpieces comprising a plurality of rectangular support members upon which a plurality of cooperating workpieces are conveyed through portions of said system, a first pair of positioning means fixed with a given spacing on a first diagonal of said support member, a second pair of positioning means fixed with a second spacing other than said given spacing on a second diagonal of said support member, each of said first and second positioning means respectively maintaining first and second workpieces of different configurations, first indexing means for establishing a like workpiece orientation for each support member in the system, first heating means, first cooling means, second indexing means, first means for conveying successive support members from said first indexing means through said first heating means, and first cooling means to said second indexing means, a pair of aligned means for unloading said workpieces from said support member, means for orienting said support member while on said indexing means to position the first diagonal in parallel with said aligned pair of unloading means, means for positioning said pair of unloading means with said given spacing above said first workpieces for unloading, means for orienting said support member while on said indexing means to position the second diagonal in parallel with said aligned pair of unloading means, means for positioning said pair of unloading means with said second spacing above said second workpieces for unloading, a plurality of workpiece support units, a pair of work positioners on each workpiece support unit, said pair of support unit work positioners having a third given spacing, means for positioning each of said pair of unloading means above a respective one of said support unit work positioners with said third given spacing, means for releasing workpieces from said unloading means to said support units, a second heating means, an unloading station, a quench press for said first workpieces, a quench press for said second workpieces, a first workpiece loader for transferring workpieces from a support unit at the unloading station to said quench press for said first workpieces, a second workpiece loader for transferring workpieces from a support unit at the unloading station to said quench press for said second workpieces, and a second conveying means for conveying workpieces mounted on support units from said unloading means through said second heating means to the unloading station.

4. A system for heat treating cooperating workpieces comprising a plurality of rectangular support members upon which a plurality of cooperating workpieces are conveyed through portions of said system, a first pair of positioning means fixed with a given spacing on a first diagonal of said support member, a second pair of positioning means fixed with a second spacing other than said given spacing on a second diagonal of said support member, each of said first and second positioning means respectively maintaining first and second workpieces of different configurations, first indexing means for establishing a like workpiece orientation for each support member in the system, first heating means, first cooling means, second indexing means, first means for conveying successive support members from said first indexing means through said first heating means, and first cooling means to said second indexing means, a pair of aligned means for unloading said workpieces from said support member, means for orienting said support member while on said indexing means to position the first diagonal parallel to said aligned pair of unloading means, means for positioning said pair of unloading means with said given spacing above said first workpieces for unloading, means for orienting said support member while on said indexing means to position the second diagonal parallel to said pair of aligned unloading means, means for positioning said pair of unloading means with said second spacing above said second workpieces for unloading, a second heating means, a plurality of workpiece support units, said unloading means mounting a pair of first workpieces on said support units and a pair of second workpieces on a succeeding support unit, a quench press for said first workpieces, a quench press for said second workpieces, an unloading station, a first workpiece loader for transferring workpieces from a support unit at the unloading station to said first workpiece quench press, a second workpiece loader for transferring workpieces from a support unit at the unloading station to said second workpiece quench press, and a second conveying means for conveying workpieces mounted on support units from said unloading means through said second heating means to the unloading station.

5. A system for heat treating cooperating workpieces comprising a plurality of support members upon which a plurality of cooperating workpieces are conveyed through portions of said system, said members each having a pair of parallel pusher faces and critically oriented apertures in their undersurface, first means for indexing said support members with said pusher faces normal to the conveying direction, a first and second positioning means fixed on said support member in a given orientation with respect to said pusher faces for the reception of respective first and second workpieces of different configurations, first heating means, first cooling means, second support member indexing means comprising a plurality of upwardly extensible keys conforming to the shape of said support member apertures and having an orientation conforming to said aperture orientation, first means for conveying successive support members from said first indexing means through said first heating means, and first cooling means to said second support member indexing means, said conveying means introducing successive support members to said second indexing means with like orientation and with said apertures in registry with said keys, means for extending said keys into said apertures in response to the reception of a support member on said indexing means, means for unloading said workpieces from said support member, means for orienting said support member while on said indexing means to position a first workpiece for unloading by said unloading means and thereafter for orienting said support member to position a second workpiece for unloading by said unloading means, a second heating means, a plurality of workpiece support units, said unloading means mounting a first workpiece on one of said support units and a second workpiece on a succeeding support unit, a first workpiece quench press, a second workpiece quench press, an unloading station, a first workpiece loader for transferring workpieces from a support unit at the unloading station to said first workpiece quench press, a second workpiece loader for transferring workpieces from a support unit at the unloading station to said second workpiece quench press, and a second conveying means for conveying workpieces mounted on support units from said unloading means through said second heating means to the unloading station.

6. A system for heat treating cooperating workpieces comprising a plurality of support members upon which a plurality of cooperating ferromagnetic workpieces are conveyed through portions of the system, said members each having a pair of parallel pusher faces, first means for indexing said support members with said pusher faces normal to the conveying direction, first and second ferromagnetic fixtures for maintaining first and second workpieces on said support member in a given orientation with respect to said pusher faces, a first heating means, a first cooling means, a second support member indexing means, first means for conveying successive support members from said first indexing means through said first heating means and first cooling means to said second support member indexing means, magnetic means for lifting workpieces from said support member, means for locking said fixtures on said support member against separation therefrom by said magnetic lifting means, means for orienting said support member while on said second indexing means to position a first workpiece for unloading by said unloading means and thereafter for orienting said support member to position a second workpiece for unloading by said unloading means, a second heating means, a plurality of workpiece support units, said unloading means mounting a first workpiece on one of said support units and a second workpiece on a succeeding support unit, a first workpiece quench press, a second workpiece quench press, an unloading station, a first workpiece loader for transferring workpieces from a support unit at the unloading station to said first workpiece quench press, a second workpiece loader for transferring workpieces from a support unit at the unloading station to said second workpiece quench press, a second conveying means for conveying workpieces mounted on support units from said unloading means through said second heating means to the unloading station, and means associated with said second conveying means and controlling said first and second workpiece loaders for sensing the workpiece admitted to said unloading station.

7. A system for heat treating cooperating workpieces comprising a plurality of support members upon which a plurality of cooperating workpieces are conveyed through portions of said system, said members each having a pair of parallel pusher faces, first means for indexing said support members with said pusher faces normal to the conveying direction, a first and second positioning means fixed on said support member in a given orientation with respect to said pusher faces for the reception of respective first and second workpieces of different configurations, first heating means, first cooling means, second support member indexing means, first means for conveying successive support members from said first indexing means through said first heating means and first cooling means to said second support member indexing means, means for unloading said workpieces from said support member, means for orienting said support member while on said second indexing means to position a first workpiece for unloading by said unloading means and thereafter for orienting said support member to position a second workpiece for unloading by said unloading means, a second heating means, a plurality of workpiece support units, said unloading means mounting a first workpiece on one of said support units and a second workpiece on a succeeding support unit, a first workpiece quench press, a second workpiece quench press, an unloading station, a first workpiece loader for transferring workpieces from a support unit at the unloading station to said first workpiece quench press, a second workpiece loader for transferring workpieces from a support unit at the unloading station to said second workpiece quench press, a second conveying means for conveying workpieces mounted on support units from said unloading means through said second heating means to the unloading station, and means associated with said second conveying means and controlling said first and second workpiece loaders for sensing the workpiece admitted to said unloading station.

8. A system for heat treating cooperating workpieces comprising a plurality of support members upon which a plurality of cooperating workpieces are conveyed through portions of said system, said members each having a pair of parallel pusher faces, first means for indexing said support members with said pusher faces normal to the conveying direction, a first and second positioning means fixed on said support member in a given orientation with respect to said pusher faces for the reception of respective first and second workpieces of different configurations, first heating means, first cooling means, second support member indexing means, first means for conveying successive support members from said first indexing means through said first heating means and first cooling means to said second support member indexing means, means for unloading said workpieces from said support member, means for orienting said support member while on said second indexing means to position a first workpiece for unloading by said unloading means and thereafter for orienting said support member to position a second workpiece for unloading by said unloading means, a second heating means, a plurality of workpiece support units, said unloading means mounting a first workpiece on one of said support units and a second workpiece on a succeeding support unit, a first workpiece quench press, a second workpiece quench press, an unloading station, a first workpiece loader for transferring workpieces from a support unit at the unloading station to said first workpiece quench press, a second workpiece loader for transferring workpieces from a support unit at the unloading station to said second workpiece quench press, and a second conveying means for conveying workpieces mounted on support units from said unloading means through second heating means to the unloading station.

9. In combination, a work support, means for orienting a first workpiece of a given configuration and a second workpiece of a given configuration differing from said first configuration in a given relationship on said support, a first processing apparatus, a second processing apparatus, first conveying means for said supports, an unloading station, means to introduce successive ones of said supports to said conveying means in like orientation, said conveying means maintaining like orientation in successive supports and carrying said supports through said first processing apparatus and to said unloading station, an unloader for separately removing first and second workpieces from said support at said unloading station and for feeding them to said second processing apparatus, means for indexing said supports with respect to said unloader to enable a first workpiece to be unloaded and then to enable a second workpiece to be unloaded, a third processing apparatus exclusively adapted to process said first workpieces, a fourth processing apparatus exclusively adapted to process said second workpieces, and means for transferring said workpieces from said second processing apparatus in the order in which they are fed by said unloader to said appropriate third and fourth processing apparatus.

10. In combination a work support, means for orienting a first workpiece of a given configuration and a second workpiece of a second given configuration differing from said first configuration in a given relationship on said support, a first processing apparatus, a second processing apparatus, first conveying means for said supports, an unloading station, means to introduce successive supports to said conveying means in like orientation, said conveying means maintaining like orientation in successive supports and carrying said supports through said first processing apparatus and to said unloading station, an unloader for separately removing first and second workpieces from said support at said unloading station and for feeding them to said second processing apparatus, means for indexing said supports with respect to said unloader to enable a first workpiece to be unloaded and then to enable a second workpiece to be unloaded, a third processing apparatus exclusively adapted to process said first workpieces, a fourth processing apparatus exclusively adapted to process said second workpieces, means for transferring said workpieces from said second processing apparatus to said third and fourth processing apparatus, and means associated with said transferring means for sensing the workpiece in said transferring means prior to its admission to said third or fourth processing apparatus and for controlling said transferring means to insure transfer to said appropriate one of said third and fourth processing apparatus.

11. In combination a work support having a base lying in a plane and an aperture in its undersurface, means for orienting a first workpiece of a given configuration and a second workpiece of a second configuration differing from said first configuration in a given relationship on said support, a first processing apparatus, a second processing apparatus, first conveying means for said supports, an unloading station, means to introduce successive supports to said conveying means in like orientation, said conveying means maintaining like orientation in successive supports and carrying said supports through said first processing apparatus and to said unloading station, means for indexing said supports at said unloading station comprising a key and means for extending the key upward into said aperture in said support member, means for rotating said support and key in the plane of said support base, an unloader for separately removing first and second workpieces from said support at said unloading station with said respective workpieces rotated to a position accessible to said unloader and for feeding them to said second processing apparatus, means for indexing said supports with respect to said unloader to enable a first workpiece to be unloaded and then to enable a second workpiece to be unloaded, a third processing apparatus exclusively adapted to process said first workpieces, a fourth processing apparatus exclusively adapted to process said second workpieces, and means for transferring said workpieces from said second processing apparatus in the order in which they are fed by said unloader to said appropriate third and fourth processing apparatus.

12. A system for processing sets of elements, each of which comprises a first element of one form and a second element of another form, said system comprising a plurality of processing devices, a conveyor extending through at least one device, a carrier on said conveyor for a set of elements, means to segregate said first elements from said second elements, means to process said segregated elements in a common region of a second device, means to remove said elements from said second device, means to sense the elements removed from said second device, a third device for processing said first elements, a fourth device for processing said second element, and means responsive to said sensing means for feeding said first elements removed from said second device to said third device and said second elements removed from said second device to said fourth device.

13. A system for processing cooperating workpieces, comprising a plurality of support members for conveying said workpieces through portions of said system, a first and a second fixture on each of said support members, a first processing apparatus for processing first and second workpieces while on said fixtures, a second processing apparatus for processing said first and second workpieces, an unloading station for said workpieces, means for conveying successive support members through said first apparatus to said unloading station with like orientation, means for indexing said support members at said unloading station, means for removing said workpieces from said support member at said unloading station and for segregating first workpieces from second workpieces, and means for conveying segregated workpieces to said second processing apparatus.

14. In combination a work support, means for orienting pairs of first and second workpieces in a given relationship on said support, said first workpieces having a first spacing and said second workpieces having a second spacing different from said first spacing, a first processing apparatus for said first and second workpieces, a second processing apparatus for said first workpieces, a third processing apparatus for said second workpieces, a loading station for said workpieces, a station for unloading said workpieces from said supports, means for conveying successive supports from said loading station through said first apparatus to said unloading station while maintaining a like orientation of successive supports, means for removing pairs of like workpieces from each of said supports, means for positioning said supports for removal of said paired first workpieces by said workpiece removing means upon introduction of said support to said unloading station, means for positioning said work support at said unloading station for removal of said paired second workpieces by said workpiece removing means subsequent to the removal of said paired first workpieces, first means for transferring said first workpiece to said second processing apparatus, second means for transferring said second workpiece to said third processing apparatus, and means for alternating operating said first and second transferring means.

15. In combination a work support, means for orienting first and second workpieces in a given relationship on said support, a first processing apparatus for said first and second workpieces, a second processing apparatus for said first workpiece, a third processing apparatus for said second workpiece, a loading station for said workpieces, a station for unloading said workpieces from said supports, means for conveying successive supports from said loading station through said first apparatus to said unloading station while maintaining a like orientation of successive supports, means for removing said first workpiece from said support while said work unit is at said unloading station, means for transferring said first workpiece to said second processing apparatus, means for shifting the position of said support at said unloading station to position said second workpiece for removal from said support by said removing means, and means for transferring said second workpiece to said third processing apparatus.

16. In combination a work support, means for orienting first and second workpieces in a given relationship on said support, a first processing apparatus for said first and second workpieces, a second processing apparatus for said first workpiece, a third processing apparatus for said second workpiece, a loading station for said workpieces, means for conveying successive supports from said loading station through said first apparatus while maintaining a like orientation of successive supports, means for segregating said workpieces and removing them from said support in a sequence according to their orientation thereon, means for transferring said first workpiece to said second processing apparatus and said second workpiece to said third processing apparatus according to their sequence of removal from said supports.

17. In combination a work support, means for orienting first and second workpieces in a given relationship on said support, a first processing apparatus for said first and second workpieces, a second processing apparatus for said first workpiece, a third processing apparatus for said second workpiece, a loading station for said workpieces, means for conveying successive supports from said loading station through said first apparatus while maintaining a like orientation of successive supports, means for removing said workpieces from said support, means for segregating said workpieces, means for transferring said first workpiece to said second processing apparatus, and means for transferring said second workpiece to said third processing apparatus.

18. In combination a work support having a base lying in a plane, means for orienting first and second workpieces on said work support, a sustaining means for said support, means to advance said support onto said sustaining means along a plane coincident with said base plane, said work support having a plurality of apertures in its base, and means to advance indexing keys into said apertures while said support is on said sustaining means to accurately position said support thereon.

19. In combination a work support having a base lying in a plane, means for orienting a first and a second workpiece on said work support, a sustaining means for said support, means to advance said support onto said sustaining means along a plane coincident with said base plane, and means for rotating said support while on said sustaining means.

20. In combination a work support having a base lying in a plane and critically spaced apertures therein, first and second fixtures fitting into respective apertures in said support for respectively orienting first and second workpieces, each of said fixtures having an aperture in its surface exposed through support apertures, a sustaining means for said support, means to advance said support onto said sustaining means along a plane coincident with said base plane, and means to advance an array of indexing keys corresponding to said fixture apertures into those apertures while said support is on said sustaining means to accurately position said support thereon.

21. In combination a work support having a base lying in a plane and critically spaced apertures therein, first and second fixtures fitting into respective apertures in said support for respectively orienting first and second workpieces, each of said fixtures having an aperture in its surface exposed through said support apertures, a sustaining means for said support, means to advance said support onto said sustaining means along a plane coincident with said base plane, means to advance an array of indexing keys corresponding to said fixture apertures into those apertures while said support is on said sustaining means to accurately position said support thereon, and means for rotating said array of advanced keys to rotate said support.

22. In combination a work support having a base lying in a plane, means for orienting first and second workpieces on said work support, a sustaining means for said support, means to advance said support onto said sustaining means along a plane coincident with said base plane, said work support having a plurality of apertures in its base, means to advance indexing keys into said apertures while said support is on said sustaining means to accurately position said support thereon, a workpiece unloader adapted to engage a workpiece in a given position on said sustaining means, means for rotating said support to position a first workpiece thereon for engagement by said unloader, and means for rotating said support to position a second workpiece thereon for engagement by said unloader.

23. In combination a work support, means for orienting workpieces on said work support with a first spacing for first paired workpieces and a second spacing for second paired workpieces, a sustaining means for said support, means to position said support on said sustaining means, a pair of workpiece pickup heads, a loading station, means to engage individual paired workpieces with said pickup heads, and means to move said pickup heads to said loading station.

24. A combination in accordance with claim 23 wherein said workpieces and said orienting means are of ferromagnetic material and said pickup heads are magnetic comprising means releasably locking said orienting means to said work support whereby said orienting means are held on said work support while said pickup head separates said workpiece therefrom.

25. In combination a work support, means for orienting first paired workpieces and second paired workpieces on said work support with a first spacing for said first paired workpieces and a second spacing for said second paired workpieces, a sustaining means for said support, means to position said support on said sustaining means, a pair of workpiece pickup heads, means for rotating said support on said sustaining means to align said first paired workpieces with said pair of pickup heads, means to move said pickup heads into engagement with individual paired workpieces, means for rotating said support on said sustaining means to align said second paired workpieces with said pair of pickup heads, a loading station, and means to move said pickup heads to said loading station.

26. In combination a work support, means for orienting first paired workpieces and second paired workpieces on said work support with a first spacing for said first paired workpieces and a second spacing for said second paired workpieces, a sustaining means for said support, means to position said support on said sustaining means, a pair of workpiece pickup heads, means for rotating said support on said sustaining means to align paired workpieces with said pair of pickup heads, means to move said pickup heads into engagement with individual paired workpieces, a loading station, and means to move said pickup heads to said loading station.

27. In combination a work support, means for orienting first paired workpieces and second paired workpieces on said work support with a first spacing for said first paired workpieces and a second spacing for said second paired workpieces, a sustaining means for said support, means to position said support on said sustaining means, a pair of workpiece pickup heads, means for rotating said support on said sustaining means to align paired workpieces parallel with said pair of pickup heads, means to position said pickup heads above the line between paired workpieces, means to adjust said paired pickup heads to said first spacing while above said first paired workpieces, means to adjust said paired pickup heads to said second spacing while above said second paired workpieces, a pair of workpiece receivers aligned parallel with said pair of pickup heads having a given spacing, means to position said pickup heads above said pair of workpiece receivers, and means to adjust the separation of said pickup heads to said given spacing.

28. In combination a work support, means for orienting first paired workpieces and second paired workpieces on said work support with a first spacing for said first paired workpieces and a second spacing for said second paired workpieces to form a work unit, a sustaining means for said work unit, means to position said work unit on said sustaining means, a carriage, a track for said carriage extending from above said sustaining means to a loading station, a pair of transverse slides on said carriage, a workpiece pickup head depending from each slide, and means to raise and lower said pickup heads, means to index said work unit to position said first paired workpieces parallel to the alignment of said pair of pickup heads, means to adjust the separation of said pickup heads to the separation of said first paired workpieces, means to move said pickup heads to said loading station, means to index said work unit to position said second paired workpieces parallel to the alignment of said pair of pickup heads and means to adjust the separation of said pickup heads to the separation of said second paired workpieces.

References Cited in the file of this patent

UNITED STATES PATENTS

| | | |
|---|---|---|
| 2,223,603 | Darrah | Dec. 3, 1940 |
| 2,297,054 | Garrison | Sept. 29, 1942 |
| 2,605,092 | Hutchinson et al. | July 29, 1952 |
| 2,822,162 | Bastress | Feb. 4, 1958 |